US008540266B2

(12) United States Patent
Baker

(10) Patent No.: US 8,540,266 B2
(45) Date of Patent: Sep. 24, 2013

(54) WHEELCHAIR

(76) Inventor: Scott Bradley Baker, Sherman Oaks, CA (US)

( * ) Notice: Subject to any disclaimer, the term of this patent is extended or adjusted under 35 U.S.C. 154(b) by 54 days.

(21) Appl. No.: 13/134,888

(22) Filed: Jun. 20, 2011

(65) Prior Publication Data

US 2012/0012417 A1 Jan. 19, 2012

Related U.S. Application Data

(63) Continuation-in-part of application No. 12/315,548, filed on Dec. 4, 2008, now Pat. No. 7,963,539.

(60) Provisional application No. 61/005,439, filed on Dec. 5, 2007, provisional application No. 61/005,446, filed on Dec. 5, 2007, provisional application No. 61/005,447, filed on Dec. 5, 2007.

(51) Int. Cl.
*B62M 1/14* (2006.01)

(52) U.S. Cl.
USPC .................... 280/250.1; 280/304.1; 280/252; 280/256; 280/244

(58) Field of Classification Search
USPC .......................................... 280/250.1, 304.1
See application file for complete search history.

(56) References Cited

U.S. PATENT DOCUMENTS

| | | | | |
|---|---|---|---|---|
| 5,356,172 | A * | 10/1994 | Levy et al. | 280/650 |
| 6,007,082 | A * | 12/1999 | Watwood et al. | 280/244 |
| 6,338,496 | B1 * | 1/2002 | O'Neill, Sr. | 280/250.1 |
| 7,261,309 | B2 * | 8/2007 | Watwood et al. | 280/244 |
| 7,699,131 | B2 * | 4/2010 | Wu | 180/208 |
| 7,717,447 | B2 * | 5/2010 | Orford | 280/250.1 |

* cited by examiner

*Primary Examiner* — Tashiana Adams
*Assistant Examiner* — Marlon Arce
(74) *Attorney, Agent, or Firm* — Colin P. Abrahams

(57) ABSTRACT

A wheelchair comprises a main frame and a seat mounted on the main frame. A pair of front wheels and a pair of rear wheels are also mounted on the frame. A propulsion mechanism is provided for driving the rear wheels, the propulsion mechanism comprising an arm lever for forward and back movement and a gear train between the arm lever and the rear wheels.

7 Claims, 61 Drawing Sheets

WHEELCHAIR

CROSS-REFERENCE TO RELATED APPLICATIONS

This application is a continuation in part application of U.S. patent application Ser. No. 12/315,548, which claims the benefit of U.S. Provisional Patent Applications Nos. 61/005,439, 61/005,446 and 61/005,447, all filed on Dec. 5, 2007, and all incorporated by reference herein in their entirety.

FIELD AND BACKGROUND OF THE INVENTION

This invention relates to a wheelchair. More particularly, the invention relates to a wheelchair having a specific form of locomotion.

SUMMARY OF THE INVENTION

According to one aspect of the invention, there is provided a wheelchair comprising: a main frame; a seat mounted on the main frame; a pair of front wheels and a pair of rear wheels; and a propulsion mechanism for driving the rear wheels, the propulsion mechanism comprising an arm lever for forward and back movement and a gear train between the arm lever and the rear wheels.

Preferably, the gear train comprises an arm gear which turns in response to forward and back movement of the arm lever; a directional gear driven by the arm gear, the directional gear being movable between a first forward position for moving the rear wheels forward and a second reverse position for moving the rear wheels in reverse; a forward drive gear driven by the directional gear when the directional gear is in the first position; and a reverse drive gear driven by the directional gear when the directional gear is in the second position.

In one form, a gear shift mechanism is provided for moving the directional gear between the first position and the second position. Further, there may be a neutral position for the directional gear in which it drives neither the forward drive gear or the reverse drive gear. In one aspect, the directional gear is mounted on an outer shaft, the outer shaft being mounted on an inner shaft which is axially movable within the outer shaft, and the directional gear is connected to the inner shaft though a slot in the outer shaft and is moved between the first and second positions by the movement of the inner shaft within the outer shaft.

Preferably, a linkage assembly is operatively connected to the directional gear, and a cable system controlled by a user of the wheelchair. The linkage assembly may comprise a linkage case and a link arm lever therein which is pivotable between a forward motion position and a reverse motion position, one end of the link arm lever being connected to the cable system for movement between the forward and reverse motion position, the other end of the link arm lever being connected to the inner shaft to move the inner shaft between the first forward and second reverse positions.

Preferably, the arm lever comprises an elongate arm connected at one end to the gear train and extending upwardly therefrom laterally of the seat, the arm lever driving the gear train by the forward and back movement thereof, and may have an inwardly directed handle for grasping by the user. The handle may have a brake lever thereon for operating a braking mechanism and a gear shift for operating the directional gear between the first forward position and the second reverse position. In one form, the arm lever is foldable along its length for facilitating storage and transportation of the wheelchair, and the handle can be rotated relative to the arm lever.

In one aspect, the gear train is at least partially contained in a transmission housing. The gear train housing may comprise four substantially vertical plates held together by a housing frame, the housing having two lateral compartments and a central compartment, each lateral compartment accommodating a left and right side gear train respectively.

Preferably, the wheelchair further comprising a seat mount assembly for mounting the seat to the main frame, the seat mount assembly comprising a seat mount member, a pair of seat mounting posts which connect to the main frame and the seat mount member, and a lock plate for enabling releasable securement of the seat mount to the seat mounting posts. Also, the wheelchair may further comprise a gear train mount assembly for mounting the gear train to the main frame, the gear train mount assembly comprising a gear train mount member, a pair of gear train mounting posts which connect to the main frame and the gear train mount member, and a lock plate for enabling releasable securement of the gear train mount to the gear train mounting posts.

According to another aspect of the invention, there is provided a wheelchair comprising: a main frame having a frame beam with an upper and a lower surface; a seat mounted on the upper surface of the frame beam; a pair of front wheels and a pair of rear wheels; a propulsion mechanism mounted on the lower surface of the main beam for driving the rear wheels; and a mounting system for mounting the seat and the propulsion mechanism on the main beam of the main frame, the mounting system comprising a seat mount member on an upper surface of the frame beam, a transmission mount on a lower surface of the frame beam, and connecting members on the seat mount and the transmission mount which fasten to each other through apertures in the frame beam.

According to a further aspect of the invention, there is provided a method of propelling a wheelchair, the method comprising: forming a seat, a pair of front wheels and a pair of rear wheels on a main frame for a wheelchair; and activating a propulsion mechanism on the wheelchair for driving the rear wheels by moving an arm lever back and forth, the arm lever driving a gear train between the arm lever and the rear wheels.

In yet another aspect, the invention comprises a wheelchair comprising: a frame and wheels; and a seat assembly mounted on the frame, the seat assembly comprising a seat bottom having a front edge a rear edge and a pair of side edges wherein the rear and side edges are raised, the seat bottom having an at least partial centered rise so as to provide a pair of lateral support recesses for the user for enhanced positioning in the seat bottom.

Preferably, the wheelchair further comprises a seat back, the seat back having lateral supports and lumbar support to correctly position the user in the seat assembly. The seat bottom is preferably higher at the front edge thereof than at the rear edge.

According to one aspect of the invention, there is provided a wheelchair having an arm lever, preferably two arm levers, for initiating locomotion of the wheelchair. The locomotion, in accordance with the invention, is initiated by the backward and forward movement of arm levers by the user of the wheelchair, the arm levers being connected to the wheels of the wheelchair through a drive train so that the motion of the levers is transferred into a force for rotating the wheels. The drive train may take several different forms, but in one preferred aspect of the invention comprises an arm gear, a directional gear, and forward and reverse gears. The arm lever drives the arm gear, which in turn drives the directional gear.

The position of the directional gear may be varied so as to engage either a forward or reverse gear, which in turn transfers motion to the wheel to selectively propel the wheelchair in either the forward or reverse direction. Furthermore, in accordance with the invention, by appropriate selection of the gears in drive trains on different sides of the wheelchair, the wheelchair may be turned, rotated or otherwise directed according to the needs of the user.

In one form, brakes are provided for slowing down or stopping the wheelchair. Preferably, the brake comprises a disc brake rotor on a drive axle of the wheelchair, the disc brake rotor being engagable by a caliper which may be activated by the user so as to engage the rotor for the purposes of slowing of stopping the wheelchair.

In another aspect, the drive train is contained within a housing comprising plates dividing the housing into various compartments, and support members for holding the plates together, and for use as a support for other drive train components for the wheelchair.

In a preferred embodiment, the arm lever may comprise a hand grip which is rotatable, the rotatable hand grip moving cables between first and second positions, so as to move the drive gear to selectively engage either the forward gear or the reverse gear. By appropriate manipulation of the handle, the user therefore has the option of engaging appropriate gear to determine direction of motion.

In a preferred embodiment, the arm may be foldable so as to render the wheelchair into a more compact form, so that it may be stored or transported more easily.

Preferably, brake levers are provided on the hand grip, and by appropriate cable connection with the brake caliper and rotor, activation of the brake lever by the user will slow down or stop the wheelchair.

Preferably, the wheelchair comprises a basic frame member upon which the various components are mounted. The frame may comprise a seat and transmission mount component, and a front wheel component, which may also operate as a foot rest. Preferably, the both the seat and the transmission drive trains are mounted so as to be easily removable for maintenance, repair or cleaning purposes. Preferably, the front wheel has shock absorbers so as to absorb shock from rough surfaces.

DETAILED DESCRIPTION OF THE INVENTION

Figure 1:
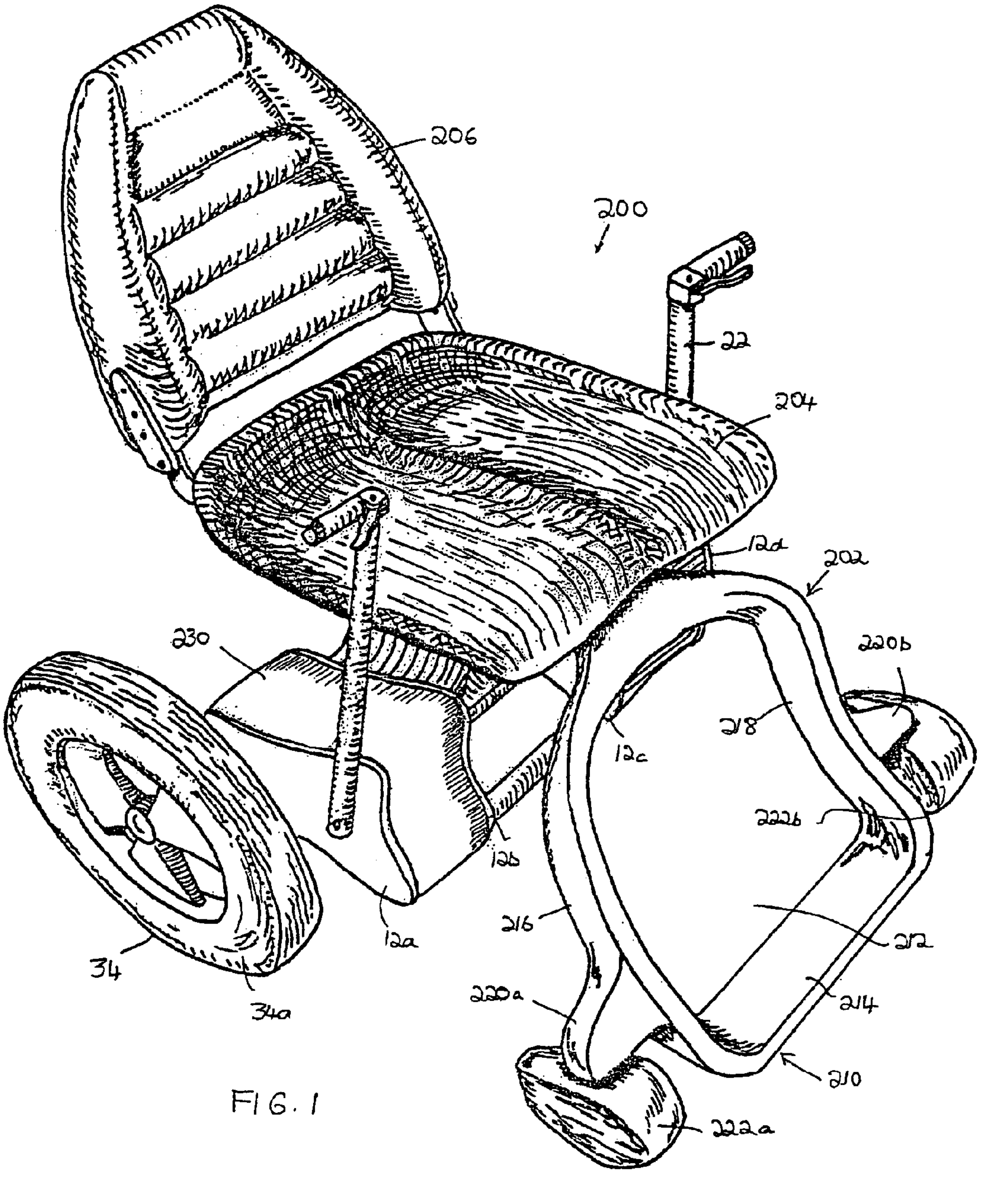
FIG. 1 is a perspective view of a wheelchair in accordance with the present invention.
Figure 3:
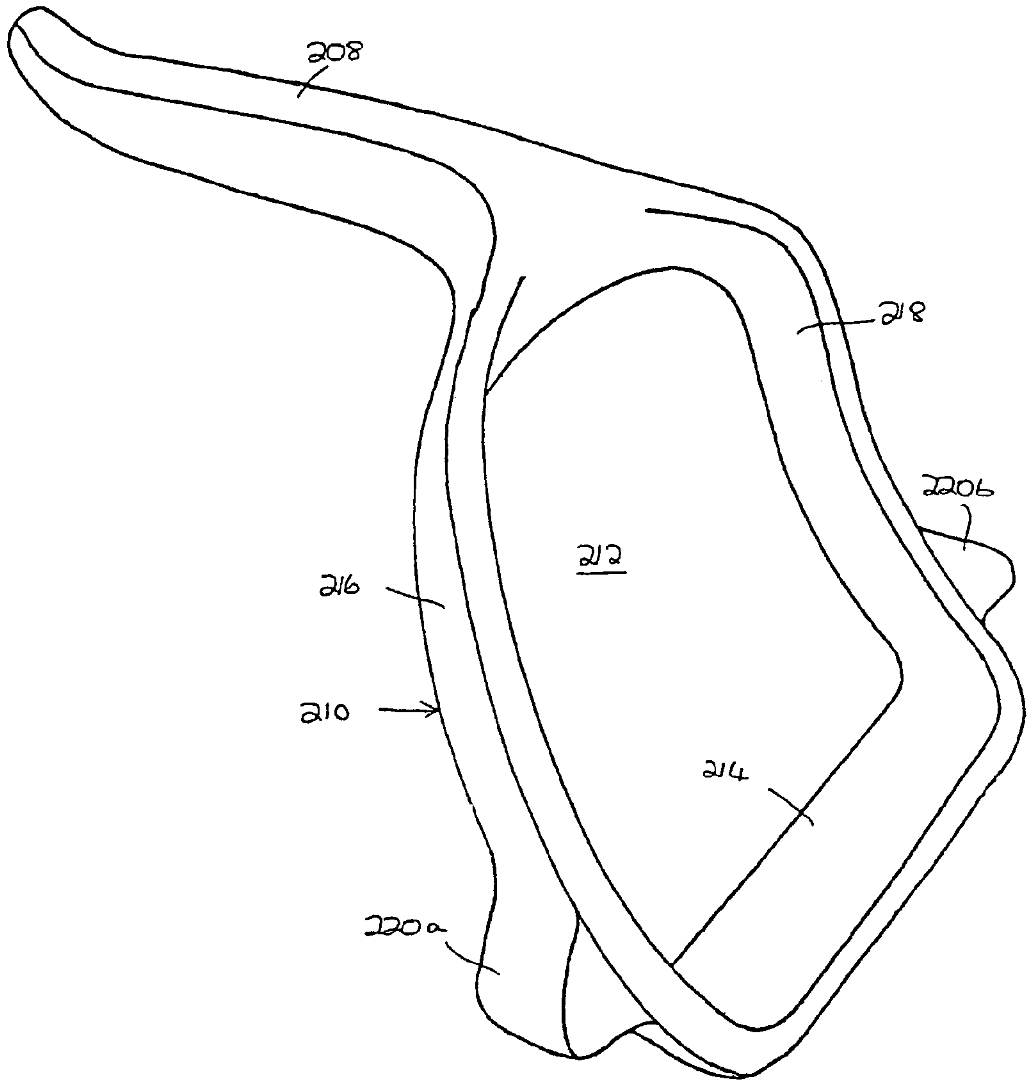
FIG. 3 is a frame showing one embodiment of a frame for use in the invention.

With reference to FIG. 1 of the drawings, there is shown a perspective view of a wheelchair 200 in accordance with the present invention. Generally, the wheelchair 200 comprises a frame 202 in FIG. 1 (and having reference numeral 74 in FIG. 31 and other figures related thereto), which supports a seat 204 and a seat back 206. The seat 204 and seat back 206 are mounted on a central support 208 of the frame 200. Note that FIG. 3 shows a single central support. However, in other embodiments, there may be two, or more, supports extending from the front member 210.

The frame further comprises a generally rectangular shaped front member 210, having an open space 212 and a foot rest 214. The foot rest 214 comprises the base on the front member 210, the front member 210 further comprising side arms 216 and 218. Near the lower end of each of the side arms, there is formed on each side arm 216 and 218 a front wheel support housing 220*a* and 220*b*, supporting front wheel assemblies 222*a* and 222*b* respectively. These housings 220*a* and 220*b*, the front wheels 222*a* and 222*b* and their attachment structures will be described more fully in due course. Note that the invention is not limited to a frame member 214 which has the rectangular shape as illustrated in the drawings. Other suitable shapes and configurations may be used.

The frame 202 also supports the drive mechanism 230, as will be described in greater detail below. The drive mechanism 230 is generally attached to the lower or bottom side of the central support 208. The drive mechanism 230 has extending upwardly on either side thereof an arm lever 22, to be described, and is used by the person sitting in the wheelchair, to move or propel the wheelchair 200. The drive mechanism 230 drives rear wheels 34, the rear wheels having a rear tire 34*a*.

Figure 2:
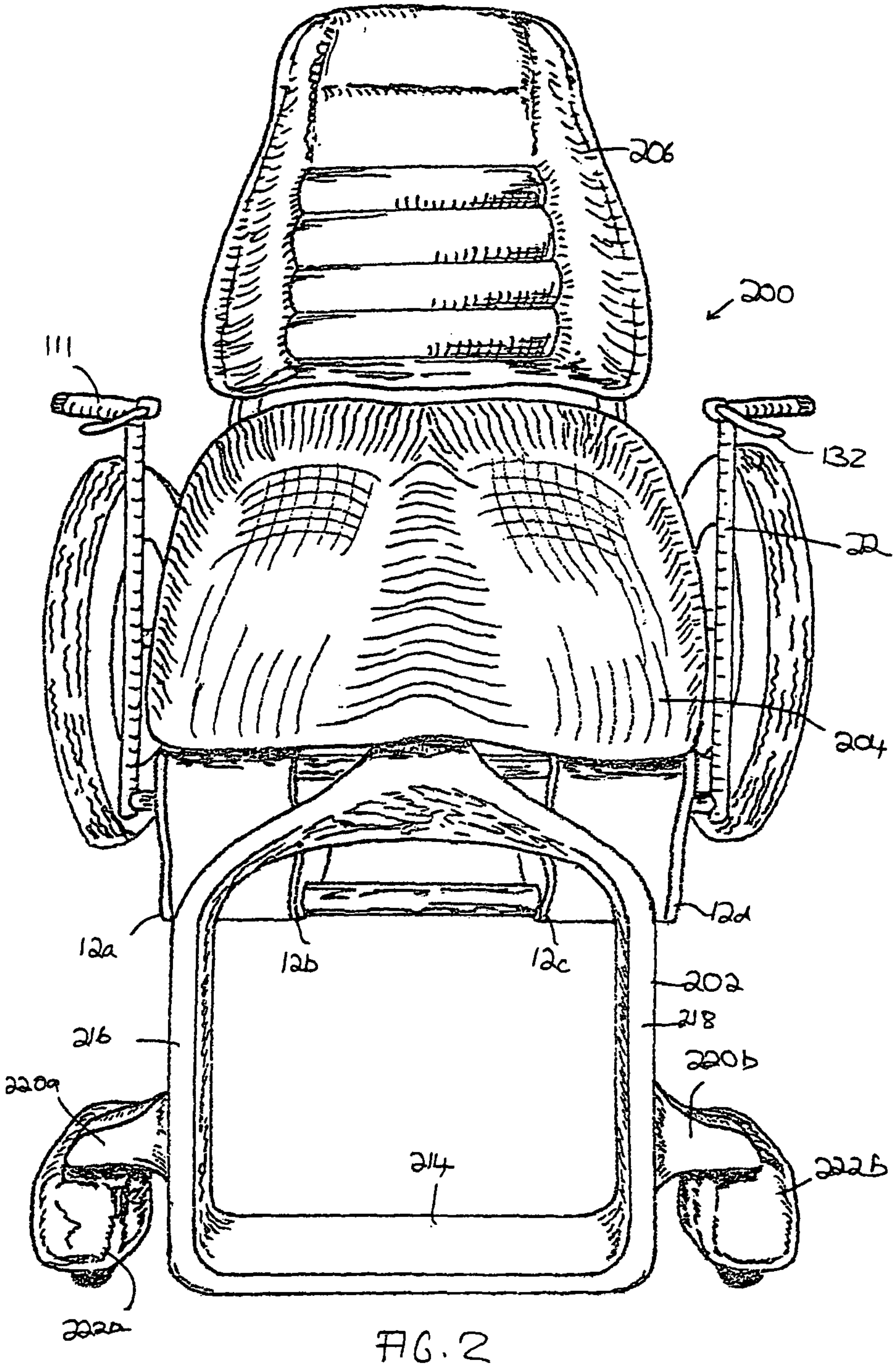
FIG. 2 is a front view of the wheelchair in accordance with the present invention.

It will be seen that FIGS. 1 and 2 of the drawings show overall views of the wheelchair 200 of the invention, and FIG. 3 shows a detail of the frame 202. In the description below, a detailed description of the general components described above will be provided with particular reference to the drive mechanism 230, its structure and operation for propelling the wheelchair 200.

Figure 5:
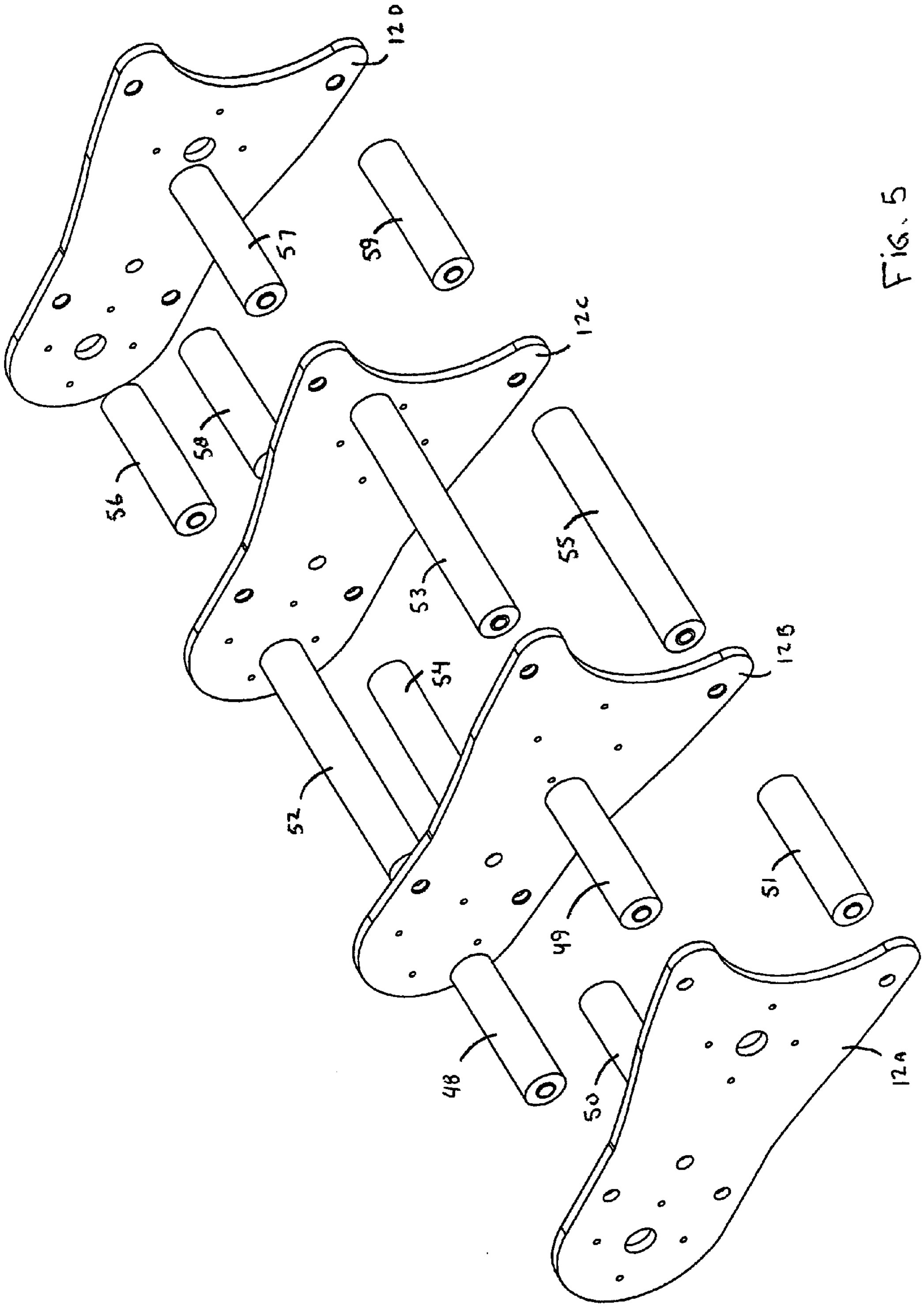
FIG. 5 is an exploded view of the various plates and support frame tubes for the transmission of the invention.

Referring again to FIG. 1 of the drawings, the drive mechanism 230 has a transmission outer cases 12*a* and 12*d* on each side of the drive mechanism 230, and transmission inner cases 12*b* and 12*c* therebetween. FIG. 5 of the drawings shows a perspective view of these transmission cases and the tubular supports holding them together most clearly.

Gear Train Assembly

Figure 4:
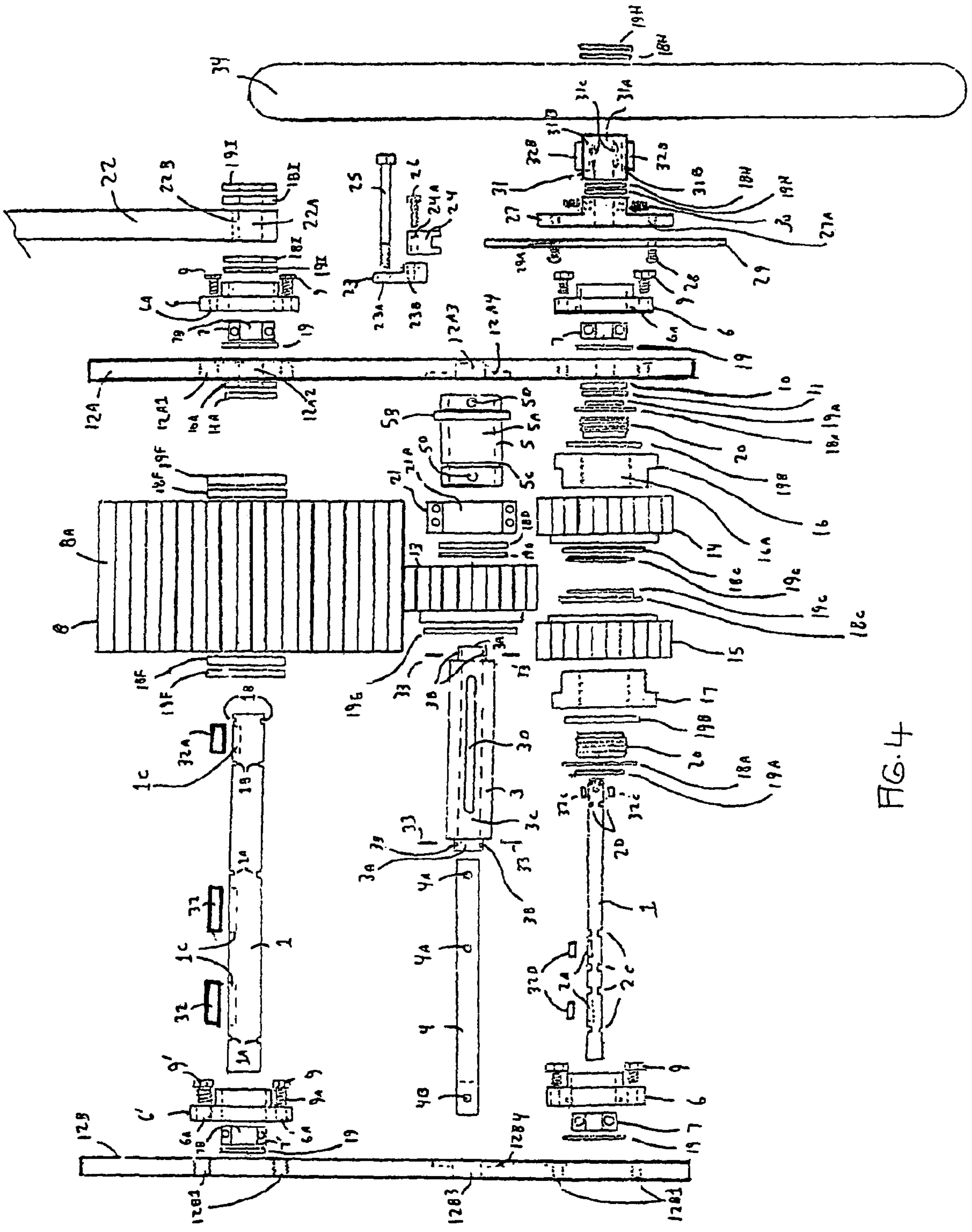
FIG. 4 is an exploded view showing gears, transmission and brakes for use with a wheelchair in accordance with the invention.

Continuing the description now with reference to FIG. 4 of the drawings, there is shown an exploded view which provides a detailed illustration of the workings of one side of the drive transmission 230, representing the right side (but left side is substantially identical mirror image of right) of the wheelchair when the user is seated therein. Thus, in FIG. 4, there is shown the outer transmission case 12*a* and the inner transmission case 12*b*. The rear wheel 34 is shown with the rear tire 34*a* mounted on the rear wheel 34. Furthermore, as has been seen in some of the previous drawings, a part of the arm lever 22 is shown at the point where it connects to the drive mechanism 230. Generally, FIG. 4 shows a detailed exploded view of the parts and components in the drive train between the arm lever 22 and the rear wheel 34, whereby forward and reverse motion of the arm lever 22 drives the rear wheel 34, either in a forward or reverse direction, as selected by the user.

With reference to FIG. 4, it will be seen that the transmission inner case 12*b* and the transmission outer case 12*a* define a compartment 240 for many of the drive components between the arm lever 22 and the rear wheel 34.

The main drive components in the compartment 240 comprise an arm gear 8, a directional gear 13, a reverse drive gear 14 and a forward drive gear 15. The directional gear 13 may be selectively operated by the user so as to create a drive train between the arm gear 8 and the forward drive gear 15, so that operation of the arm lever 22 will drive the wheelchair 200 in a forward direction, and a drive train between the arm gear 8 and the reverse drive gear 14, such that operation of the arm lever 22 by the user will cause the wheelchair, or at least a particular wheel attached to this drive train, to move in the reverse direction.

As will be seen in FIG. 4, an arm axle shaft 1 is provided, upon which is mounted both the arm gear 8 inside the compartment 240, and the arm lever 22 outside of the compartment 240, adjacent the outer wall of the transmission outer case 12*a*. A bearing housing 6 is provided outside the transmission outer case 12*a* and receives the bearing 7, both of which are mounted to the transmission outer case 12*a* by means of bearing housing mounting bolts 9. The arm lever 22 is fastened to the arm axle shaft 1 by means of arm lever to arm axle shaft C-clips 19*i* and arm lever to arm axle shaft washers 18*i*. Forward and rearward movement of the arm lever 22 causes rotation of the arm axle shaft 1 due to the presence of the arm axle to arm lever lock key 32*a* which locks the arm lever 22 to the arm axle shaft 1.

Figure 7:
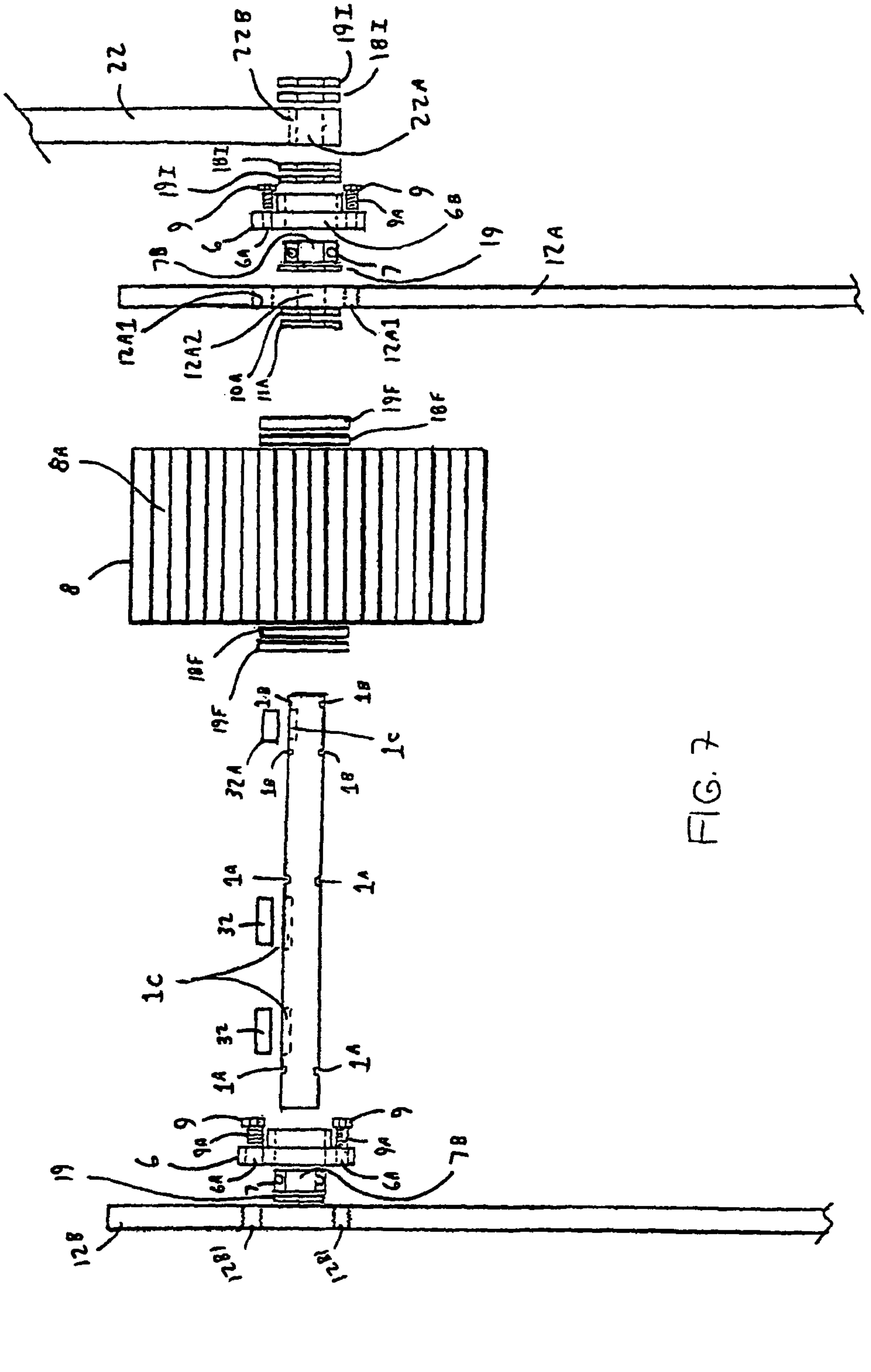
FIG. 7 is an exploded view of the arm gear and associated structures for use with the invention.

The arm gear 8 is mounted about the arm axle shaft 1, and fastened thereto by an arm shaft to arm gear C-clip 19*f*, and an arm shaft to arm gear washer 18*f* is provided. Rotation of the arm gear 8 in response to axial rotation of the arm axle shaft 1 is effected due to the presence of the arm axle to arm gear lock keys 32, as clearly seen in both FIGS. 4 and 7 of the drawings. The arm axle shaft 1 is secured to the transmission inner case 12(*c*) by means of a bearing house 6' and bearing 7', attached to the transmission inner case 12*b* by means of mounting bolts 9'.

With reference to the directional gear 13, this directional gear 13 is mounted about an outer directional shaft 3, which is in turn mounted on an inner directional shaft 4. The one end of the outer directional shaft 4 is received within a sleeve 5 which is fastened to the transmission outer case 12*a*. The other end of the inner directional shaft 4 is appropriately attached to the transmission inner case 12*b*. The directional gear 13 has a bearing 21 held inside the directional gear 13 by means of retaining c clip 19*e*. The bearing 21 is mounted on the sleeve 5 and locked in place by c clip 19*d* and washer 18*d*. The sleeve 5 with bearing 21 and gear is mounted over outer directional shaft 3 which is rigidly mounted between the transmission inner case 12*b* and the transmission outer case 12*a*. The sleeve 5 is directly bolted to inner shaft 4 via bolts 35 which extend through the outer shaft 3 via slots 3*d*.

With respect to FIG. 4 the drive shaft 2 is secured to the wheel using c-clips 19*h* with associated washer 18*h*.

Figure 6:
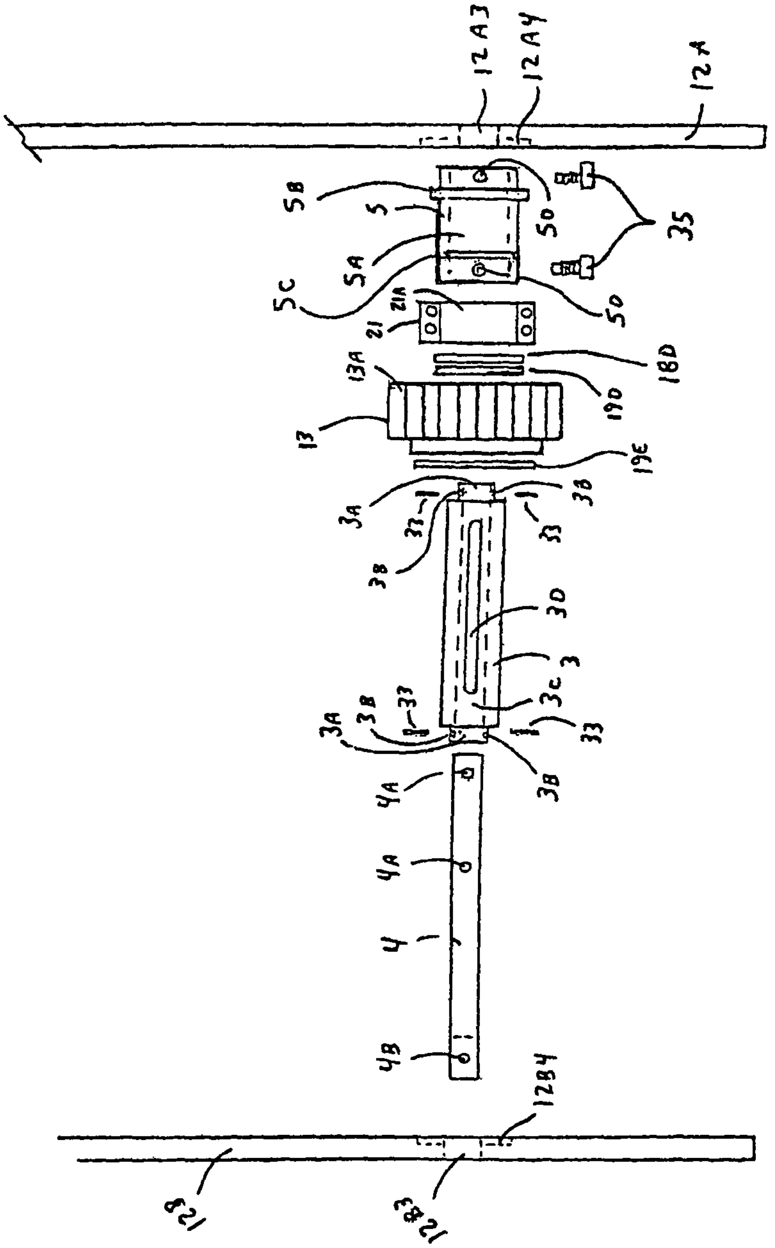
FIG. 6 is a detailed exploded view showing the mounting of the directional gear for use with the invention.

FIG. 6 of the drawings shows a slightly larger detail of the mountings and components relating to the directional gear 13, and attention is thus directed to FIG. 6 of the drawings at this point.

The directional gear 13 is moved axially back and forth along the outer directional shaft 3 by the inner directional shaft 4, the movement being effected by means of a direction shifter operated by the user. This direction shifter will be discussed in further detail below. As will be seen in FIG. 6, a hole 4*a* on the inner directional shaft 4 is used to connect the inner directional shaft 4 to the sleeve 5. The hole 4B also connects to the sleeve 5, and connecting bolts 35 pass through the various apertures or slots 3*d* for securing the inner directional shaft 4 to the sleeve 5. The directional gear bearing 21 is mounted on the sleeve 5 and a C-clip 19*d*, and associated washer 18*d*, locks the bearing 21 on the sleeve 5. Furthermore, C-clip 19*e* locks the directional gear 13 to the bearing 21.

The outer directional shaft 3 itself includes the slot 3*d* to connect the inner directional shaft 4 to the directional gear 13. An inner bore 3*c* is provided in shaft 3 for receiving the inner shaft 4. Extension legs 3*a* are provided on each side of the outer shaft 3, so that the shaft 3 can be attached to the inner and outer case 12*b* and 12*a* respectively, at mounting holes 12*a*3 and 12*b*3. Furthermore, locating pins 33 are provided and are received in pin holes 12A4 and 12B4 formed in the inner and outer case 12*b* and 12*a* respectively. These ensure that the shafts 3 and 4 will not rotate when appropriately installed. As mentioned above, the directional gear 13 can be selectively moved over the outer directional shaft 3 by the user. The directional gear 13 will at all times be in contact with the arm gear 8. However, according to its selected position, it will either be in contact with the forward drive gear 15, or reverse drive gear 14, so as to move the wheelchair forward or back. In moving from one selected position to the other, the directional gear 13 slides over the outer directional shaft 3. The directional gear 13 can also be disengaged completely when positioned between the forward and reverse gears 15 and 14 so as the disconnect the arm gear 8 from the forward and reverse gears 15 and 14.

Figure 8:
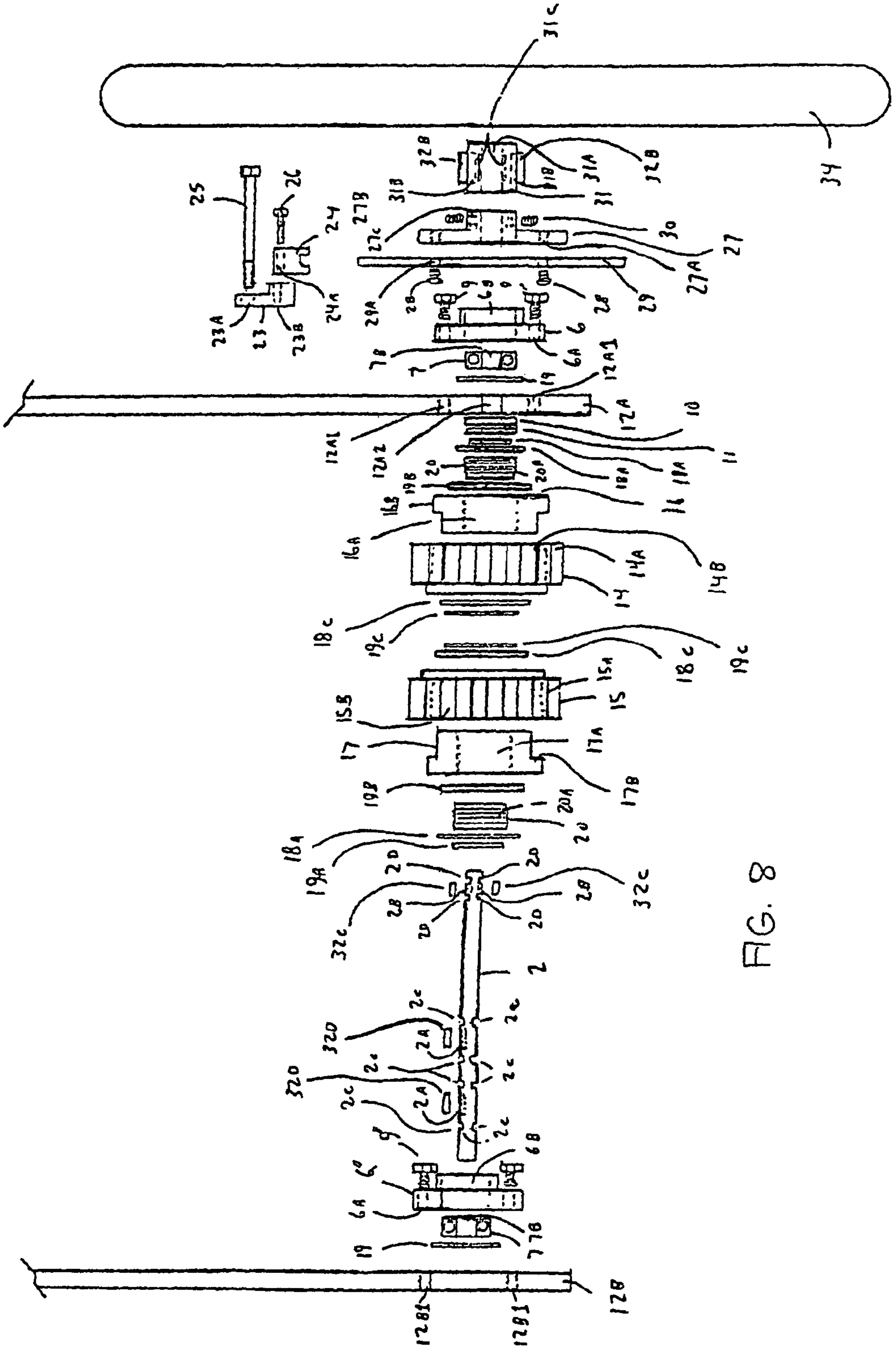
FIG. 8 is an exploded detailed view showing the forward and reverse gears, braking and other components for use with the present invention.

Reference is now made to the mounting structures and function of the forward drive gear 15 and reverse drive gear 14, shown in greater detail in FIG. 8 of the drawings. In FIG. 8 of the drawings, it will be seen that the forward and reverse drive gears 15 and 14 respectively, are mounted about the drive axle shaft 2. One end of the drive axle shaft 2 attaches to the transmission inner case 12*b* by means of a bearing housing 7", and a bearing housing 6", which attach to the transmission inner case 12*b* by means of mounting bolts 9". This is similar to the connections described above with respect to the arm axle shaft 1.

The opposing end of the drive axle shaft 2 attaches to the wheel 34 through appropriate linkages, as will be described.

The forward drive gear 15 is mounted on a forward gear free wheel 17, having a threaded bore 17*a*. The threaded bore 17*a* receives the sleeve 20 with outer thread 20*a*, and the forward drive gear 15 is connected by drive gear outer C-clips 19*a* and associated washers 18*a*. The forward drive gear 15 has of course a series of gear teeth 15*a* which engage corresponding gear teeth on the directional gear 13.

Further, outer C-clips 19*a* and associated washers 18*a* fasten the forward drive gear 15 onto the drive axle shaft 2. Rotation of the forward gear 15 in response to axial rotation of the drive axle shaft 2 is effected due to the presence of the drive axle to forward directional gear lock keys 32*d*, as clearly seen in FIG. 4 and FIG. 8 of the drawings.

The reverse drive gear 14 is similarly mounted with substantially identical components onto the drive shaft 2, including a reverse gear freewheel 16, as well as washers and c clips.

Reference is now made to FIG. 8 of the drawings, and to particularly those components outside of the transmission outer case 12*a*, comprising the braking components, and the mechanism for connecting the drive axle shaft 2 to the wheel 34.

A rear wheel hub 31 is provided as associated with the rear wheel, and attaches to the drive axle 2. Lock keys 32*b* are provided for locking the rear wheel hub to the wheel 34. Keyway grooves 31*b* receive the lock keys 32*b*. Also on the hub 31 there are formed keyway grooves for securing the hub 31 to the drive axle 2.

A brake system is provided for the user to provide braking force to the wheels in order to slow or stop the wheelchair 200. The brake system comprises a disc brake rotor 29. The disc brake rotor 29 is secured to a drive axle mount 27, which has an internal bore 27*b* through which the drive axle 2 passes to connect with the rear wheel hub 31. The disc brake rotor 29 is secured to the mount 27 by means of mount bolts 28.

Between the disc brake rotor 29 and the transmission outer case 12*a* there is located a bearing housing 6'", connected to a bearing 7'", a structure similar to other mounts already described above.

The disc brake rotor 29 is engaged by a disc brake caliper 24, which is in turn fastened to a disc brake caliper mount 23. A bolt 26 mounts the caliper 24 to the caliper mount 23. Further details of the brakes, cables and application thereof are described below.

It will, therefore, be seen that the drive axle shaft 2 mounts both the forward and reverse drive gears 15 and 14, and also engages the disc brake rotor 29 before engaging the hub 31. Importantly, it will be observed from the presence of the gear freewheel to drive axle mountings 20 and the threads 20*a* around the outside of mountings 20 that each of the forward and reverse drive gears 15 and 14 respectively are able to spin freely in one rotational direction, while engaging the drive axle shaft 2 in the other rotational direction. It will of course be appreciated that the direction of free wheel rotation is opposite in each of the forward and reverse drive gears 15 and 14 respectively so as to facilitate desired forward and reverse motion of the wheelchair.

To summarize the operation of the propulsion mechanism from the arm lever 22 to the rear wheel 34, it will be appreciated that the arm lever 22 can be moved back and forth by the user so as to rotate the arm gear 8. The arm gear 8 in turn engages the directional gear 13, and the directional gear 13 is selectively engaged to either the forward drive gear 15 or the reverse drive gear 14. Depending upon which of these forward or reverse drive gears 15 or 14 is engaged by the directional gear 13, the fore and aft motion of the arm lever will either drive the rear wheel 34 to move the wheelchair forwards or backwards. The directional gear 13 itself can be moved over the outer directional outer shaft 3 so as to selectively engage either the forward drive gear 15 or the reverse drive gear 14. While the chair is engaged in the forward position, moving the arm lever forward ultimately rotates the drive axle in a manner that moves the wheelchair forward, and the freewheel inside the forward directional gear while engaged directionally to move the chair forward free spins with no engagement and thus no forward movement when the arm lever is pulled back towards the user. When the user again pushes the arm lever 22 away, the arm gear 8 through the directional gear 13 to the forward drive gear 15 moves the wheelchair forward. The same process is in effect but in the reverse direction when the reverse directional gear is engaged and the freewheel in the engaged direction rotates the drive axle 2 in a direction that moves the wheelchair backwards and is motivated by the user pulling the arm lever towards him/herself and the freewheel inside the reverse directional gear 14 while engaged directionally to move the chair backwards free spins with no engagement and thus no backward movement when the arm lever is pushed away from the user. When the user again pulls the arm lever 22 towards him/herself, the arm gear 8 through the directional gear 13 to the reverse drive gear 14 moves the chair backwards.

Direction Gear Operation and Structure

Reference is now made to FIGS. 9 to 13 of the drawings which show the various mechanisms and operation for moving the directional gear 13, the position of which in turn determines forward or rearward motion of the wheelchair.

Figure 9:
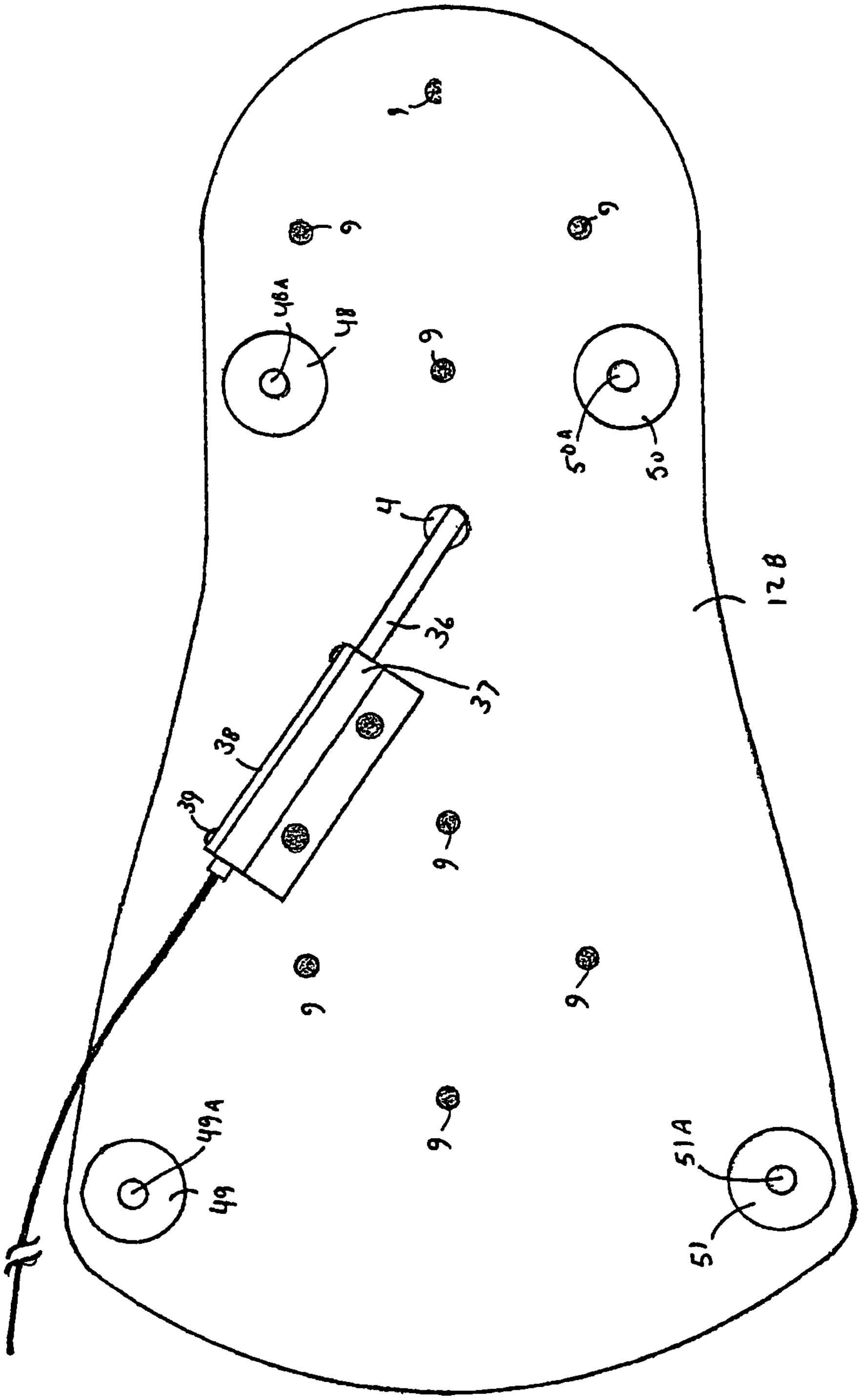
FIG. 9 is a side view of a plate showing a gear shift linkage case.
Figure 10:
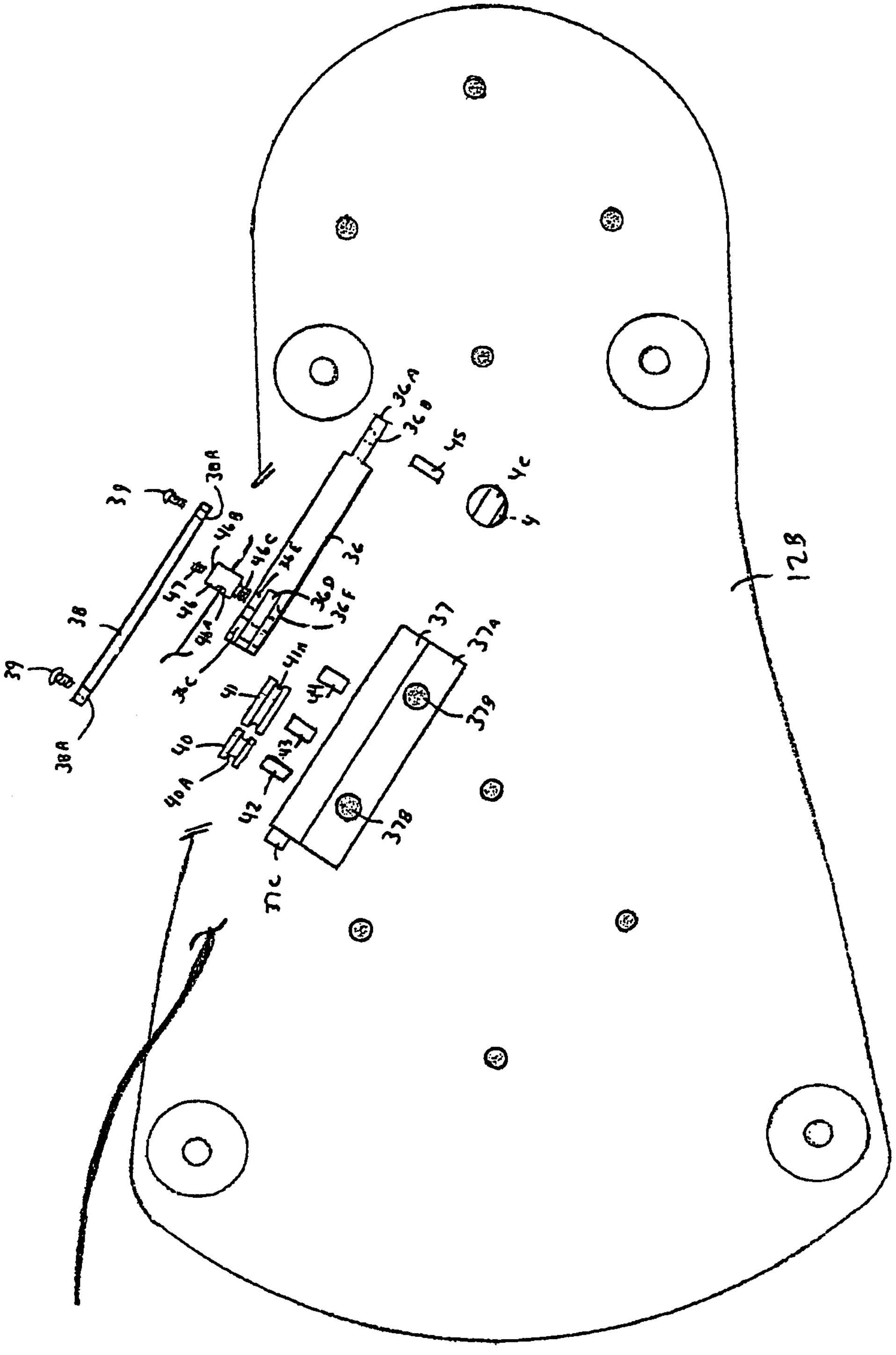
FIG. 10 is a view similar to that shown in FIG. 9 with the linkage case in exploded view.

As will be appreciated from the previous description, and particularly FIGS. 4 and 6 of the drawings, the directional gear 13 moves over the outer directional shaft 3. The movement of the directional gear 13 is in fact determined by adjusting the axial position of the inner directional shaft 4, which slides axially, bringing the directional gear 13 along with it, to engage the forward drive gear 14 or the reverse drive gear 14. In FIG. 9 of the drawings, there is shown a view of the cables, referenced as numeral 60, which at one end connect to a shift mechanism whereby the operator of the wheelchair can move the cables. At the other end, the cables 60 extend into a linkage case 37, which has a linkage case lid 38, and which is secured to the transmission inner case 12*b* (or 12(*b*)) by mounting bolts 37*d*.

The cables 60 connect to an arm lever 36 which has opposing access slots 36*d*. The end of the cables 60 are received within these access slots 36*d*. The cables 60, inside the linkage case 37, are guided over pulleys 40 and 41 which have grooves 40*a* and 41*a* to receive and guide the cables 60. The pulleys 40 and 41 are mounted within the linkage case 37 by means of appropriate pivot pins 42 and 43. Furthermore, the arm lever 36 is mounted on pivot pin 44, which is received in pin hole 36*c*, and the arm lever 36 pivots about the pivot pin 44 in response to motion of the cables 60, as will be described.

It will be seen that the arm lever 36 has one end to which the cables attach, within the linkage case 37, and an extending arm which projects outside the linkage case 37, and pivotally attaches to the inner shaft 4 at shaft pin 45.

Figure 11:
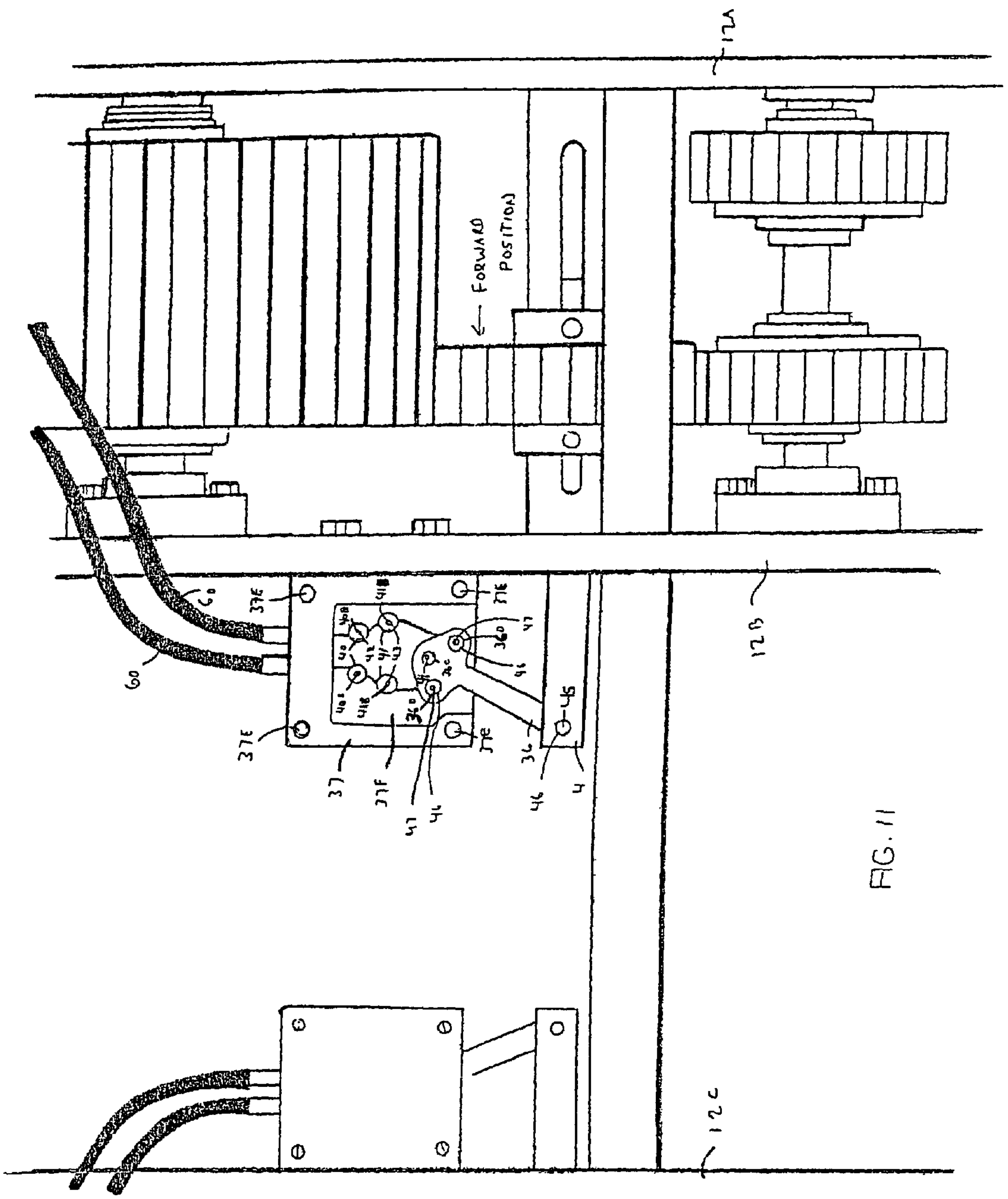
FIG. 11 is a view showing linkage cases and association thereof with the directional gear.
Figure 12:
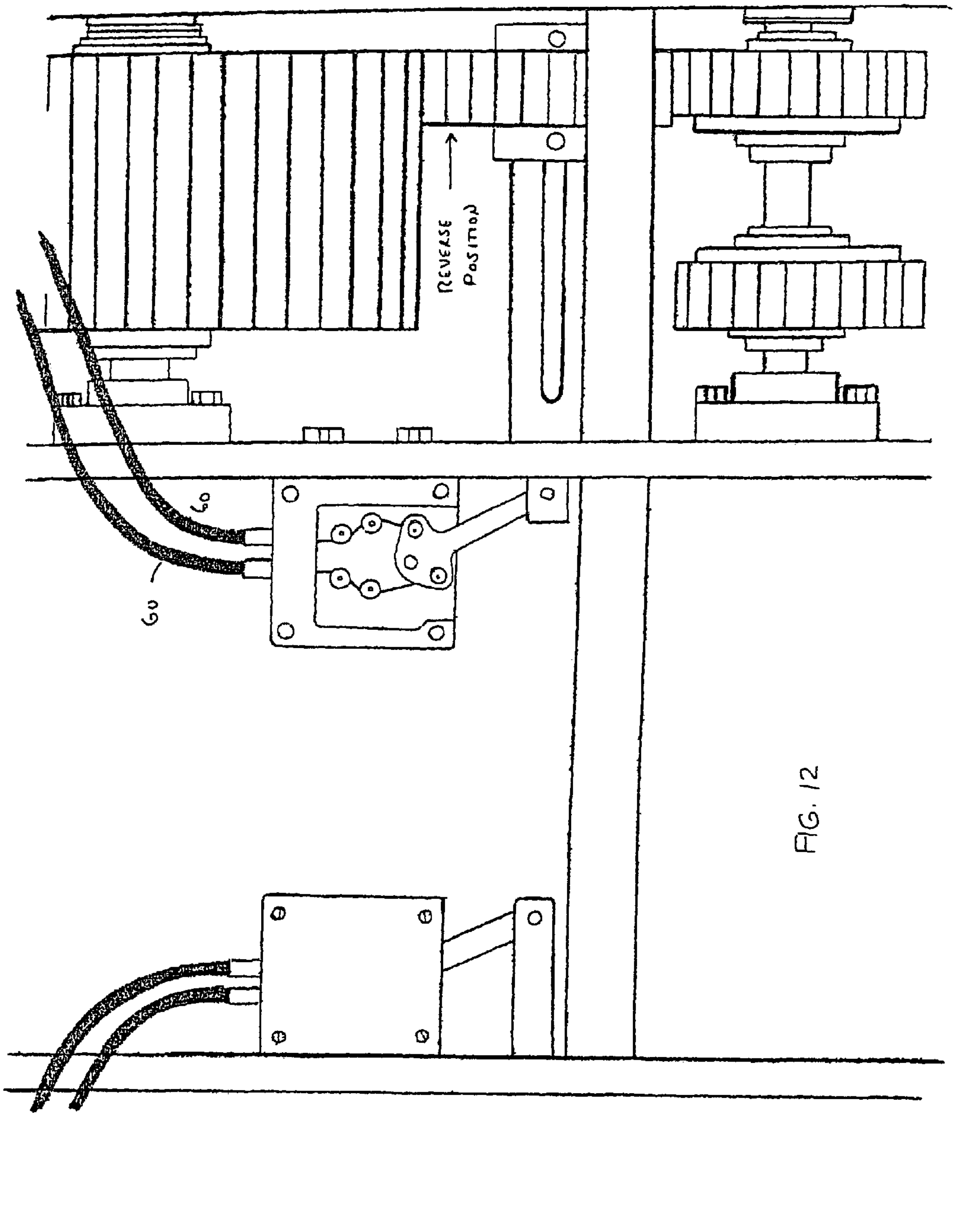
FIG. 12 is a view similar to that in FIG. 11, but with the gear in the reverse position.

At this point, reference is best made to FIGS. 11 and 12 of the drawings, which show detailed views of the linkage case 37 in section, for both sides of the gear transmissions, each of these figures in turn showing the inner shaft 4 in different positions. With reference to FIG. 11, it will be seen that when the directional cable 60 is pulled so as to move out of the linkage case 37, the cable causes the arm lever 36 to pivot about the pivot hole 36*c* such that the access slot 36*d* on the left hand side is pulled up, causing the lever arm 36 to move to the left. This movement of the lever arm 36 causes the inner shaft 4 to slide to the left, or into the space between the transmission inner cases 12*b* and 12*b*. This is best illustrated in FIG. 11. The inner shaft 4 slides within the outer directional shaft 3. The bolts 35 thread into sleeve 5 and extend through the outer shaft 3 via slots the 3*d* and engage the inner shaft via openings 4*a*. Thus, when inner shaft 4 is actuated by connection to arm lever 36 which is actuated by operator operating the cable 60, the directional gear 13 engages forward drive gear 15, as shown in FIG. 11 of the drawings. The bolts 35 are able to move laterally within the slot 3*d*, and, therefore, as the inner shaft 4 moves axially, so it will be able to move the directional gear 13 within the confines provided by the dimensions of the slot 3*d*. These dimensions are sufficient to move the inner shaft 4 from the position shown in FIG. 11 to that shown in FIG. 12, when the action on the cables 60 is reversed. As the inner shaft 4 moves within the outer directional shaft 3, the directional gear 13 is moved correspondingly and changes its engagement from the forward drive gear 15 to the reverse drive gear 14. In this way, appropriate driving of the wheelchair 200 by fore and aft movement of the arms 22 will result in a change of direction due to this altered gear engagement and configuration from forward to reverse or vice versa.

Figure 13:
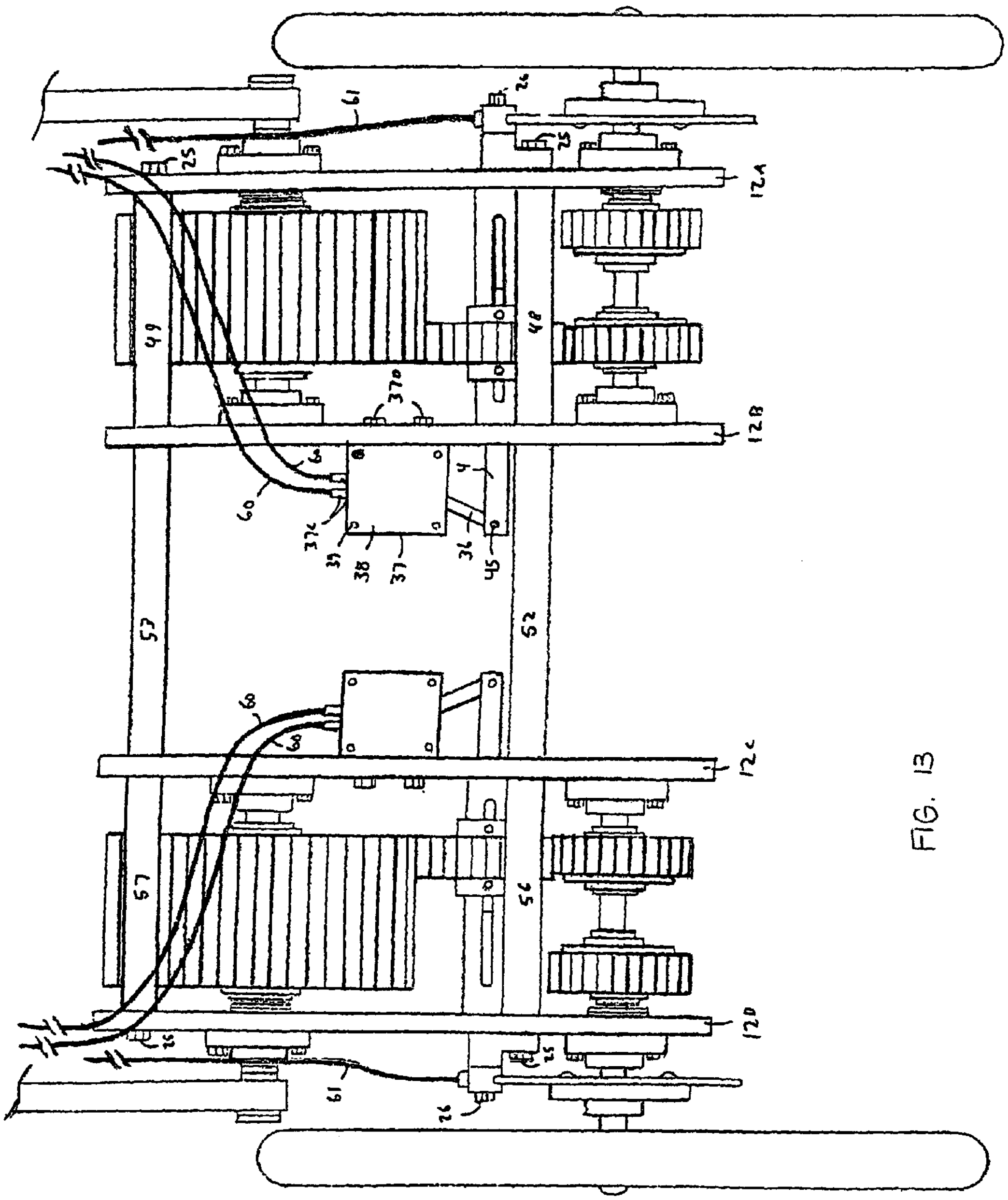
FIG. 13 is an assembled view of the transmission and linkage system, including brake and wheels.

FIG. 13 offers a detailed overview of all of the components on both sides of the drive mechanism 230, and the setting of the linkage case 37 and arm lever 36 is obviously configured so that the relevant drive gear position is established on both sides of the wheelchair to ensure that forward, reverse or turning movement is established.

It should also be appreciated that the position of the arm lever 36 and the two inner shafts 4 (one associated with each of the wheels) can be configured in various formats. In one situation, the drive gear 13 will contact the forward drive gears 15 on both sides. In another configuration, the drive gear 13 will engage the reverse drive gears 14 on both sides. In yet another configuration, the drive gear 13 on one side will engage the forward drive gear 15, while it will engage the reverse drive gear on the other. The opposite configuration is also true. Yet another configuration would be where the drive gear 13 engages either the forward or reverse drive gear 15 or 14 on one side of the wheelchair 200, but on the other side, the drive gear 13 may be positioned between the forward drive gear 15 and the reverse drive gear 14 so that there is no engagement at all.

Figure 14:
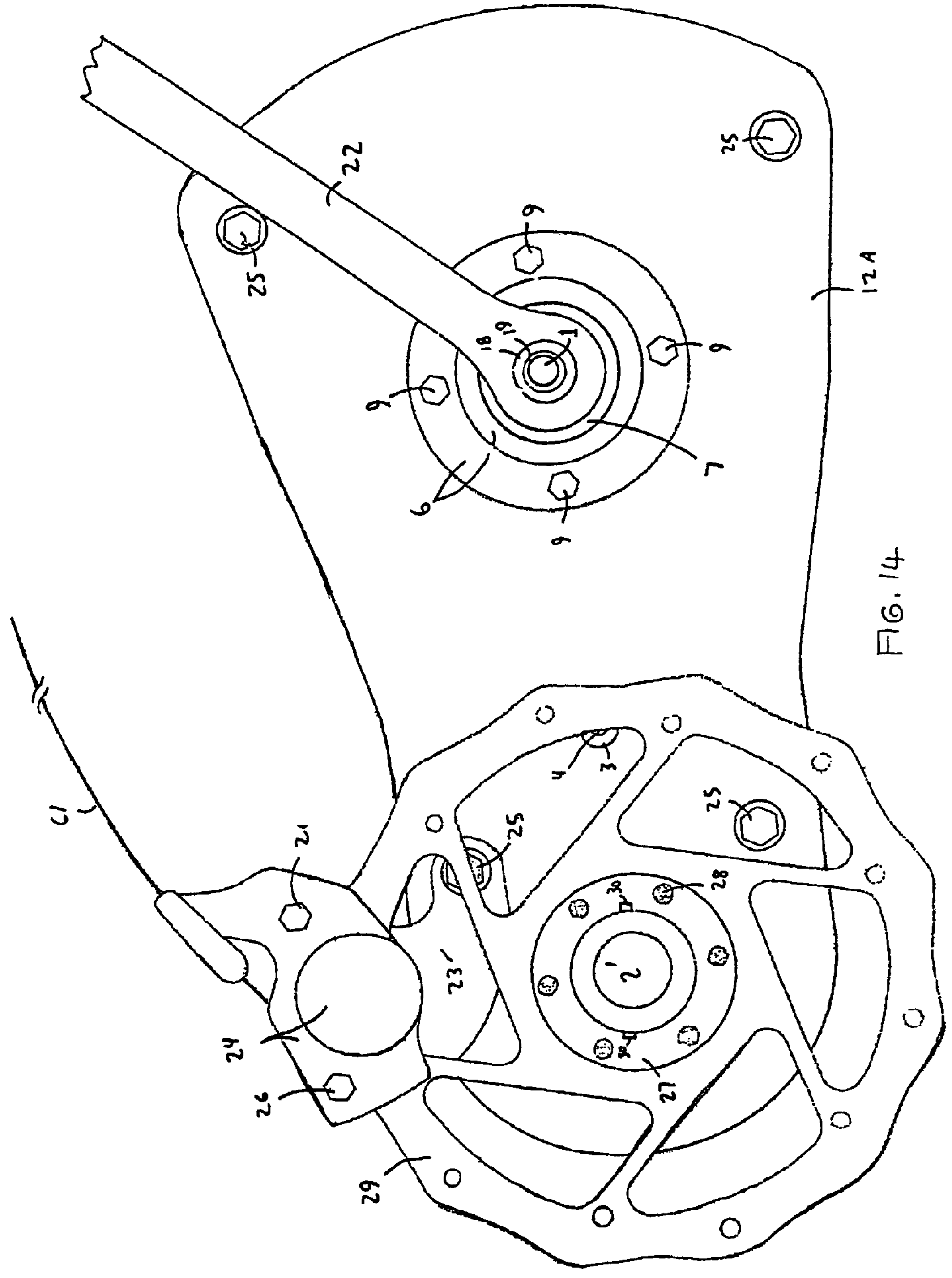
FIG. 14 is a side view showing part of the arm lever and the braking system.

Reference is now made to FIG. 14 of the drawings which shows a detail of a part of the arm lever 22 and disc brake operating mechanism. The arm lever 22 is mounted on the arm axle shaft 1. The arrow 22*a* shows how the arm lever, to be described in further detail below, can be moved forward and aft to drive the transmission.

Also shown in FIG. 14 is an end on view of the brake system, including the disc brake rotor 29 and the disc brake caliper 24. The disc brake caliper 24 is mounted with bolts 26. It can be seen that the disc brake rotor 29 is also mounted on the drive axle shaft 2, the structure of which is clearly illustrated in the drawings. Axle lock screws 30 on opposite sides of the axle shaft 2 are shown.

A cable 61 is provided with a cable operating handle, activated by the user as will be described, while the opposing end of the cable engages the disc brake caliper 24. Operation of the disc brake caliper 24 causes engagement with the disc brake rotor 29, which in turn slows down or alternately stops rotation of the drive axle shaft 2, and hence the wheel 34. The disc brake caliper 24 and rotor 29 generally operate in an otherwise conventional fashion.

Figure 15:
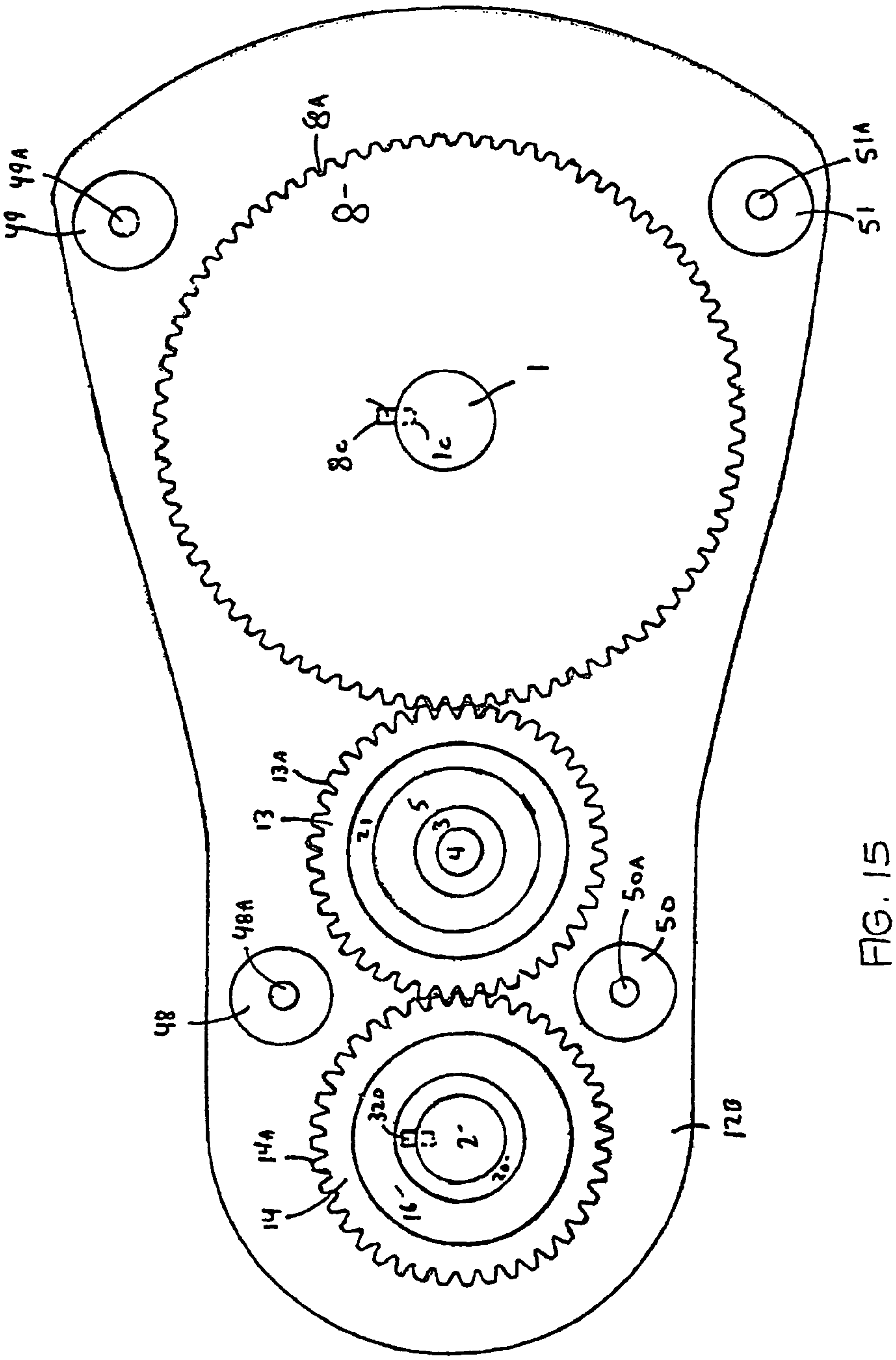
FIG. 15 is a side view showing the various gears used in accordance with the invention.

In FIG. 15 of the drawings, a side view of the various gears is shown. On the right side, and activated by the arm lever 22, is the arm gear 8, having arm gear teeth 8*a*, and an inner bore 8*b*. A keyway groove 1*c* facilitates the proper connection between the arm axle shaft 1 and the arm gear 8.

The arm gear 8 drives the directional gear 13, having directional gear teeth 13*a*. The shaft sleeve 5 can be seen, and the gear bearing 21 is located between the directional gear 13 and the shaft sleeve 5. The shaft sleeve 5 is mounted on the outer directional shaft 3, which is in turn on the inner directional shaft 4, the structure and operation therebetween having already been described above.

In FIG. 15 of the drawings, the reverse drive gear 14 is shown with reverse drive gear teeth 14*a*. The reverse gear freewheel 16 is shown, upon which the reverse drive gear 14 is mounted, and the freewheel 16 is mounted on the sleeve 20. The sleeve 20 itself is mounted on the drive axle shaft 2, and a lock key 32*d* ensures the appropriate connection therebetween.

Figure 16:
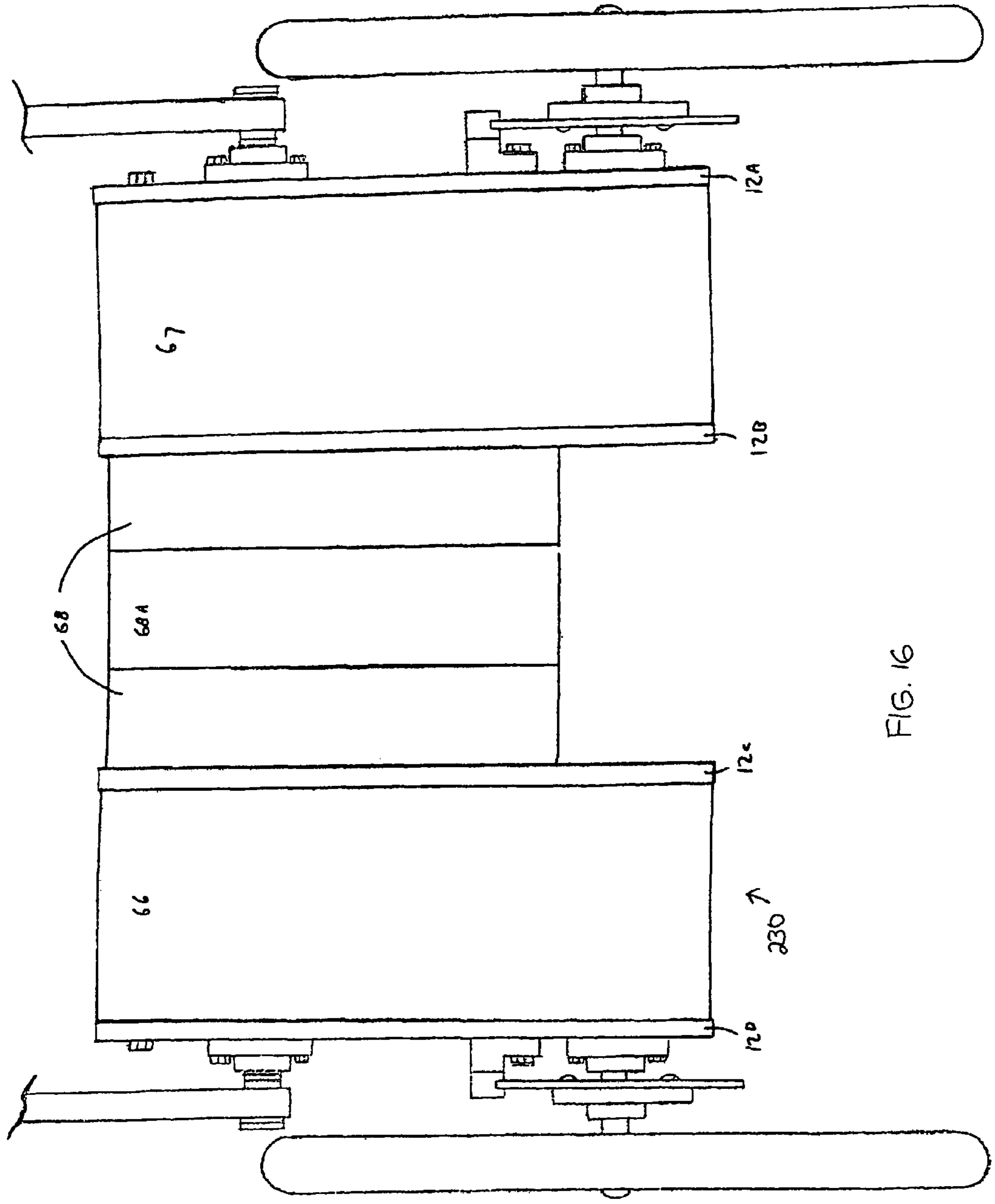
FIG. 16 is a front view of the transmission system with cover plates thereon.
Figure 17:
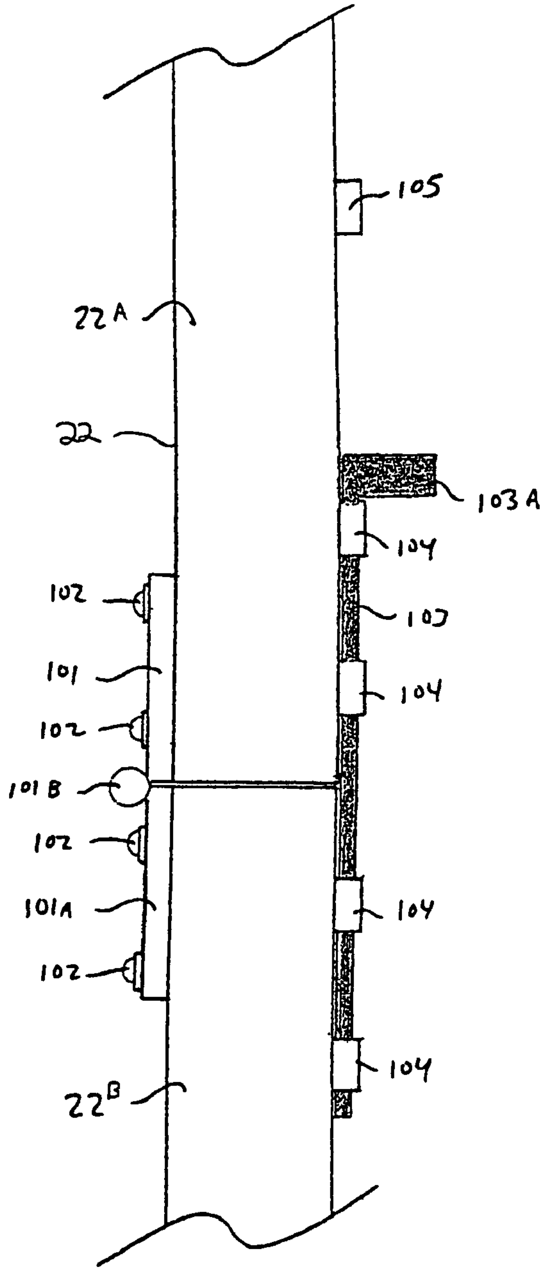
FIG. 17 is a view of the arm when in the extended position.

FIG. 16 of the drawings shows a view similar to that in FIG. 13 of the drawings, but the drive mechanism 230 has the appropriate covers. There is shown a left side transmission cover 66, a right side transmission cover 67, and a main frame to transmission frame mounting structure 68. An alignment groove 68*a* is provided. With the various covers, the gears, shafts, and other operating components are shielded, which not only protects them from dust, dirt and other debris, but also operates as a safety barrier to ensure that the user or extraneous objects do not become ensnared in the drive train mechanism.

Arm Lever and Associated Structures

FIGS. 17 to 30 of the drawings show further details of the arm lever 22, and its associated structures. There is provided an upper arm lever 22*a* and a lower arm lever 22*b*, connected by hinge plates 101 and 101*a* and held together at hinge pivot pin 101*b*. The hinge plates 101 are secured to the arm 22 by means of bolts 102. On the side opposite that of the hinge plate 101, there is formed a lock shaft 103 which slides in a series of guides 104. The lock shaft 103 has a lock shaft tab 103*a*, so that the upward movement of the lock shaft 103 within the guides 104 is limited by its engagement with the stop 105.

Figure 18:
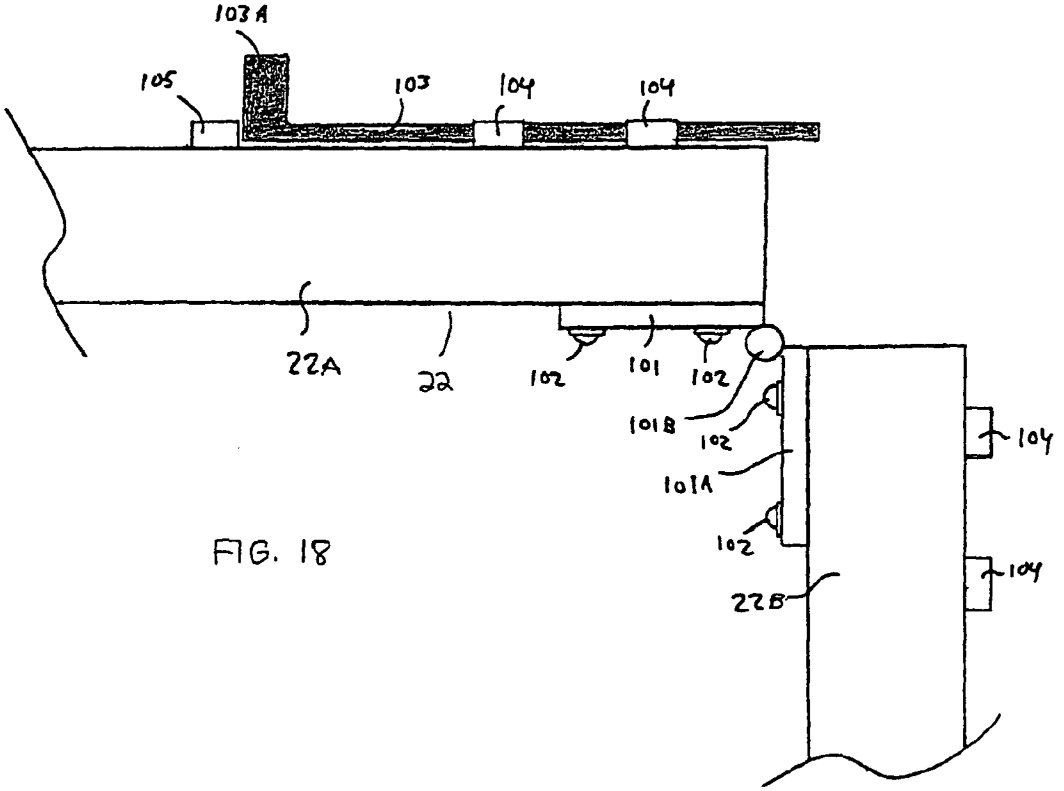
FIG. 18 is a view of the arm when in the folded or partly folded position.

In order to fold the upper arm 22*a* relative to the lower arm 22*b*, the lock shaft 103 is raised until the lower end thereof has passed through all of the guides 104 on the lower arm 22*b*. The upper arm portion 22*a* can then be pivoted about the hinge 101*b*, as shown in FIG. 18 of the drawings. In this way, the arms 22*a* and 22*b* can be folded so as to occupy less space, and make it easier for the storage and transport of the wheelchair 200.

Figure 19:
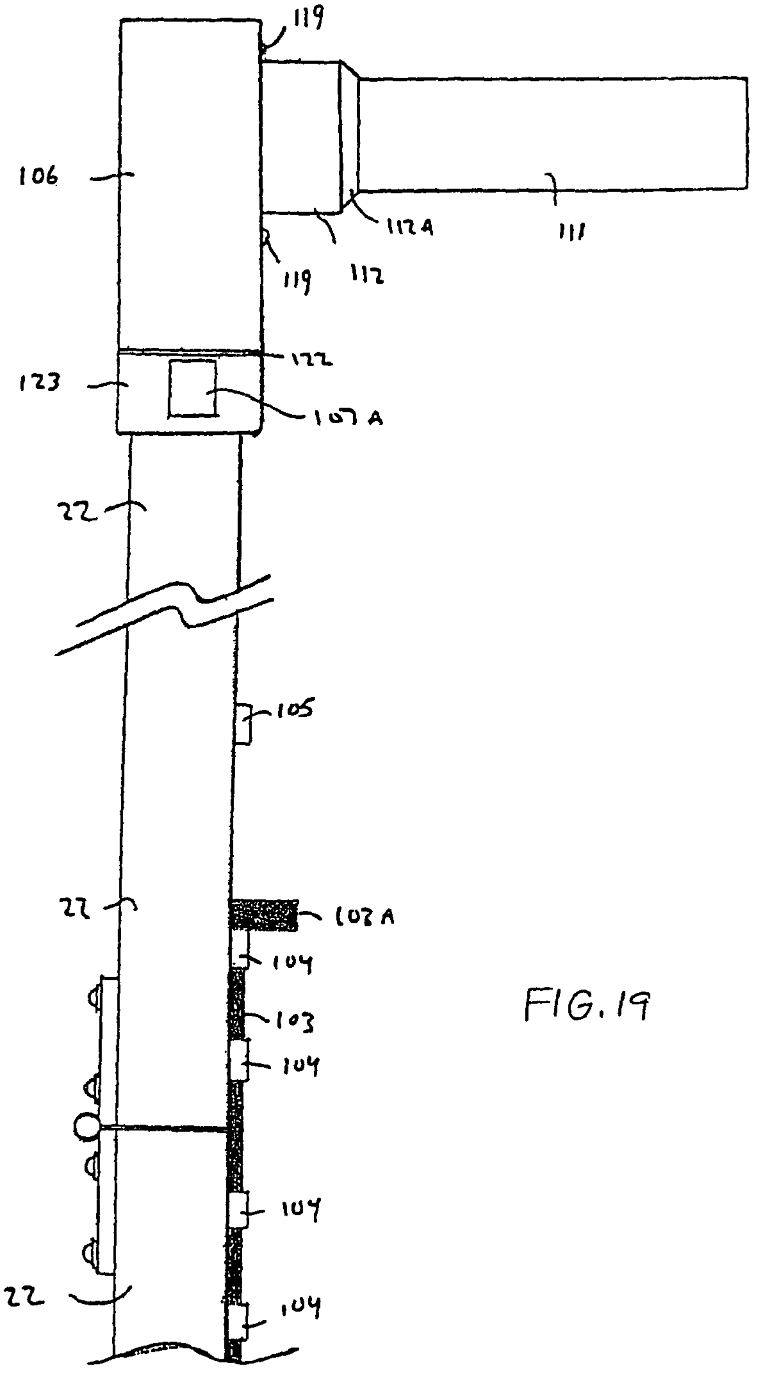
FIG. 19 is a rear view of the arm and handle for use with the invention.
Figure 20:
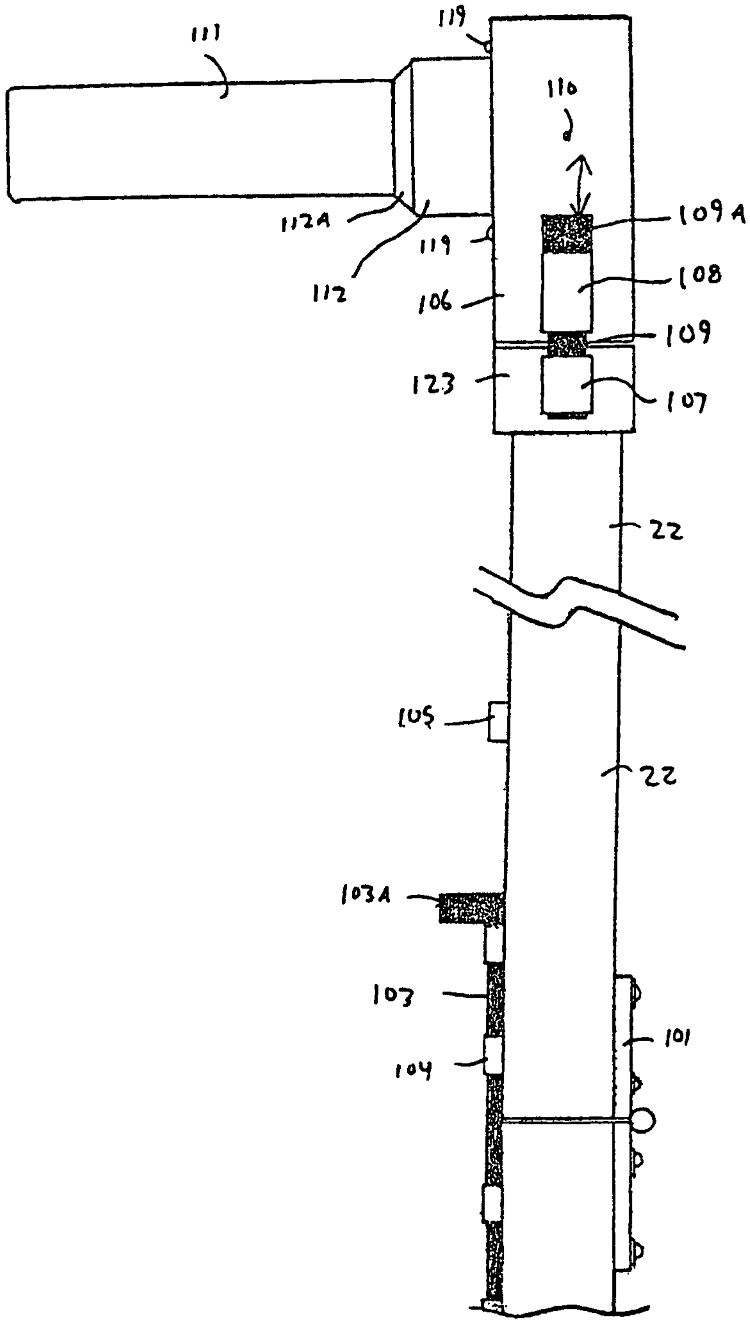
FIG. 20 is a front view of the arm and handle in accordance with one aspect of the invention.

FIGS. 19 and 20 show a rear view and a front view of the upper part of the arm 22 with a hand grip 111. The hand grip 111 has a hand grip gear shift activation sleeve module 112, by means of which gear shifts may be made by rotation of the hand grip 111, as will be described. It will be seen in FIG. 20 that a lock shaft 109 is provided which slides in an upper shaft guide 108 and a lower shaft guide 107. The limit of movement of the lock shaft 109 is controlled by the provision of a stop 110. When the guides 108 and 107 are in axial alignment, and the lock shaft 109 passes therethrough, rotation of upper pod 106 and lower pod 123 is prevented. The upper pod 106, and handle 111 can be rotated by sliding the lock shaft 109 upward out of the guide 107, and rotating the handle 111. Once rotated, as is seen in FIG. 19, the lock shaft 109 will be able to engage with the guide 107*a* on the opposite side, so that the hand grip 111 can be locked in a folded position when stored or transported.

Figure 22:
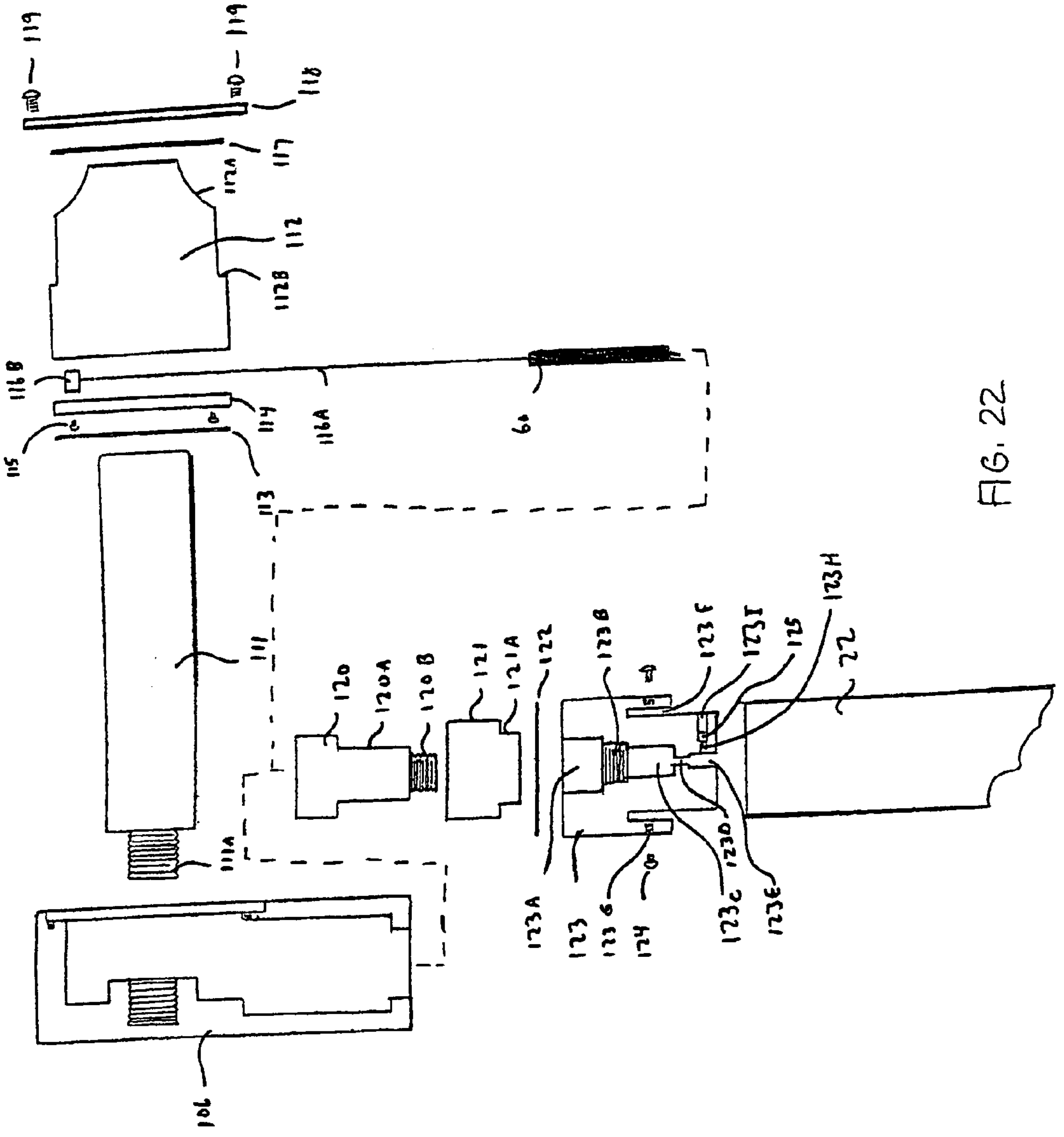
FIG. 22 is an exploded view of the component shown in FIG. 21 of the invention.

In FIG. 22 of the drawings, it will be seen that the gear shift activation sleeve 112 is mounted to the upper pod 106, and a Teflon washer 117 sits between shoulder 112*b* and cover plate 118. The cover plate 118 holds the activation sleeve 112 in place inside the upper pod 106, and screws 119 fasten the cover plate 118 to the upper pod 106.

Figure 23:
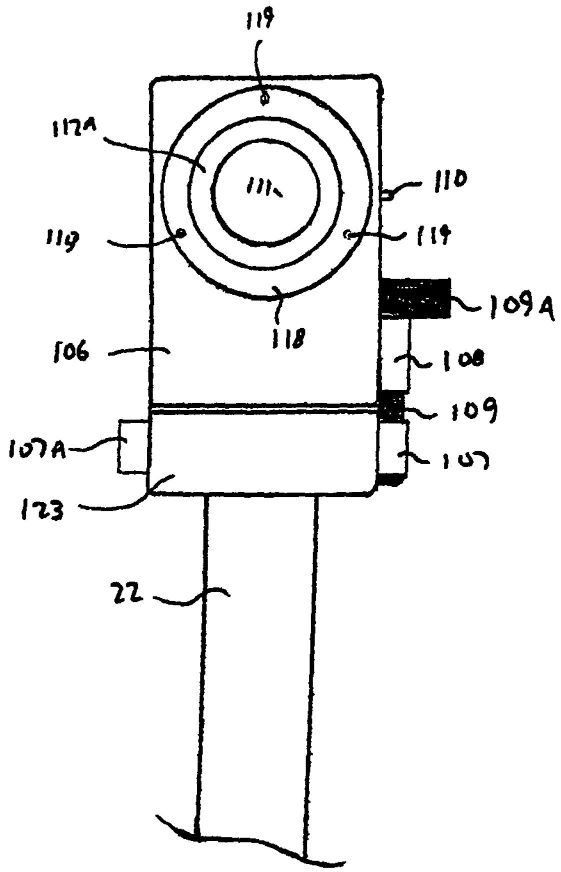
FIG. 23 is a view of the handle showing locking thereof in the unfolded position.
Figure 24:
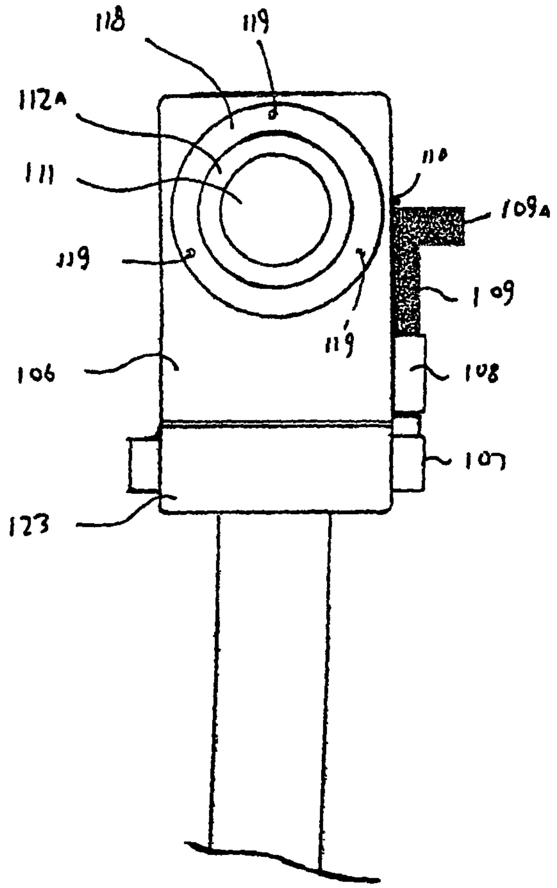
FIG. 24 is a view similar to that in FIG. 23 with the lock mechanism open.
Figure 25:
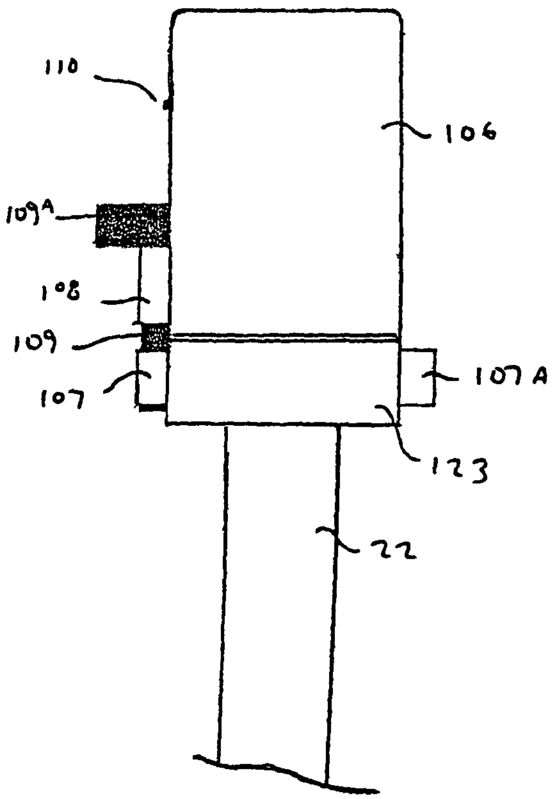
FIG. 25 is a view of the handle when rotated into the folded position.

In FIGS. 23, 24 and 25 of the drawings, opposing end views of the arm and handle, as shown in FIGS. 19 and 20, can be seen.

Figure 21:
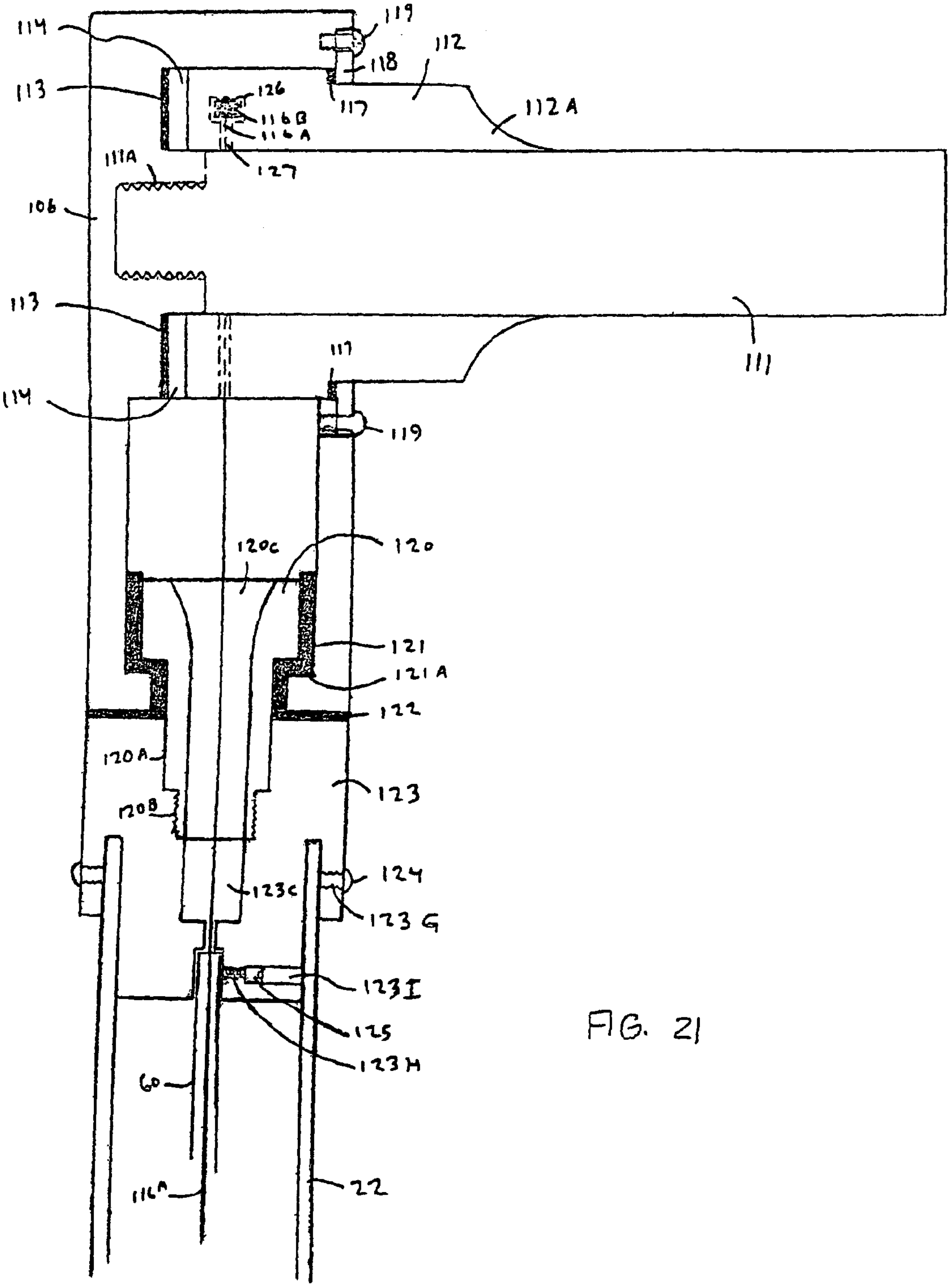
FIG. 21 is a sectional view through a part of the arm and handle showing gear cable connection.

With reference to FIGS. 21 and 22, there is shown a cross-section and exploded view respectively of the arm 22 and hand grip mechanism 111, and the operation whereby rotation of the hand grip gear shift activation sleeve module 112 has the effect of moving the cables 60, discussed in previous drawings, so as to effect the change of gear engagement for forward and rearward movement, turns and general direction control of the wheelchair 200.

As previously described, the hand grip 111 attaches to the upper pod 106 and the gear shift activation sleeve attaches to hand grip 111, as clearly shown in FIG. 21 of the drawings. A cover plate 114 is provided, and spacer/washers facilitate movement. The hand grip 111 attaches to the upper pod 106 which is hollow, which in turn is attached to the lower pod 123. In order to enable rotation of the upper pod relative to the lower pod, for folding as described above, a Teflon® washer 120, including a shoulder 121*a*, is provided to eliminate resistance between upper pod 106 and upper to lower hand grip assembly pods bolt 120. The lower pod 123 in turn attaches to the arm 22, also hollow, and in which the cables 60 are appropriately directed to the linkage case 37, as illustrated in FIG. 9 of the drawings.

It will be appreciated that the position of the cables 60 within the pods 106 and 123, and their connection to the activation sleeve 112, allows rotation through operation of the upper to lower hand grip assembly pods bolt 120 while at all times keeping the cable axially in the same position, so as to prevent twisting or snarling thereof.

FIG. 22 of the drawings shows some of the structure allowing proper positioning of the cable. First, the walls of the arm lever are received within the arm lever mounting recesses 123(*f*) to ensure appropriate axial alignment. An internal passage 123*c* including a cable passage 123*d* and an internal gear shift cable case mounting area 123*e* allow appropriate cabling. The arm 22 is itself secured to the lower pod by appropriate fastening screws 124.

Figure 26:
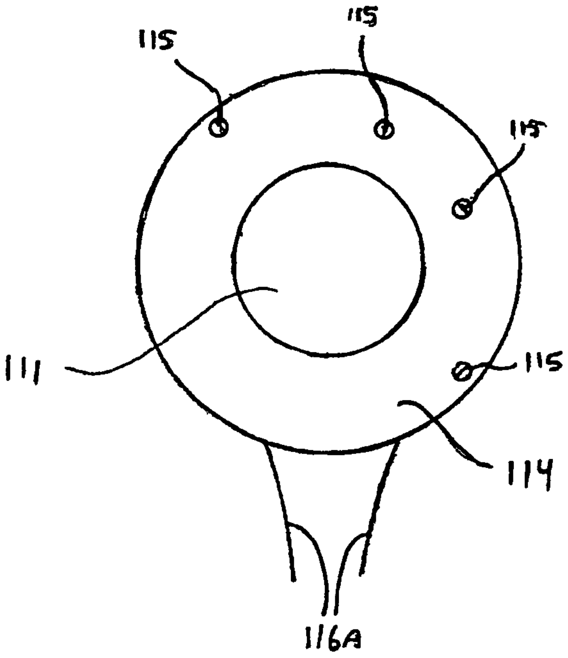
FIG. 26 is an end view of the handle.
Figure 27:
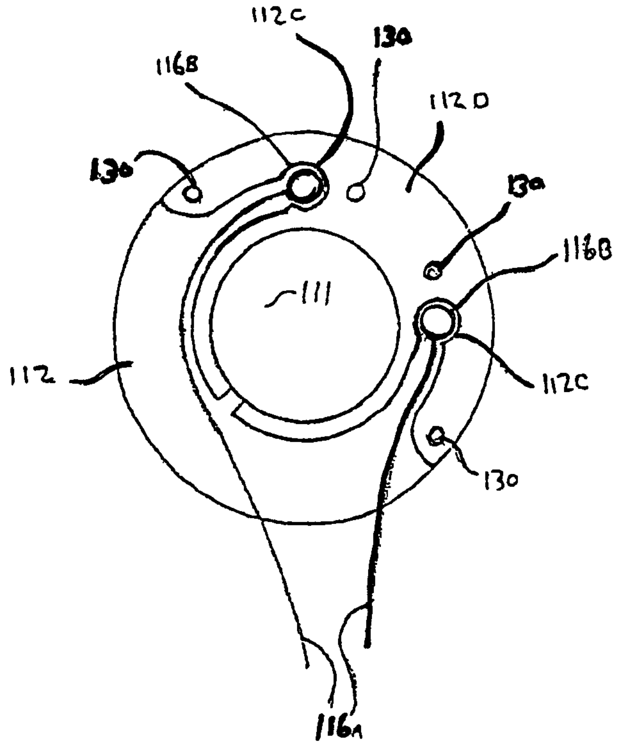
FIG. 27 is a sectional view through the handle showing the cables in the first drive position.
Figure 28:
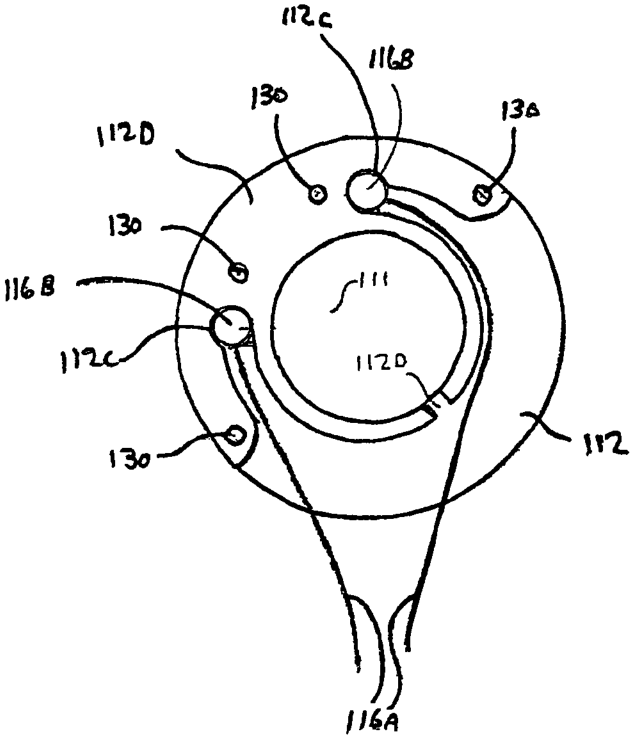
FIG. 28 is a view similar to that in FIG. 27, but with the cables moved so as to place the directional gear in the reverse position.

FIGS. 26 to 28 of the drawings show movement of the hand grip gear shift activation sleeve module 112 activating the cables to change gears. FIG. 26 is a back view (FIG. 23 provides a front view and FIG. 22 shows the back side of the sleeve 112 and its cover 114) showing the hand grip 111 and the cover plate 114. Fastening screws 115 are provided, and the gear shifting cables 116*a* emerge from the hand grip assembly.

In FIGS. 27 and 28, the same view is shown but with the cover plate 114 removed. FIG. 27 shows the cable in the first and drive position, while FIG. 28 shows the hand grip gear shift activation sleeve module 112 position which changes the directional gear which is effected by the cable movement into the reverse position. In FIGS. 27 and 28, the cables 116*a* enter the activation sleeve module 112, and each of the cables has a cable end 116*b* to ensure a secure connection. As will be seen in FIG. 28, the hand grip gear shift activation sleeve module 112 has been rotated approximately a one quarter turn, and the cables' positions have been adjusted. As the cables move from their positions, as shown in FIGS. 27 and 28 respectively, direction gear 13 is moved by the inner shaft 4 as a result of arm lever 36 movement, as has been clearly illustrated and described in FIGS. 11 and 12 of the drawings.

Figure 29:
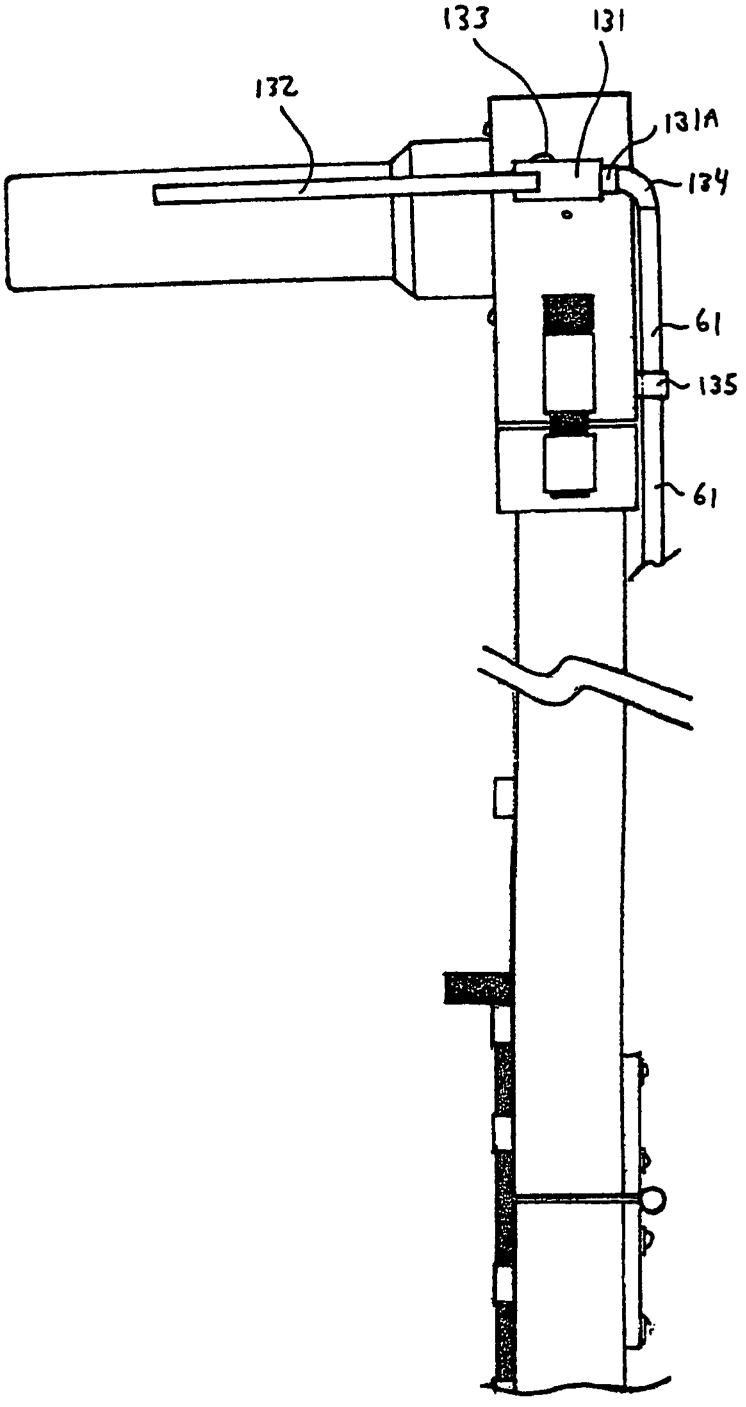
FIG. 29 is a view of the hand grip and arm showing the brake lever system in accordance with one aspect of the invention.
Figure 30:
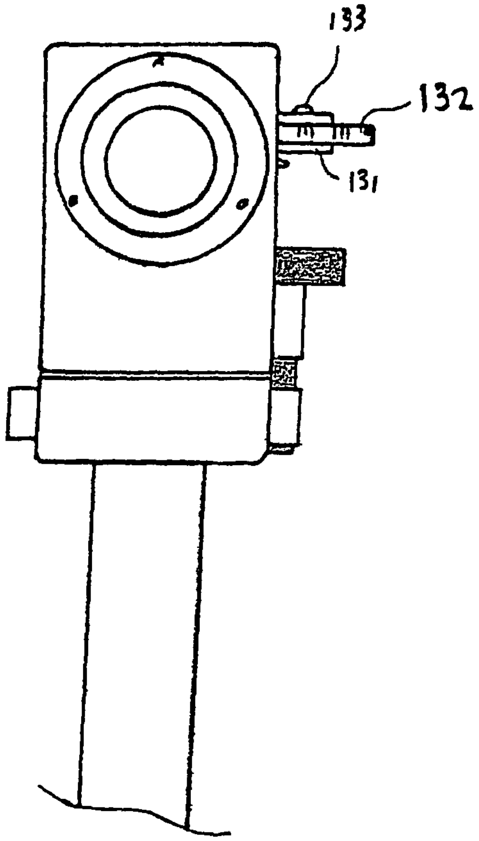
FIG. 30 is a side view of the hand grip and arm shown in FIG. 29 of the drawings.

FIGS. 29 and 30 show the arrangement of the brake lever. A brake lever 132 is pivotally connected by a bolt 133 to a lever mounting block 131. A shoulder 131*a* extends outwardly on one side of the mounting block 131, and connects to a 90E cable bend 134. The cable 61 is shown extending from the cable bend 134, and passes through the cable guide 135. By appropriate directing, the cable 61 ultimately reaches the disc brake caliper 24, as illustrated in FIG. 14 of the drawings. The operator, by pulling on the brake lever 132, is able to tension the cable and therefore activate the disc brake caliper 24 which in turn engages the disc brake rotor 29 for the purposes of slowing down or stopping the wheelchair 200.

Seat and Transmission Mounting to Main Frame

In accordance with one embodiment of the invention, a mechanism for attaching the seat as well as the transmission mount and the drive mechanism 230 to the central support 208 of the frame 202 is described.

Figure 31:
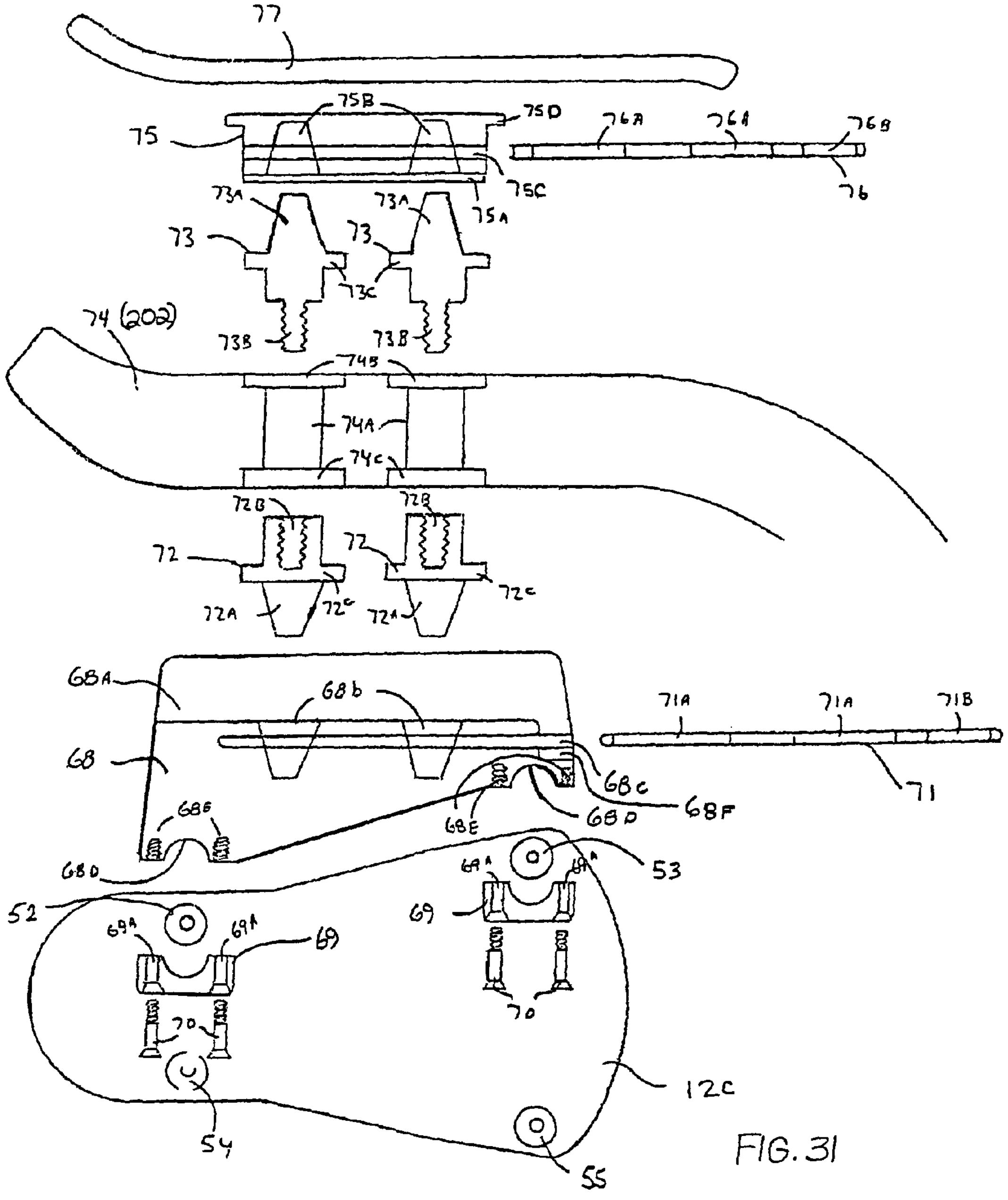
FIG. 31 is an exploded view of the frame, seat and transmission, showing the mounting of these components.

With particular reference to FIG. 31 of the drawings, it will be seen that the main frame 202 has a central support 208. Within the central support 208, there are formed two spaced openings 74*a*, each of the spaced openings 74*a* having an upper shoulder receptacle 74*b* and a lower shoulder receptacle 74*c*. Two seat mounting posts 73 are inserted from above into each of the openings 74*a*. Each seat mounting post 73 comprises a shoulder 73*c*, a taper 73*a* and a threaded portion 73*b*. When the seat mounting post 73 is inserted into the opening 74*a*, the shoulder 73*c* will be received and rest in the upper shoulder receptacle 74*b*, preventing further downward movement of the post 73 into the opening 74*a*.

Additionally, a pair of transmission mounting posts 72 are provided, each post 72 having a shoulder 72*c*, a taper 72*a*, and a threaded bore 72*b*. Each mounting post 72 is placed in the opening from the bottom, and the threaded bore 72*b* receives the threaded shaft 73*b* of the seat mounting post 73. The seat mounting post 73 and transmission mounting post 72 are tightened with respect to each other by conventional rotation, until such time as the shoulder 72*c* of the post 72 is received within the lower shoulder receptacle 74*c* (and shoulder 73*c* is received within shoulder receptacle 74*b*.) These are firmly tightened with respect to each other. As will be described below, the seat mounting post 73 extending outwardly above from the central support 208 forms the basis for connecting the seat bottom 77, while the downwardly extending tapers 72*a* form the basis for fastening the transmission mount 68 and the drive mechanism 230 to the central support 208. In this way, it will be appreciated that the central support 208 carries both the seat bottom and the transmission. It should be noted that the mechanism for connection illustrated in FIG. 31 and other drawings is one preferred embodiment of the invention, and many different methods and structures may be utilized for properly securing these components to the main frame.

The seat bottom 77 is connected to the seat mounting post 73 via a seat mount 75. The seat mount 75 includes a pair of receptacles 75*b*, each spaced and dimensioned so as to receive and fit with the tapers 73*a* on the mounting post 73. The seat mount 75 includes a shoulder 75*d* and, at its lower end, an alignment groove 75*a* to facilitate a proper fit with central support 208. Further, the seat mount 75 comprises a lock plate slot 75*c* for receiving a lock plate 76, as will be described. The seat mount 75 and the seat bottom will preferably be fastened to each other with a super strong epoxy, although other forms of connection are within the scope of the invention.

Figure 33:
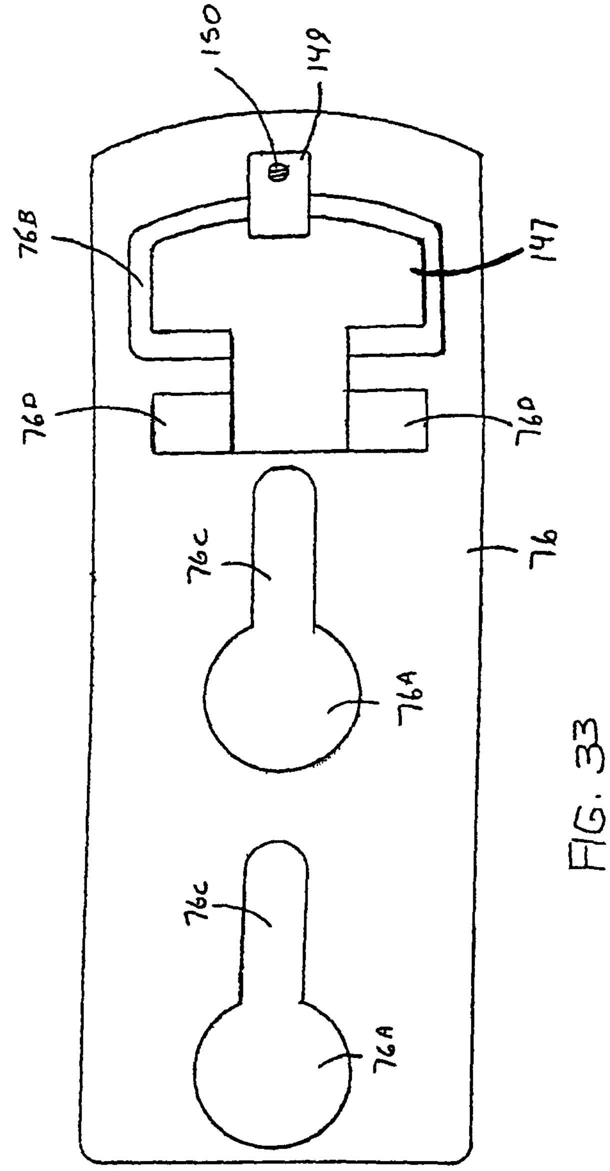
FIG. 33 is a bottom view of a lock plate for securing the seat to the frame.
Figure 34:
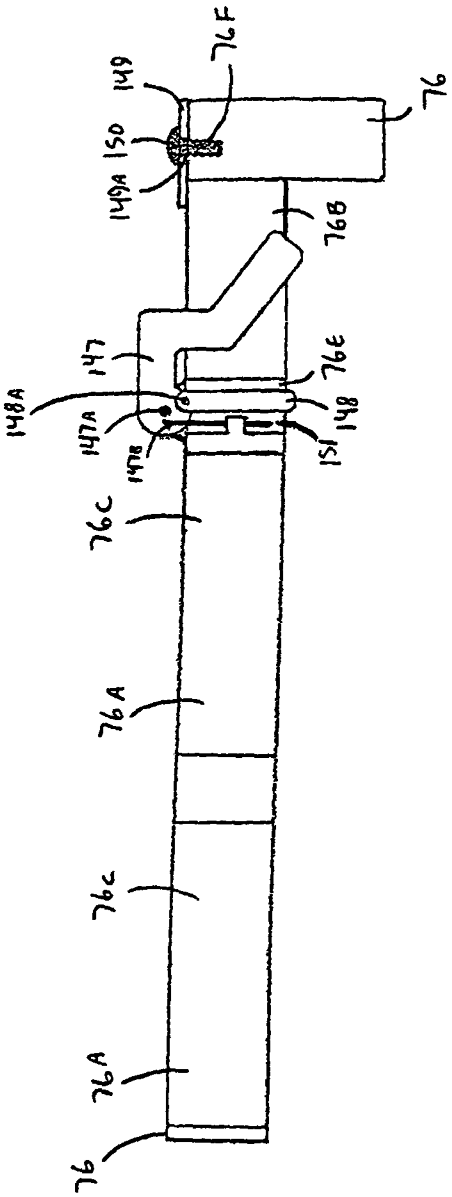
FIG. 34 is a side view of the lock plate, in accordance with one aspect of the invention.

In use, the seat mount 75 with the seat bottom 77 attached, is placed over the mounting post 73, and the tapers 73*a* are received within the receptacle 75*b*. The lock plate 76 is located in the lock plate slot 75*c*. FIGS. 33 and 34 show a bottom view and side view respectively of the lock plate 76. It will be seen that the lock plate has a pair of access slots 76*a*, and an access slot locking engagement area 76*c*. When assembling the seat mount 75 onto the mounting post 73, the lock plate 76 is positioned such that the larger portion of the access slot 76*a*, circular in dimension as seen from FIG. 33, is aligned with the receptacle 75*b*. In this way, when the tapers 73*a* are placed in the receptacle 75*b*, the lock plate 76 will not provide any obstruction thereto. When the seat mount 75 is in the proper position, the lock plate 76 can be moved into the locking position, such that the locking engagement area 76*c* engages with a groove 73*d* in two sides of the mounting posts tapered area 73*a* that are 180° apart from each other, and that accept the locking engagement area 76*c* of the locking plate 76. Conversely, the seat mounting posts 73 can be released by moving the lock plate 76 in the opposite direction to allow the tapers 73*a* to be withdrawn.

In FIG. 34 of the drawings, it will be seen that a lock/unlock lever 147 is provided on the lock plate 76. The lever 147 rotates about pivot pin 147*a*, and is connected at pivot pin 148*a* to a lock post 148. A tab 149 is secured to the lock plate 76 by means of a screw 150, which is received in a screw access hole 149*a*. The tab 149 limits movement of the lever 147 so that it is not able to extend above the level of the tab 149. This is safety feature to ensure that no injury or other adverse effects are sustained.

When the lever 147 is rotated about pivot pin 147*a* in a counter-clockwise direction, the lock post 148 is raised above the lower level of the lock plate 76 and the projection of the lock post over the edge, which would otherwise prevent removal of the lock plate 76, now allows the lock plate 76 to be moved by a sliding motion from the lock plate slot 75*c*. A tension spring plate 147*b* operates on the lever 147 so that in the normal position the lock post 148 will extend over the lower surface of the lock plate 76, and the lever 147 will be in the position shown in FIG. 34 of the drawings.

Figure 32:
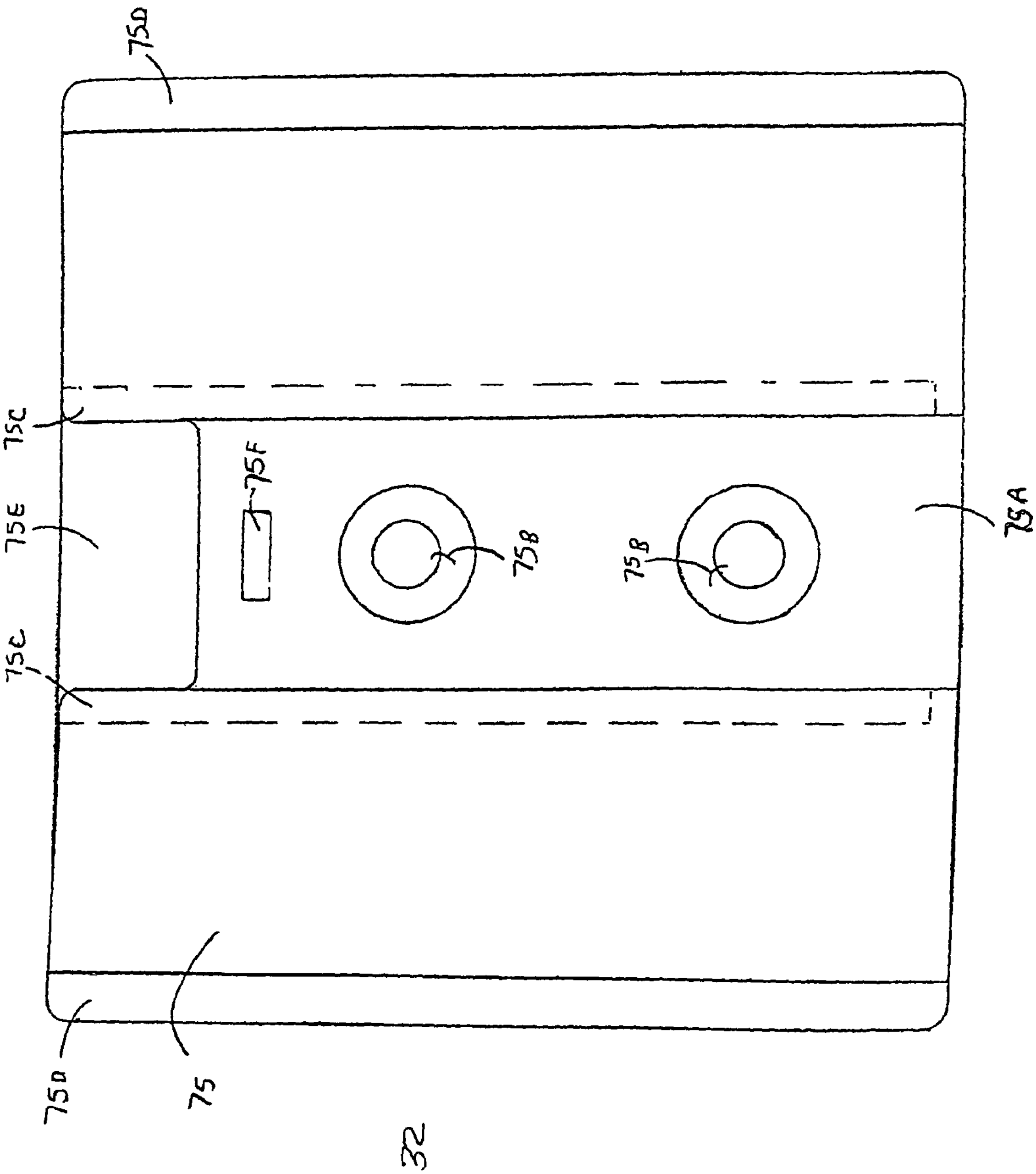
FIG. 32 is a bottom view of the seat attachment component for securing to the frame.

With particular reference to FIG. 32 of the drawings, there is shown the seat mount 75 with the lateral shoulder 75*d*. The lock plate slot 75*c* is shown, in which the lock plate 76 is received, as described above. The area 75*e* is a finger-accessed clearance recess to facilitate the pulling of the sliding lock plate 76. The recess 75*f* receives the end of the lock post 148, as shown in FIG. 34 of the drawings, to lock the lock plate in position.

Figure 35:
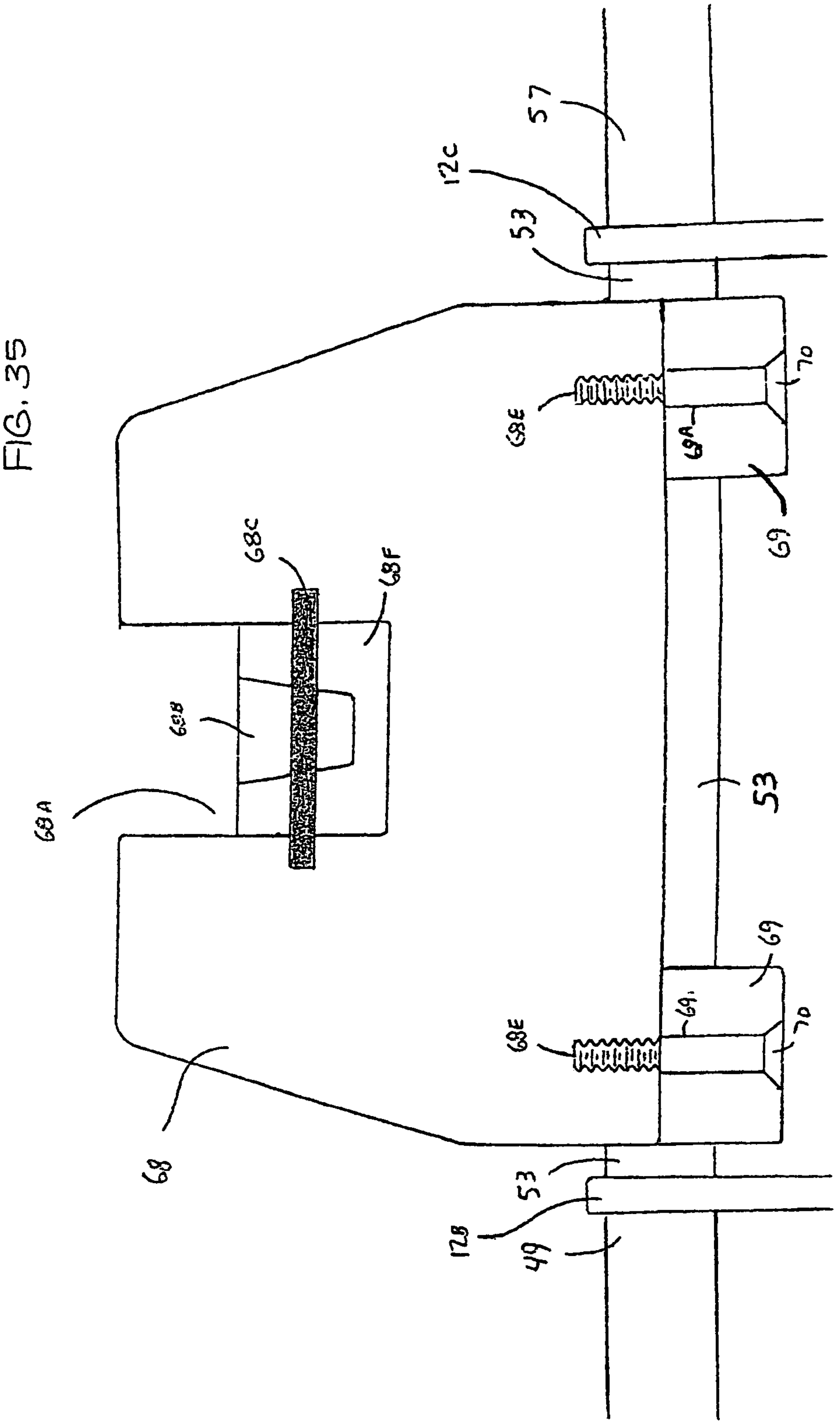
FIG. 35 is a front view of the transmission mount in accordance with one aspect of the invention when mounted on support tubes.

As will be seen in FIGS. 31 and 35, there is provided a transmission mount 68. The transmission mount 68 has a pair of mounting openings 68*d* which rest on frame support tubes 52 and 53. Reference may be made to FIG. 5 of the drawings which shows the various transmission cases and support tubes. With the transmission mount 68 resting on the frame support tubes 52 and 53, the clamp modules 69 are registered therewith, and have a semi-circular opening which fits below the frame support tubes 52 and 53. The clamp modules 69 are then bolted, using bolts 70, the bolts 70 passing through the holes 69*a*, and having threaded ends which engage the screw holes 68*e* on the transmission mount. In this way, the transmission 230 is secured to the transmission mount 68.

The transmission mount 68 is secured to the mounting post 72 in substantially the same manner as the seat mount 75 is secured to the mounting post 73. Thus, the transmission mount has receptacles 68*b*, a slide lock groove 68*c* and a lock plate 71 which is received within the lock groove 68*c*, engaging the alignment tapers 72*a* in the receptacle 68*b*. The lock plate 71 can be axially moved in a sliding fashion so as to selectively release and engage the grooves 72*d* (positioned in much the same manner as the grooves 73*d* in the mounting posts 73) in the tapers 72*a* in substantially the same way as described above with respect to the tapers 73*a* and lock groove 76, and the details will not, therefore, be repeated at this point.

FIG. 35 shows a front view of the transmission mount 68, including the receptacle 68*b*, the lock groove 68*c*, and also the finger-access area 68*f* to allow access to and sliding of the lock plate 71.

Figure 36:
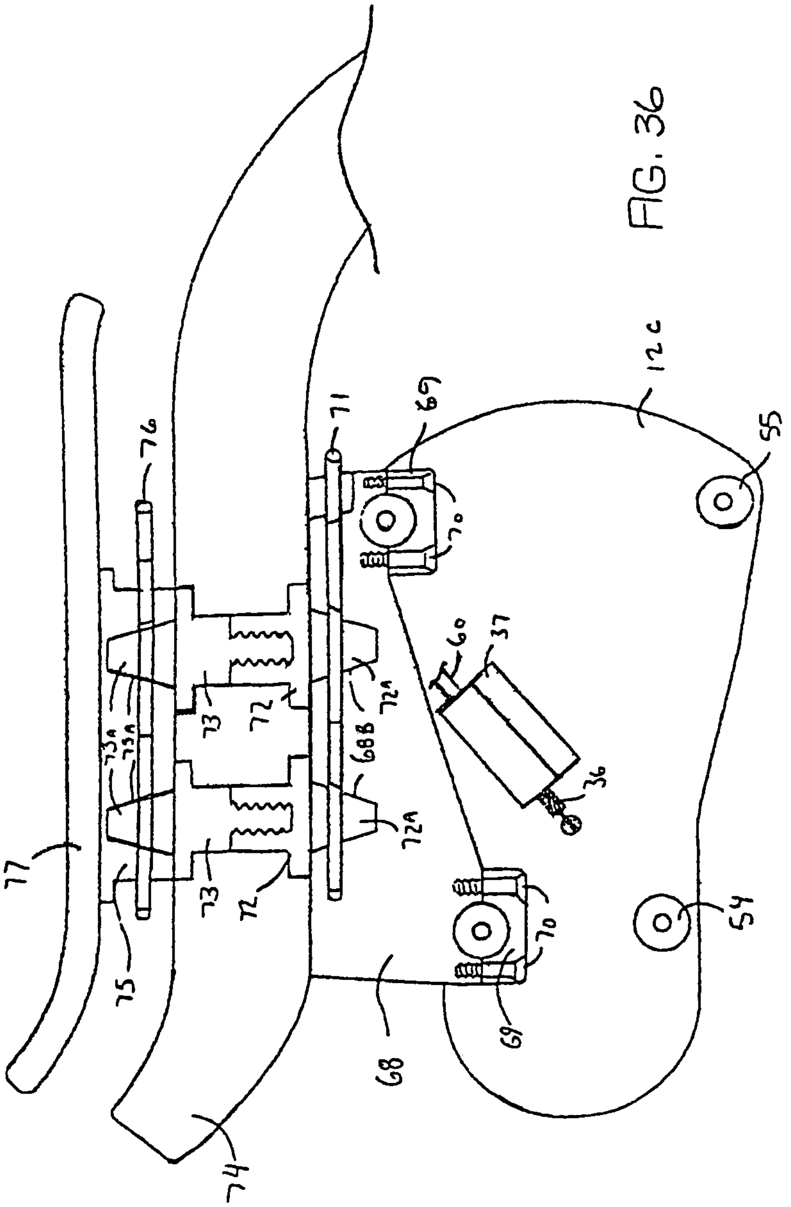
FIG. 36 is a view of the frame, seat and transmission in the assembled position.
Figure 41:
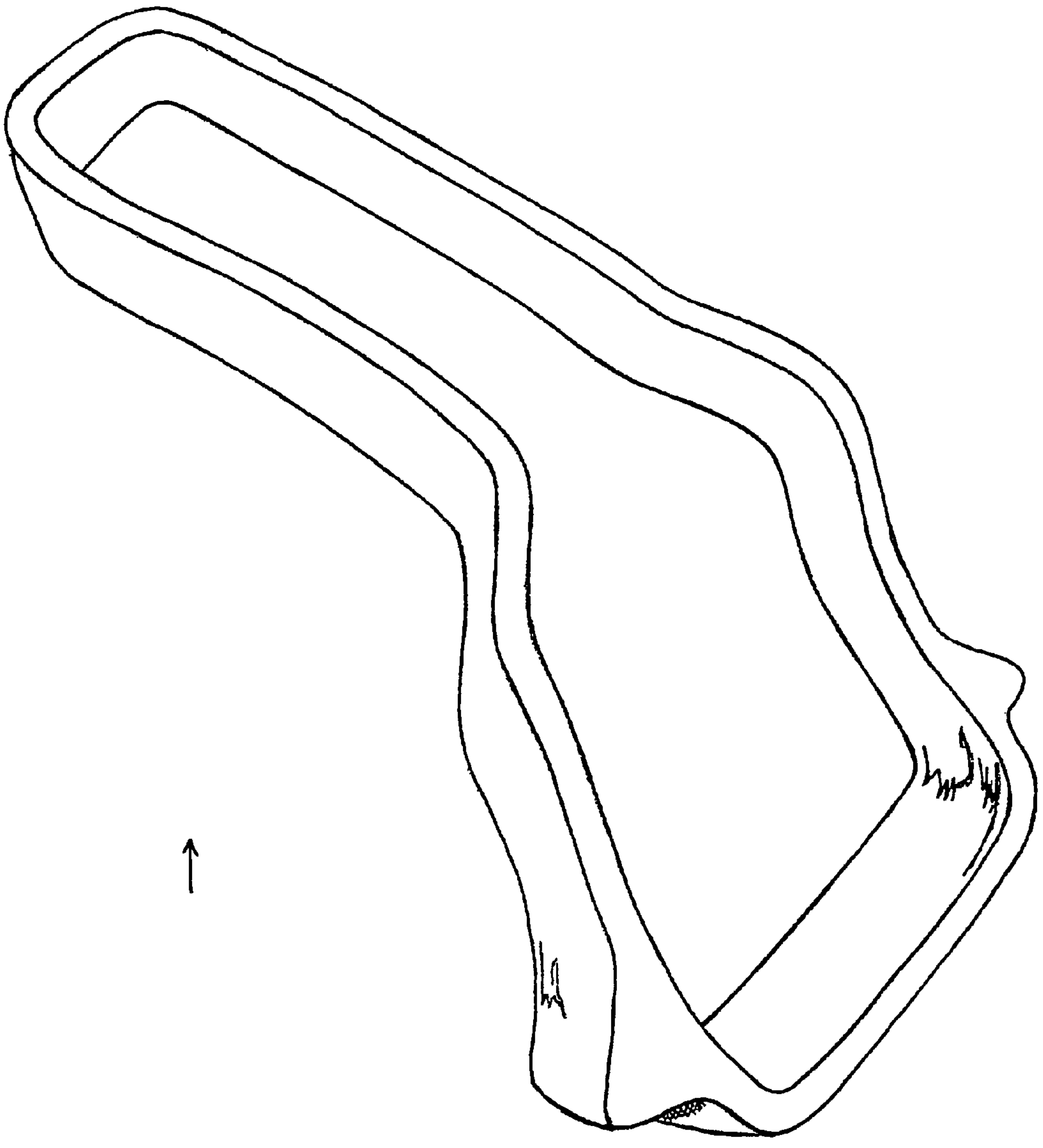
FIG. 41 is a view of a further embodiment of a main frame of a wheelchair in accordance with the invention.
Figure 42:
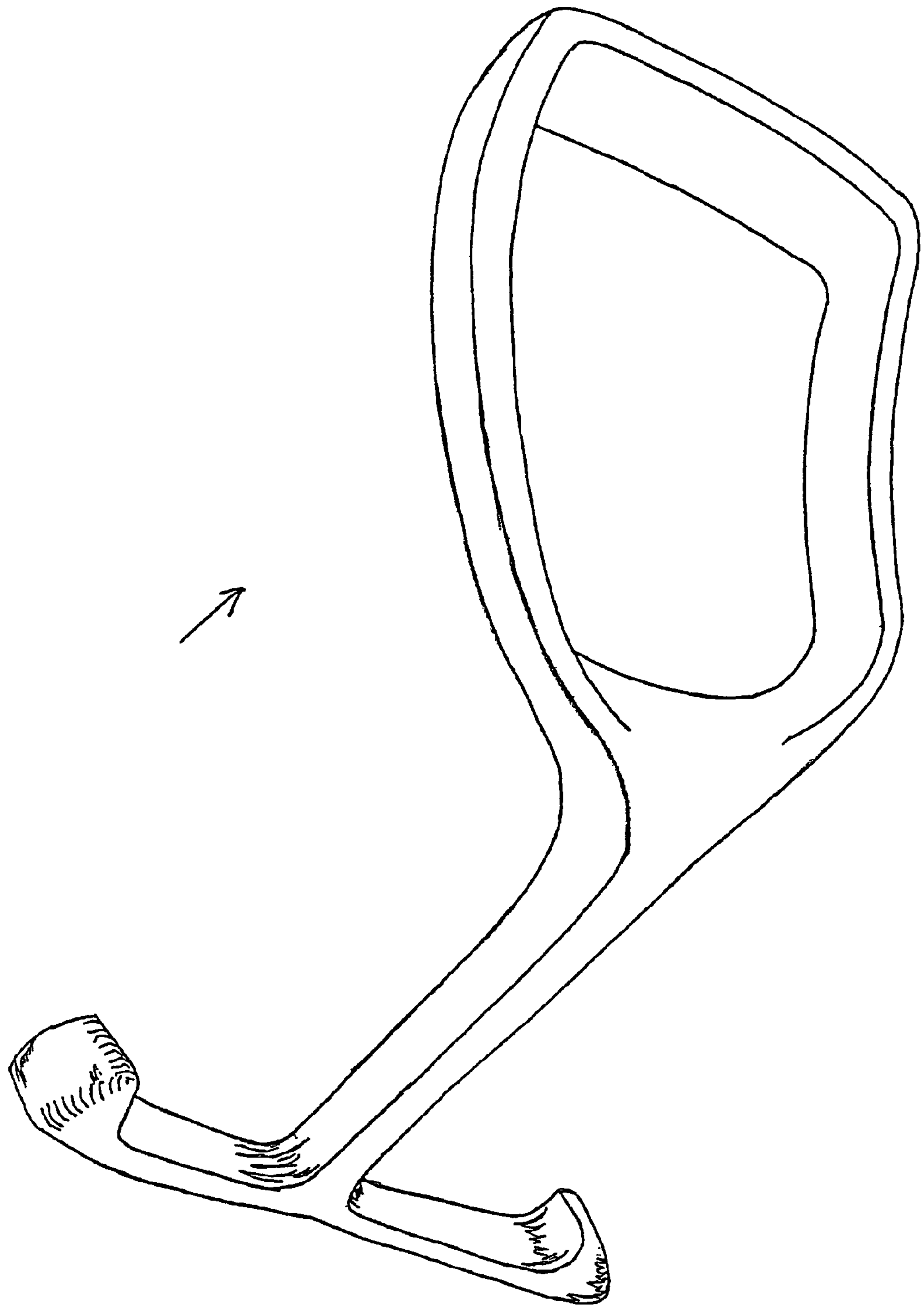
FIG. 42 is a view of a yet further embodiment of a main frame of a wheelchair in accordance with the invention.
Figure 43:
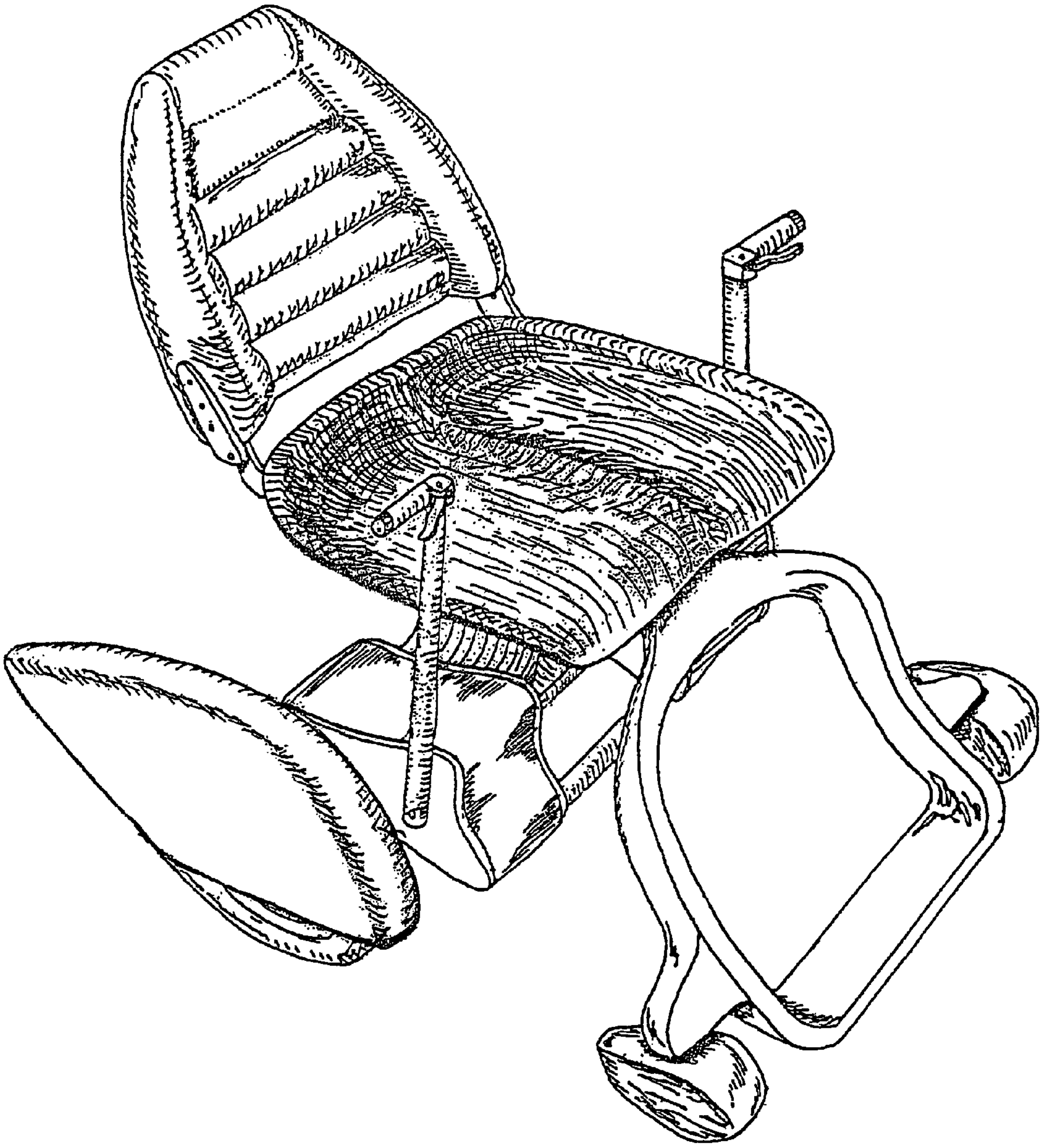
FIG. 43 is a view of a fender for use on a wheelchair in accordance with the present invention.

In FIG. 36 of the drawings, there is shown the seat 77 and the transmission 230 mounted to the frame 208 (also numbered 74 in other figures and/or embodiments) in the assembled position. FIG. 36 also shows the shift linkage case 37 and the directional arm lever 36, the operation of which by the cables 60 moves the inner directional shaft 4, as has already been described above. Note that the different frame configurations shown in FIGS. 41 and 42 of the drawings may have a similar seat and transmission mounting system, and the components and structure described above may be used on each of the two parts which comprise the central support.

Front Wheel Assembly and Mounting

Figure 37:
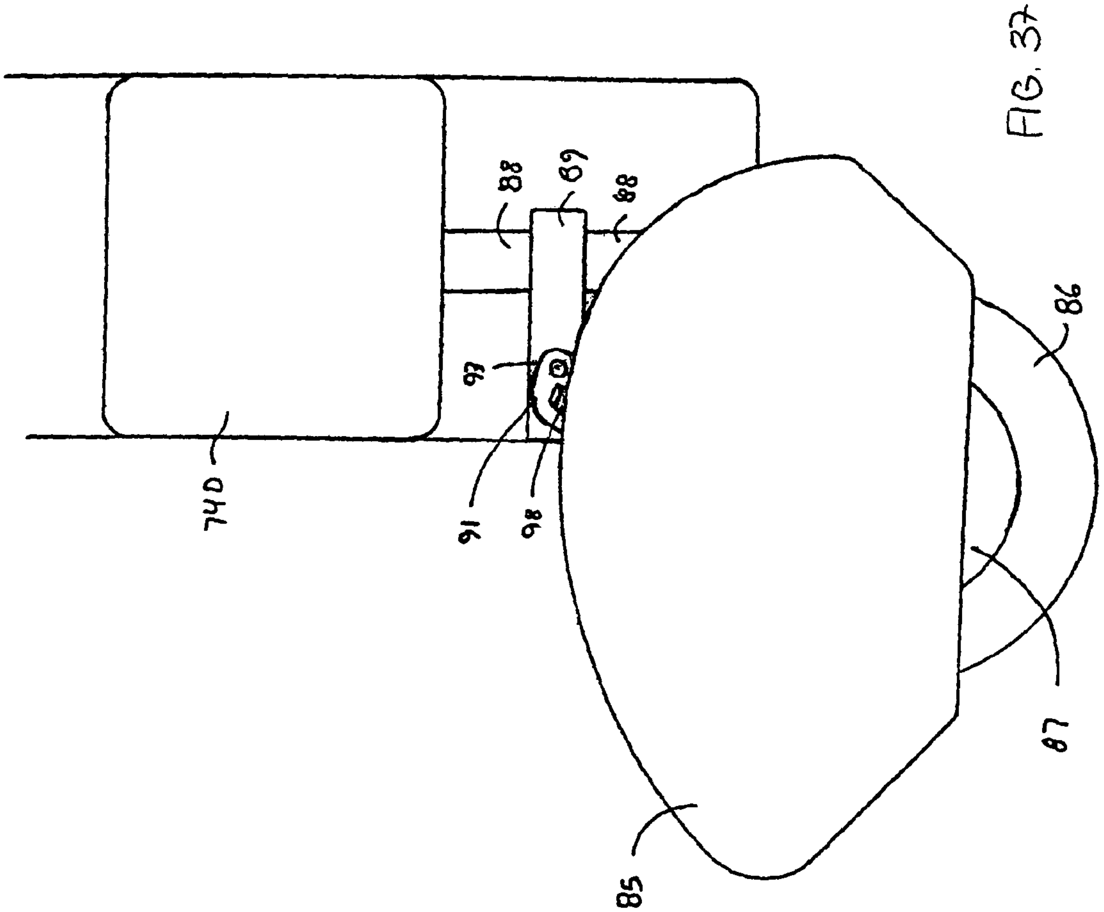
FIG. 37 is a side view of the wheel and front suspension.
Figure 38:
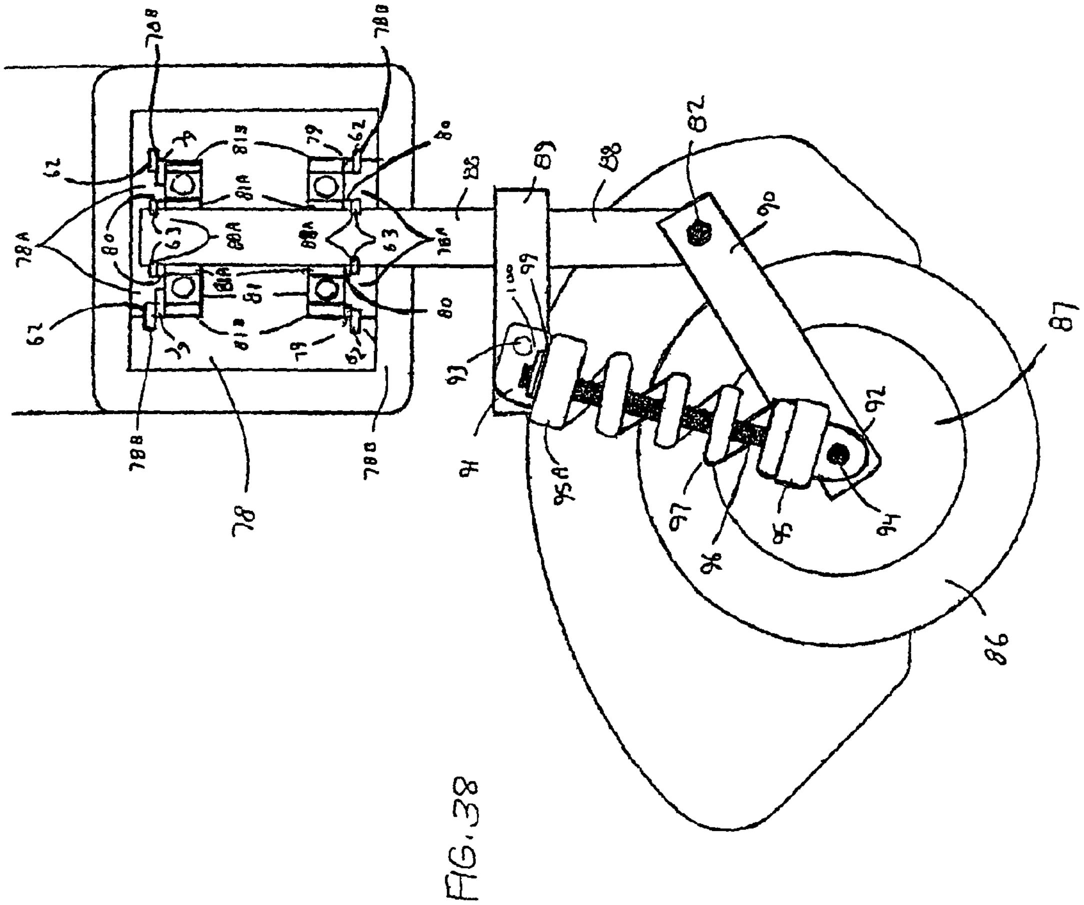
FIG. 38 is a sectional view showing details of the wheel and front suspension.
Figure 39:
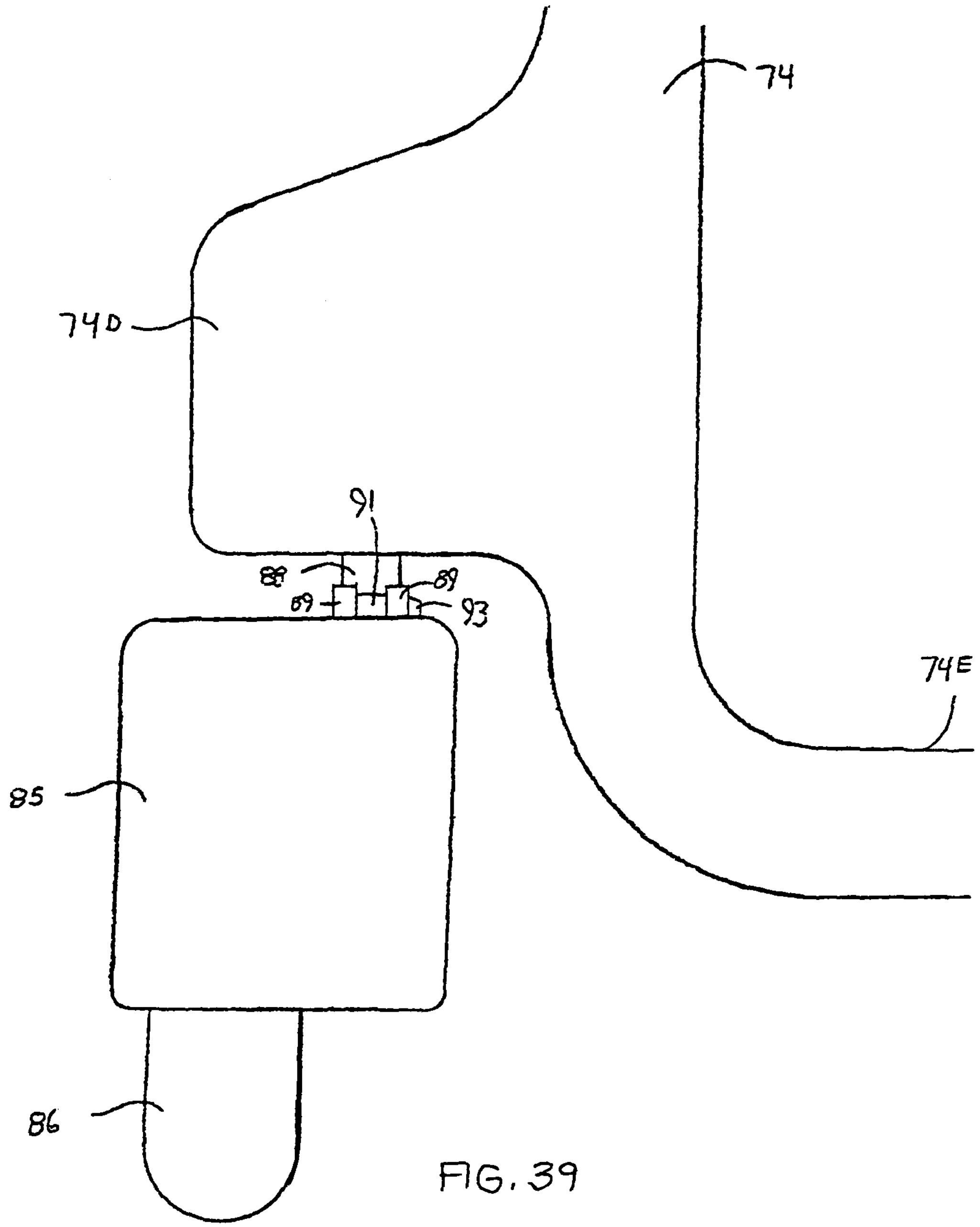
FIG. 39 is a front view showing the wheel, wheel housing and fender.

Reference is now made to FIGS. 37 to 40 of the drawings which show the front wheel mounting, the shock assembly and related components. In FIGS. 37 and 38 of the drawings, the main frame 202 has thereon a housing 74*d* or a “leg” aperture that projects outwardly from the main frame 202 but is not separate from the main frame structure. The assembly is mounted upon the housing 74*d*. A front wheel 87 is provided having a tire 86 and a fender 85, substantially over the wheel.

A main shaft 88 is provided, the main shaft 88 having attached thereto an upper shock mount 89 and a pair of swing arms 90. The swing arms 90 are connected by bolt 82. The shock mount 89 connects at the other end thereof to a support collar 91. A shock shaft 96 extends between an upper cup spring holder 95*a* and a lower cup spring holder 95. About the shock shaft 96 is the shock spring 97 which is received within the cup spring holders 95*a* and 95 respectively. A mounting bolt 93 mounts the upper part of the shock shaft 96 to the shock mount 89. The upper collar 91 is actually a part of the upper cup spring holder 95*a*, and the lower collar 92 is part of lower cup spring holder 95. A mounting bolt 93 is provided which is not directly over the top end of shock shaft 96, as shown in drawing. The shaft 96 in this situation can rise up through cup holder 95*a* as the spring is compressed and then falls back down when decompressed but is kept from falling through the cup holder 95*a* by way of a washer and clip 99 and 100. The bolt 93 may actually connect the collar 91 to shock mount 89. Note that the same shaft 96 travel does not occur through the lower collar 92. In FIG. 38, a collar 92 is provided at the lower end of the shock shaft 96, and is securely connected to the swing arms 90, as well as the wheel 87 by means of the axle shaft 94.

The main shaft 88 is received within the main shaft support 78 located within the housing 74*d*. Upper and lower bearings 81 with inner races 81*a* and outer races 81*b* are secured within the housing 74*d*, and washers 79 and c-clip recesses 78*b* for the c-clips 62 are provided. The main shaft 88 is received within the bearings 81, and is capable of rotational movement within the bearings 81, but not axial (or vertical) movement. Axial movement limitations are controlled by washers 80 resting upon the bearing inner races 81*a* and c clips 63 inserted into main shaft c clip recesses 88*a*.

Figure 40:
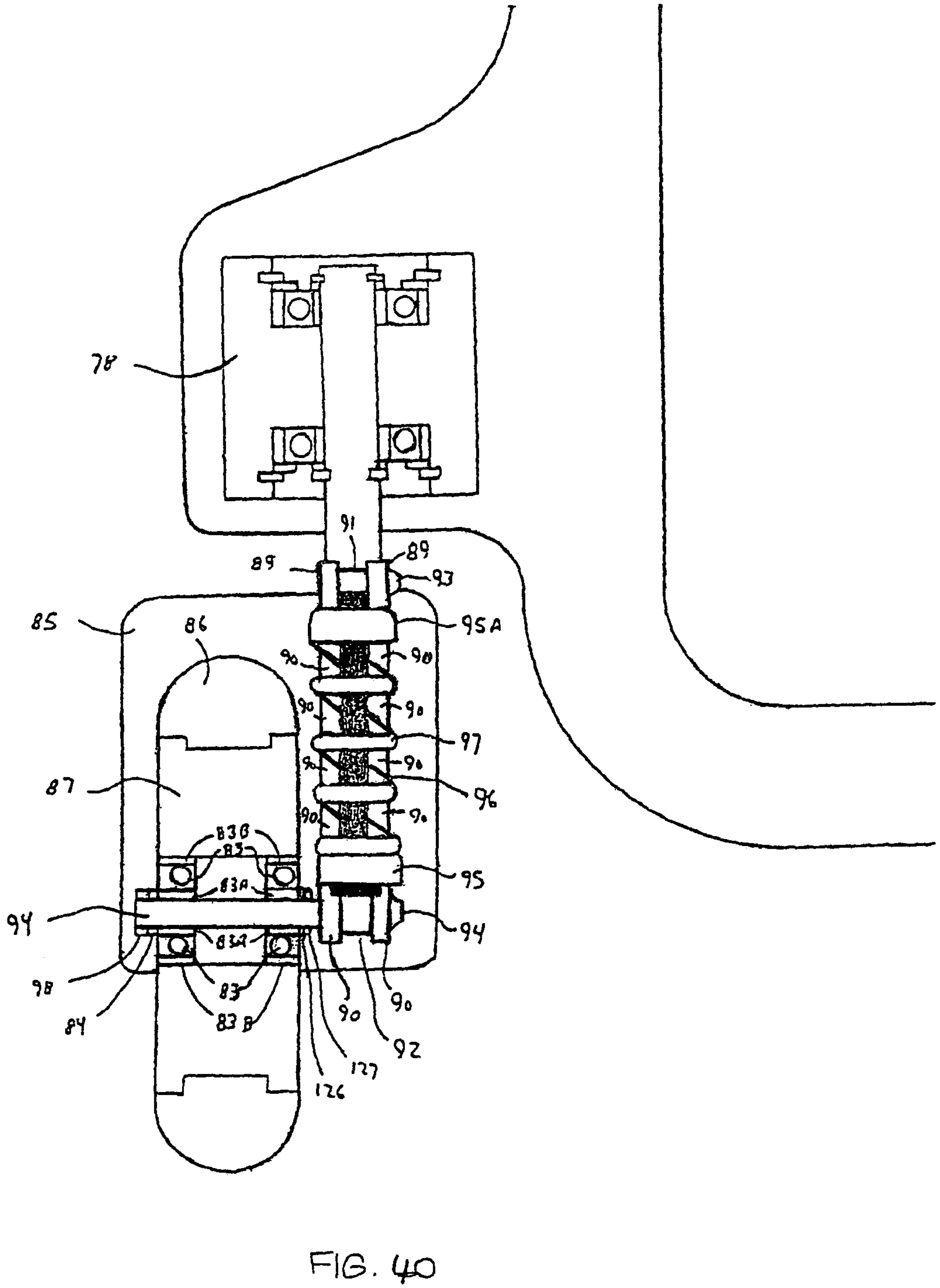
FIG. 40 is a sectional view showing mounting of the wheel, shock absorber and other components to the frame.

FIG. 40 shows more details relating to the mounting of the wheel 87. Within the fender 85, bearings 83, having outer races 83*b* and inner races 83*a* are provided for receiving the axle shaft 94. A c-clip 98 and washer 84 secures one end of the axle shaft 94. The other end of the axle shaft is received within the swing arm 90 and collar 92 of the shock. A washer 126 and c-clip 127 are also provided on the other side of the wheel for stabilizing the wheel 87.

Seating Structure

In many wheelchairs currently available in the marketplace, the seat bottom is a flat piece of fabric that is attached on the left and right side of the wheelchair frame and stretched across the wheelchair, much like an old school yard swing. There may often be a foam cushion laid upon this seat. The seat back is of the same design. This type of seat design does not offer any correct or corrective skeletal structural support for the user and as many in wheelchairs have no use of their legs, sitting in a non-structured seat such as that described above may often make it very difficult to sit up straight. This can lead to back, neck, and shoulder pain as the body fights for a correct posture from an unsupported base. Furthermore, the poor positioning of the user due to the nature of the seat can actually make it more difficult to operate the wheelchair.

The benefits and advantages of a wheelchair seat that offers skeletal structural support in an ergonomic manner is therefore clear. Starting with the seat bottom of the wheelchair of the present invention, when the hip joints and pelvis are held in a correct position the spine is then in a correct position and the posture of the user is more likely to be structurally correct. Even with limited muscular control, the user is positioned and supported in a correct structural posture. It has been found that this type of support reduces neck, back, and shoulder pain as a result of the user not having to constantly try to achieve straight posture from a non supportive base structure. It also places the user in a better position for operating the wheelchair.

Therefore, the seat structure of the wheelchair of the present invention is formed so that the seat bottom corrals both outer sides of each leg/hip joint which in turn causes the upper legs to be directed in the correct position thus directing the users glutes (or posterior muscles) and pelvis to be lowered into a recessed area designed for correct pelvic tilt which then offers correct spinal support. The forward center area of the seat bottom raises slightly to direct separation between the legs in-seam area, thus offering further base support. The overall design of the seat bottom is focused on two very specific goals, namely: (1) to give support along the outside of the legs, along the inside of the legs, to cradle the pelvis and hip joints to offer correct spinal posture; and (2) to spread the users weight over the entire surface area of the seat bottom. FIGS. 1 and 2 of the drawings show a seat bottom which generally incorporates these structures and contours.

Many users of current wheelchairs may cite as the major discomfort the pressure from the seat bottom, with no structural support, as the weight of the body is lowered in the center and the sides squeeze in causing pressure.

While sizes of users certainly can differ, it is incontrovertible that the skeletal structure of a human is consistent throughout the species, and it is based on this fundamental similarity that the overall design characteristics of the seat bottom of the invention can be reduced in size or increased in size to fit a particular user.

The seat back in accordance with the present invention is also designed with correct structural support in mind. As with many automotive seats, this seat back offers supportive lumbar pads which offers additional lower spine support as well as upper spine support while allowing unrestricted movement of the arms.

The main reason current wheelchair seats do not offer spinal support is directly related to the position the users body must be in to effectively motivate the wheel chair. Current wheelchair users must lean forward to motivate a current design wheel chair, effected by directly rotating the wheels. If leaning forward is the optimum position for motivating a wheelchair then healthy spinal position does not come into play as a requirement. The present invention allows for and actually encourages correct healthy spinal position to motivate this wheel chair.

Further Embodiments

Figure 44:
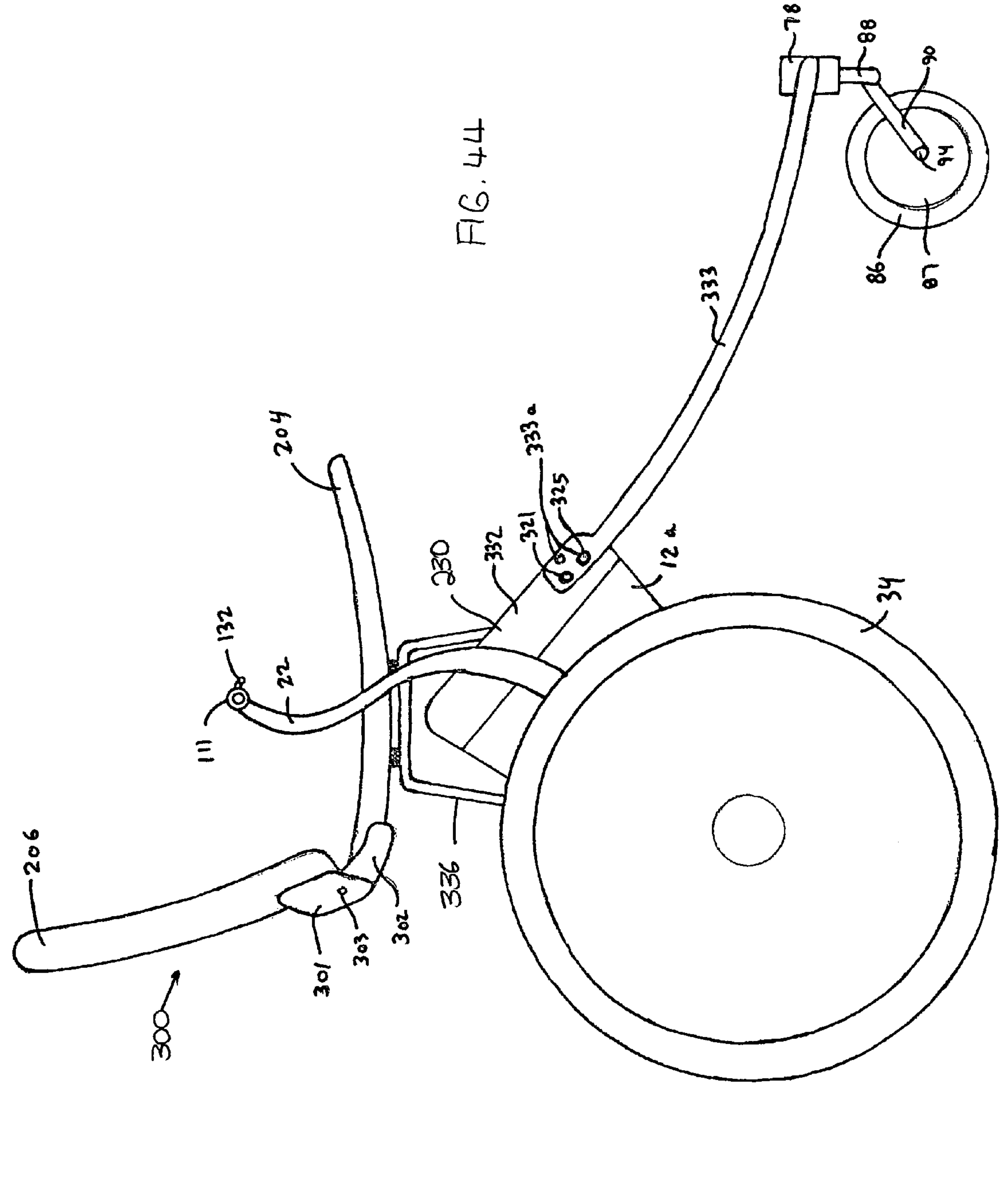
FIG. 44 is a side view of a wheelchair in accordance with a further embodiment of the invention, the wheelchair shown in the open or usage position.

Reference is now made to FIG. 44 and those figures following which show a further embodiment of a wheelchair in accordance with the present invention. In this description of FIG. 44 and those following, the same reference numerals used in previous figures are utilized to the extent possible for corresponding components and parts.

FIG. 44 of the drawings shows a wheelchair 300, which comprises a pair of rear wheels 34, a drive mechanism 230 as previously described and illustrated, a front frame arm 333 attached to the drive mechanism 230 at the drive mechanism end case internal frame 331, and an arm lever 22 for manually propelling the wheelchair 300. A seat frame 336 is mounted on the drive mechanism 230, and a seat 204 with seat back 206 is itself mounted on the seat frame 336. A wheel 87 is mounted at the end of the swing arm 90 connected to a main shaft 88 and the support 78 mounted at the end of the front frame arm 333, and having the general construction as described in previous embodiments.

In this embodiment at least, the reference to drive mechanism should be considered the drive mechanism itself, the housing or part thereof in which the actual drive mechanism may be located, or both of these.

The drive mechanism 230 has a transmission outer case 12*a*. The arm lever 22, having a hand grip 111 and a brake lever 132, is moved forward and backward to drive the rear wheel 34 through the drive mechanism 230. The operation and construction of the propulsion mechanism has been described in previous figures, and the same or similar mechanisms are used in the embodiments presently under discussion.

In this embodiment of the invention, the arm lever 22 may have the desired curvature shown, or may be of any other shape. Further, the arm lever and handle rotation joints are not present in this embodiment, and the arm lever does not, therefore, bend or have a joint, and the handle will not rotate. However, it should be appreciated that these options may be utilized in this embodiment if desired.

As will be discussed in further detail below, the seat 204 is releasably attached to the seat frame 336, and may be removed and replaced thereon. Further, the seat 204 and seat back 206 can be moved between an unfolded and folded position. In addition, the front frame arm 333 is mounted on the drive mechanism end case internal frame 331 so that it can be moved relative thereto, such that the wheelchair 300 can be folded and compacted for storage or transportation as will be described.

FIG. 44 shows between the seat 204 and seat back 206 an upper seat hinge 301 and a lower seat hinge 302. A seat hinge pivot bolt 303 is utilized in relation to these hinges to permit folding of the seat back 206 over the seat 204, as will be described.

FIG. 44 also shows the front frame arm 333 attached to the transmission end case cover 332, and this structure includes a front frame arm pivot bolt 321, a front frame arm position plunger 325, and a plunger access hole 333*a*, as will described in further detail below.

Figure 45:
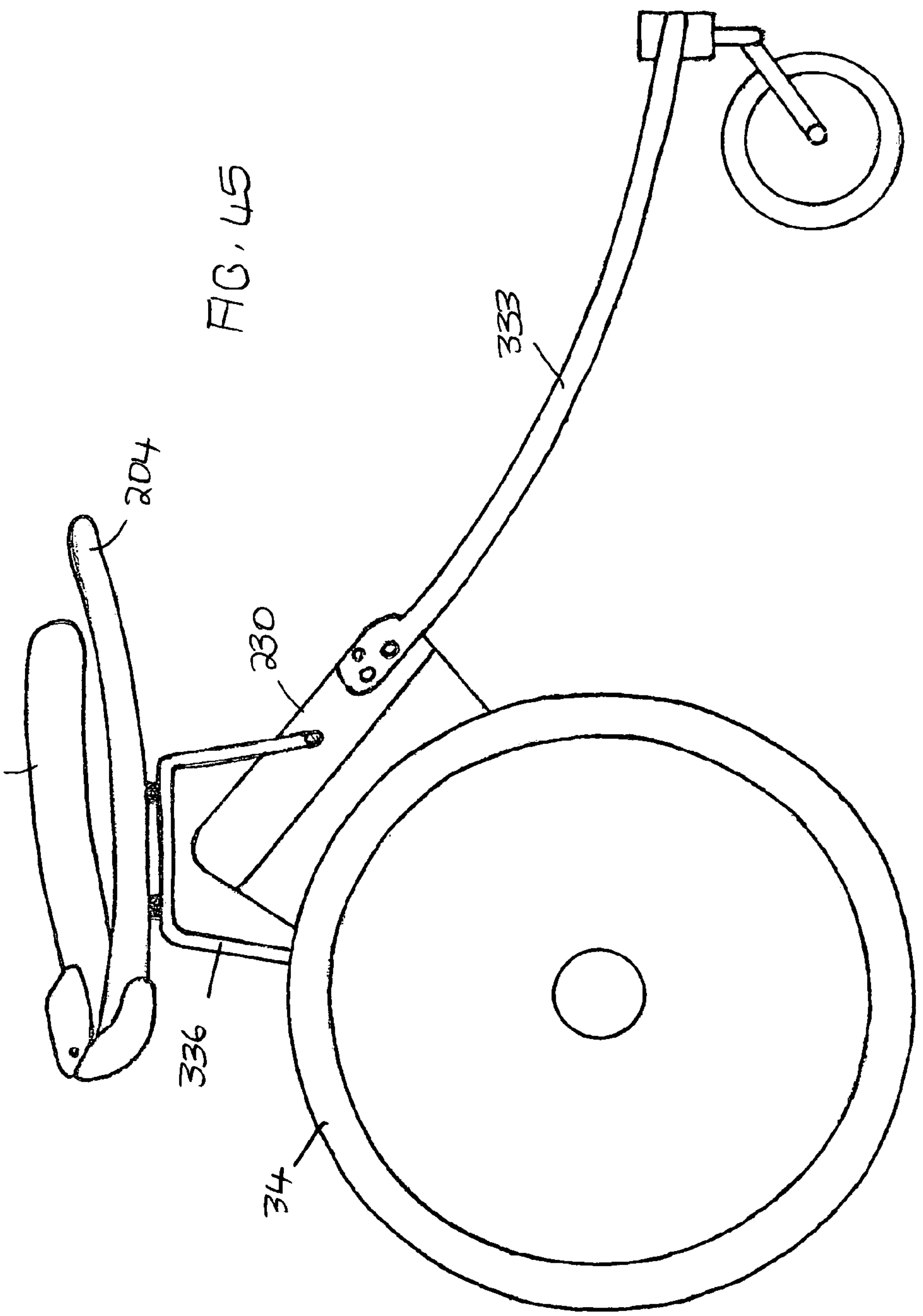
FIG. 45 is a side view of the wheelchair shown in FIG. 44, showing the seat folded and locked in storage or transport position.
Figure 46:
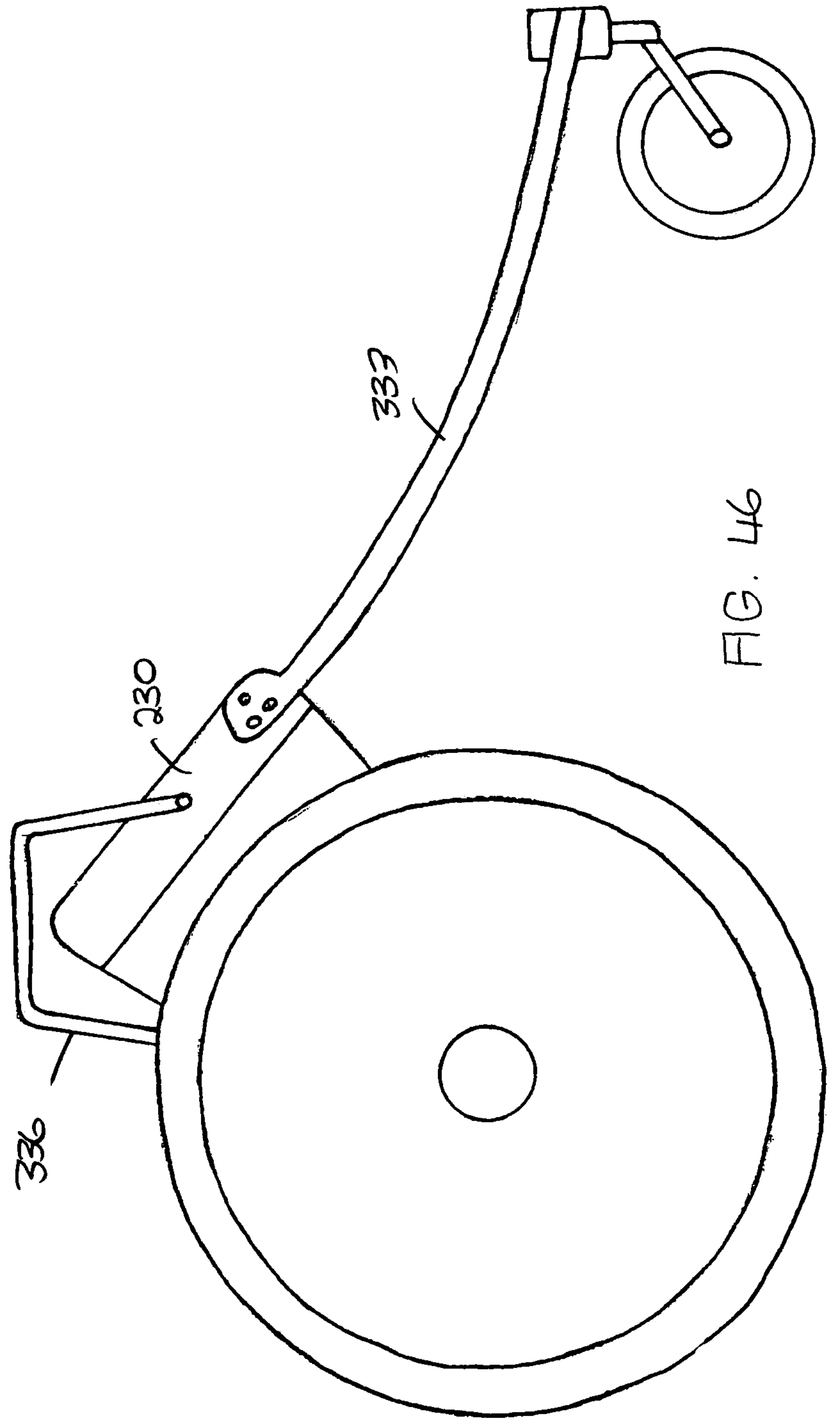
FIG. 46 is a side view of the wheelchair shown in FIG. 45, with the seat removed.

FIG. 45 of the drawings shows the wheelchair 300 illustrated in FIG. 44 with the seat back 206 moved into the folded position so as to overlie the seat 204. FIG. 46 illustrates the wheelchair as shown in FIG. 45, wherein the seat 204 and seat back 206 have been removed from the seat frame 336. Further description relating to one embodiment for the removal and attachment of the seat 204 to the seat frame 336 is provided hereunder.

Figure 47:
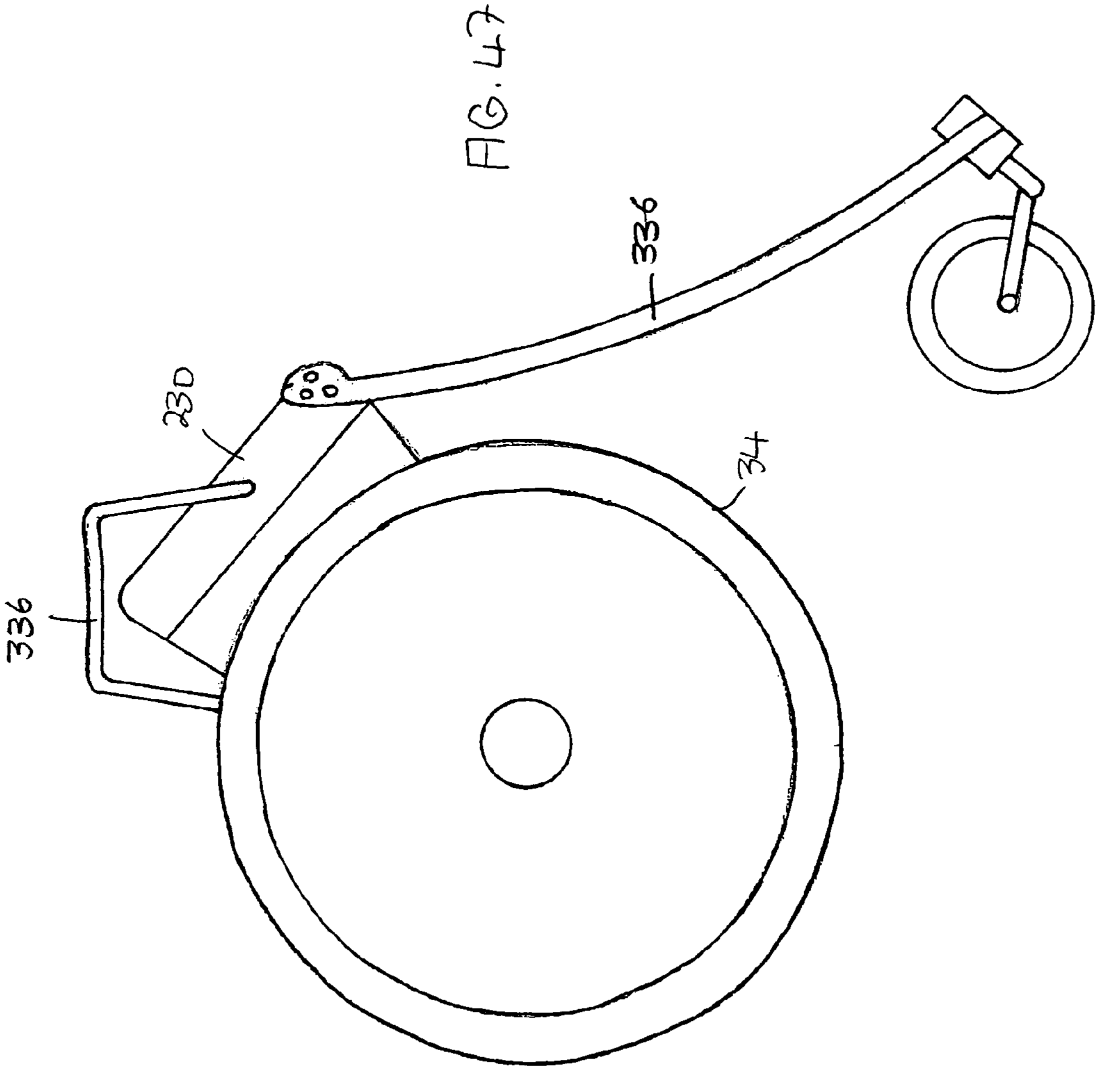
FIG. 47 is a side view of the wheelchair shown in FIG. 46 which has been partially folded.
Figure 48:
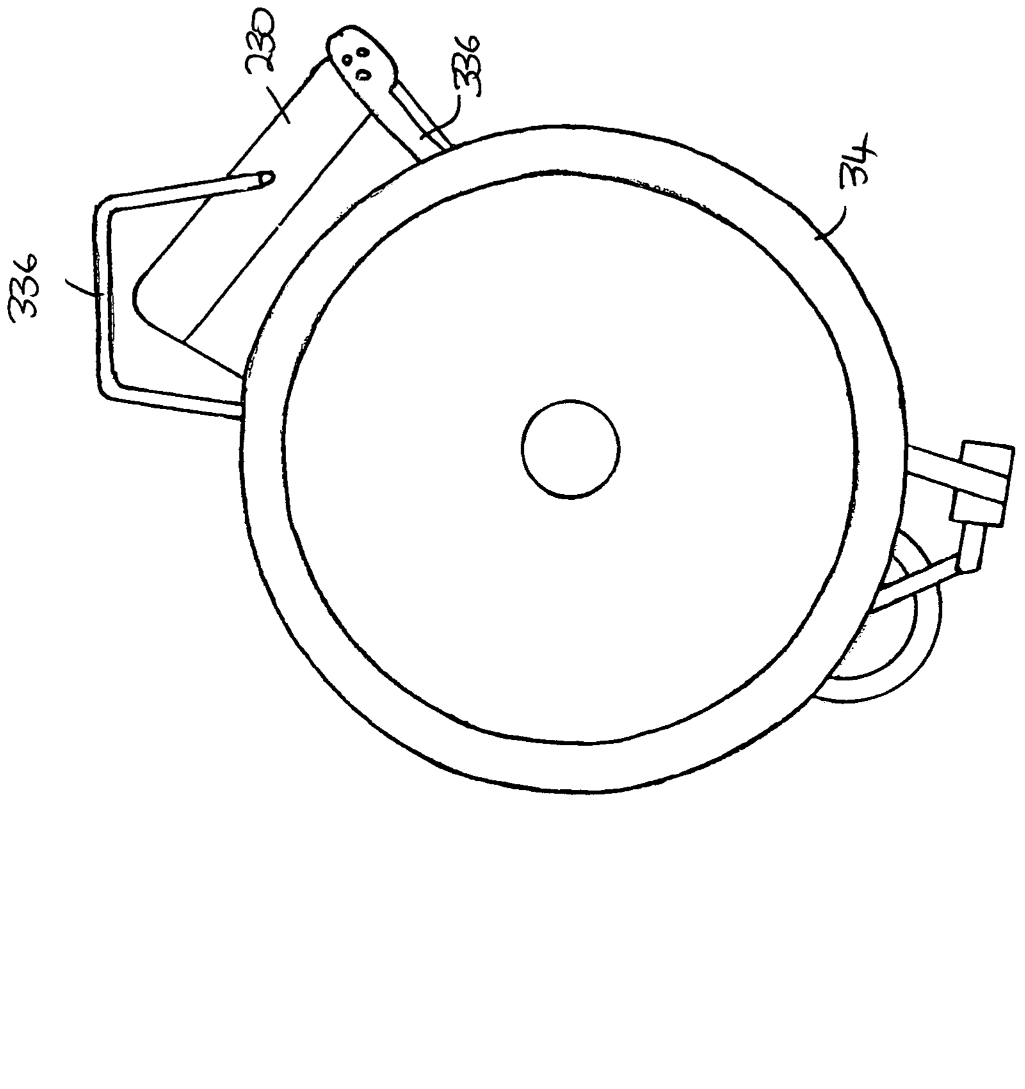
FIG. 48 is a side view of the wheelchair shown in FIG. 47, fully folded and locked in the storage or transportation position.
Figure 49:
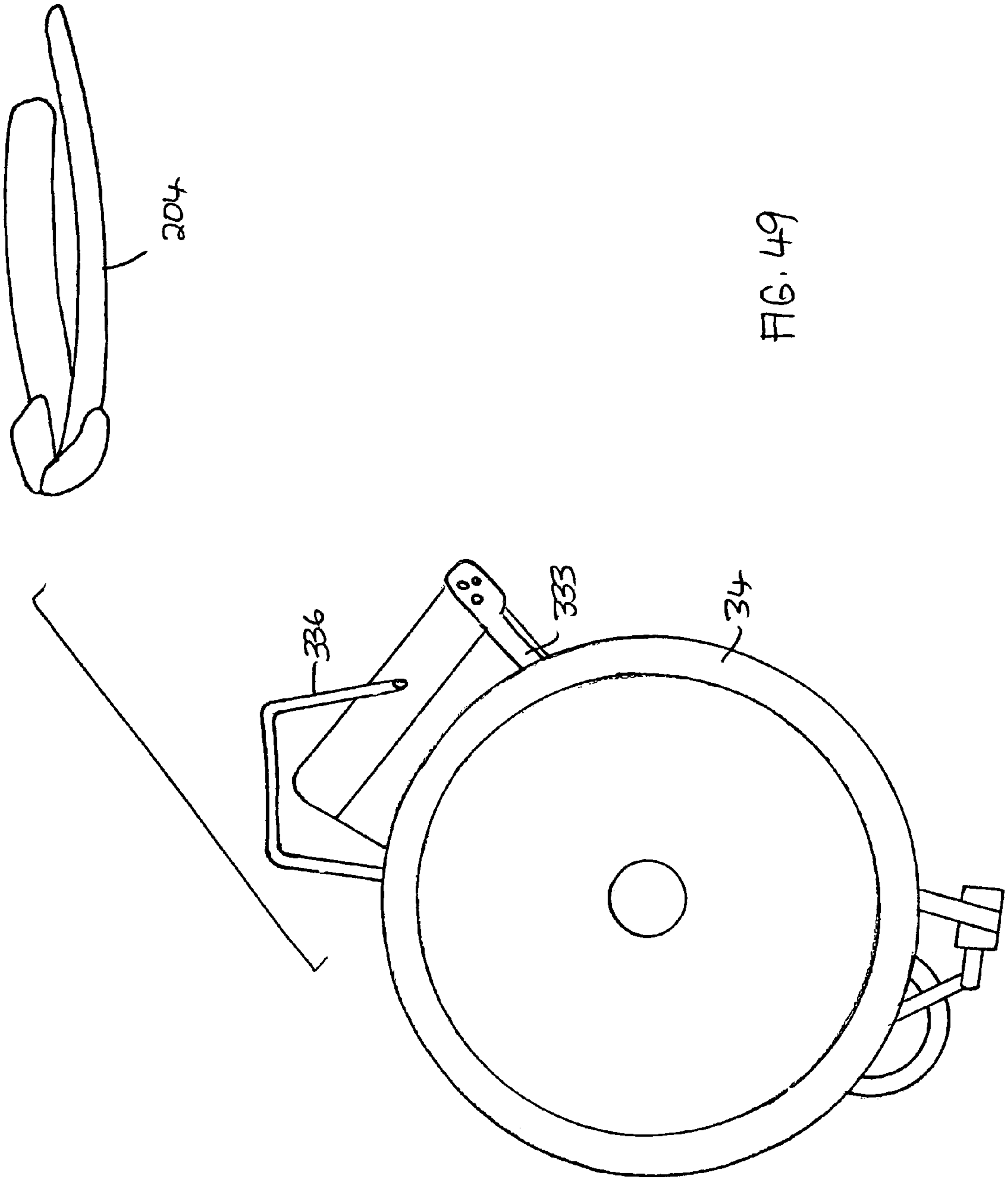
FIG. 49 is a side view of the wheelchair shown in FIG. 48, also showing the seat in the folded position.

FIG. 47 illustrates a wheelchair 300 wherein the front frame arm has been partially folded from its extended position as shown in FIG. 44. FIG. 48 illustrates the wheelchair 300 wherein the front frame arm 333 is in the fully folded position. It will be seen that the wheelchair 300 shown in FIG. 48 is in the fully compacted or folded position, especially appropriate for transportation and storage. FIG. 49 of the drawings shows the compacted wheelchair 300 as shown in FIG. 48, together with the separated seat in the folded position, illustrating the compactness and portability of the wheelchair 300.

Figure 50:
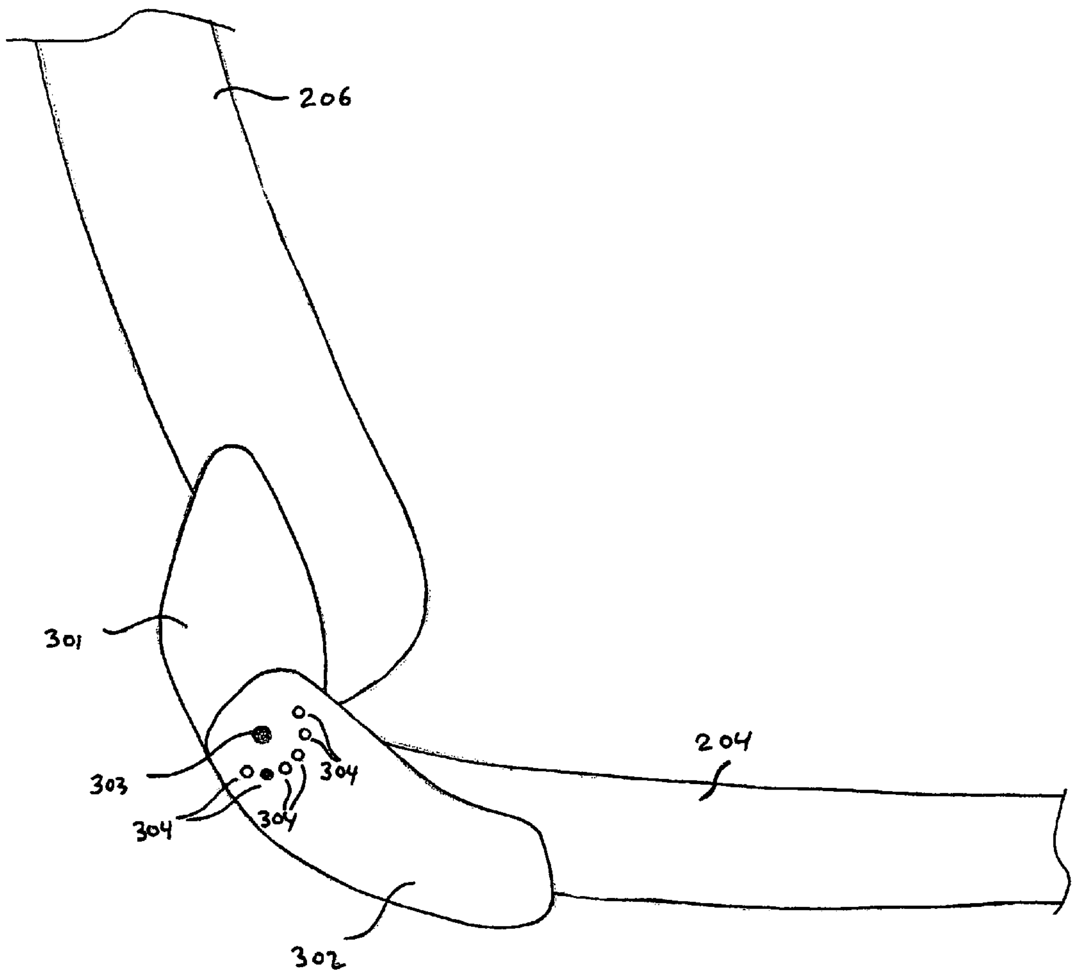
FIG. 50 is a side view detail of the seat in the open position.
Figure 51:
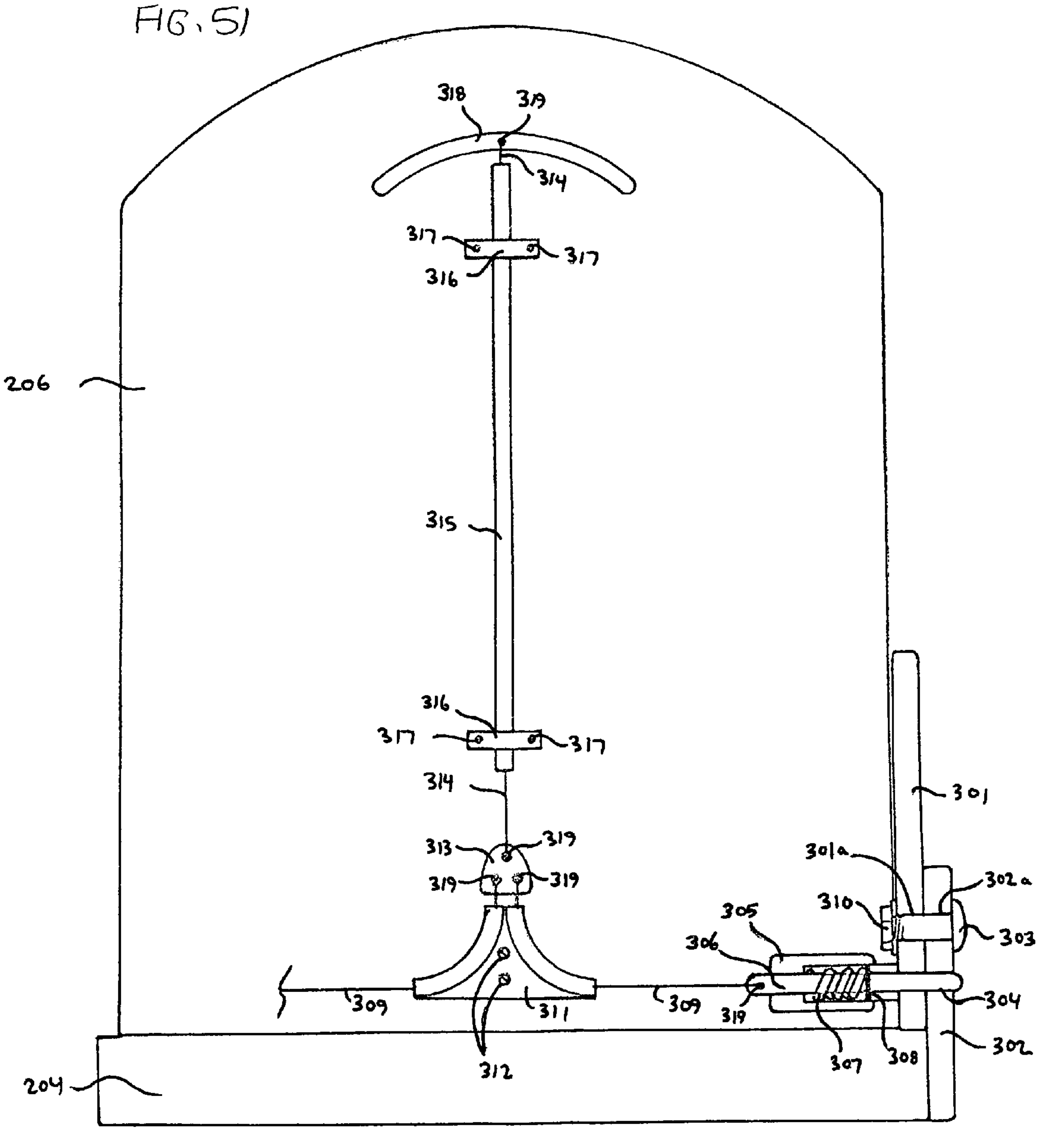
FIG. 51 is a back view of the seat showing the locking mechanism, in the locked position.
Figure 52:
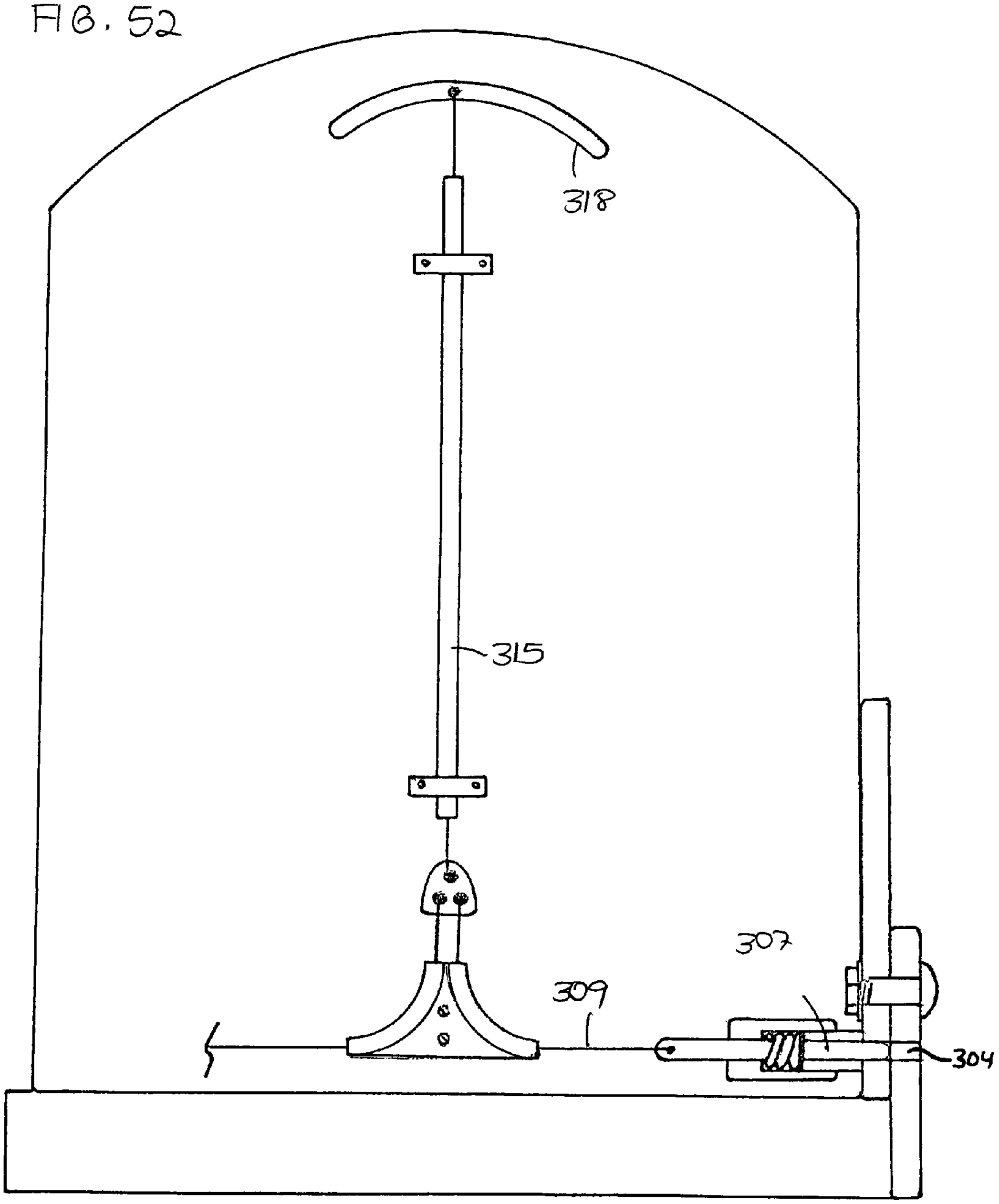
FIG. 52 is a view similar to that in FIG. 51 but showing the unlocked position.

FIGS. 50, 51 and 52 showed detailed views of the seat of the wheelchair 300, and the mechanism for its folding and unfolding. The lower seat hinge 302 is connected to the seat 204, and the upper seat hinge 301 is connected to the seat back 206. The lower seat hinge 302 includes a number of apertures 304 which allow the seat back 206 to be positioned at various angles relative to the seat 204. A seat hinge pivot bolt 303 can also be seen in FIG. 50 of the drawings.

FIG. 51 shows a rear view of the seat back 206 when locked relative to the seat 204, while FIG. 52 shows the same situation but in the unlocked position. It will be seen that a plunger housing 305 and a spring 307 and retainer 308 within the plunger housing 305 permit axial movement of the plunger 306. The plunger 306 can engage in one of several apertures 304, as seen in FIG. 50 of the drawings, and a different seat back position can be achieved depending upon which aperture is selected.

The plunger 306 is attached to a pull cable 309 which is mounted in the hole 319. The cable 309 passes through a directional plate 311, which is attached to the seat back by mounting screws 312. The cable 309 attaches to an aperture 319 in a cable transfer plate 313. It will be appreciated that the cable 309 from both sides of the seat are received by the transfer plate 313. An upper pull cable 314 extends from the transfer plate 313 and passes through a housing 315 secured to the seat back by housing mounts 316 which are fastened using screws 317. The pull cable 314 emerges from the opposite end of the housing 315, and is attached to an activation handle 318 at aperture 319.

In the rest position, the spring 307 urges the plunger 306 outwardly from the housing 305 and into an aperture 304 in the seat hinge 302. When the activation handle 318 is pulled upwardly, the cables 314 and 309 pull the plunger 306 against the action of the spring 307, removing the plunger 306 from the aperture 304. In this position, the seat back 206 is movable between the fully unfolded position as shown in FIG. 50, and a fully folded position as shown in FIG. 49. Of course, intermediate positions can also be set. FIG. 52 shows the plunger 306 in the unlocked position permitting the lower seat hinge 302 to move relative to the upper seat hinge 301.

Figure 53:
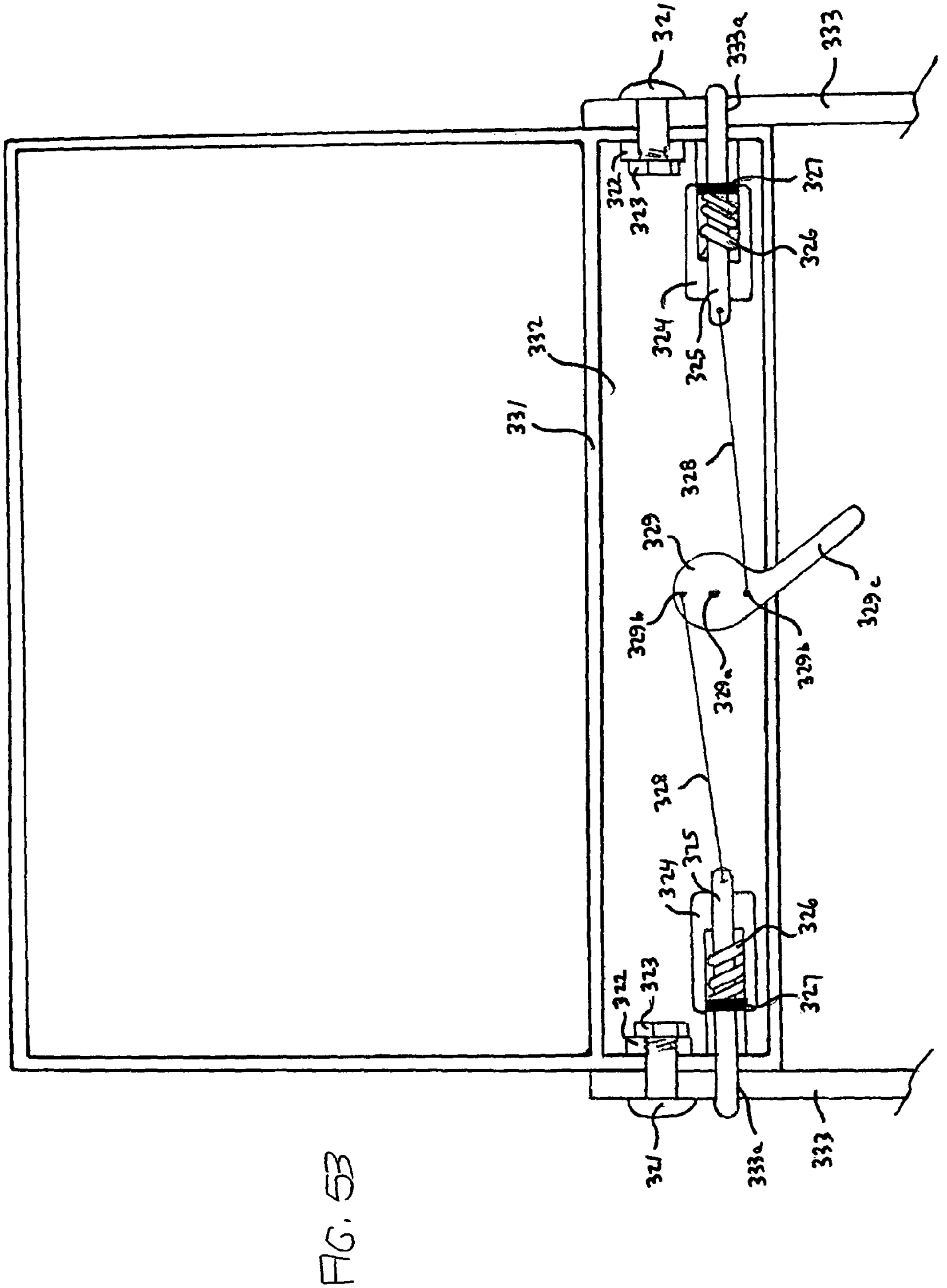
FIG. 53 is a bottom view of the locking mechanism for the frame, shown in the locked position.
Figure 54:
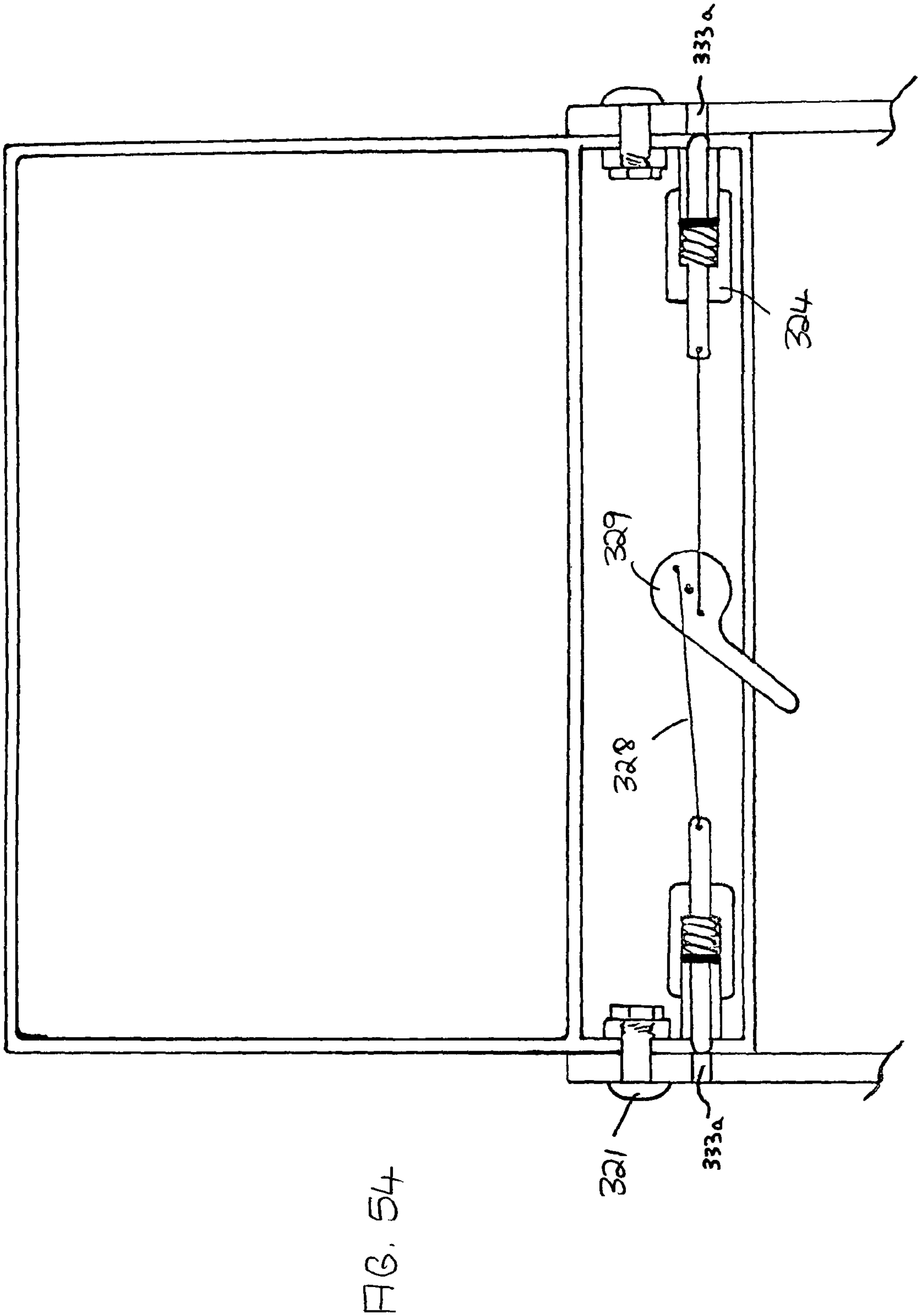
FIG. 54 is a bottom view as shown in FIG. 53, but in the unlocked position.

FIGS. 53 and 54 show a bottom view of the locking mechanism of the front frame arm 333 to the drive mechanism end case internal frame 331. Two sides of the front frame arms 333 are shown. The frame arms 333 are attached to the drive mechanism end case internal frame 331 by means of pivot bolt 321, spacer 322 and fastening nut 323. The front frame arms 333 are thus able to pivot relative to the drive mechanism end case internal frame 331 about the axis of pivot bolt 321.

A plunger 325 is mounted within a plunger housing 324, and a spring 326 and retainer 327 allow the plunger 325 to move axially. In the rest position, the spring 326 urges the plunger 325 outwardly into a plunger access hole 333*a*. When the plunger 325 is extended and received within the access hole 333*a*, relative movement between the frame 333 and the drive mechanism end case internal frame 331 is prohibited. The plunger 325 is connected to a cable 328 at one end thereof, the other end of the cable 328 being connected to a handle 329. The cables 328 from each side are secured in different apertures 329*b* on substantially opposing sides of a pivot mount 329*a*, about which the handle 329 can rotate.

When the handle 329 is rotated, the respective cables 328 pull the plunger 325 on each side out of the access holes 333*a*, against the action of the springs 326. This unlocked position is illustrated in FIG. 54, and permits the frame 333 to pivot about pivot bolt 321, thus allowing the frame 333 to move between the fully unfolded position shown in FIG. 44 of the drawings, and the fully folded position shown in FIG. 49 of the drawings.

Figure 55:
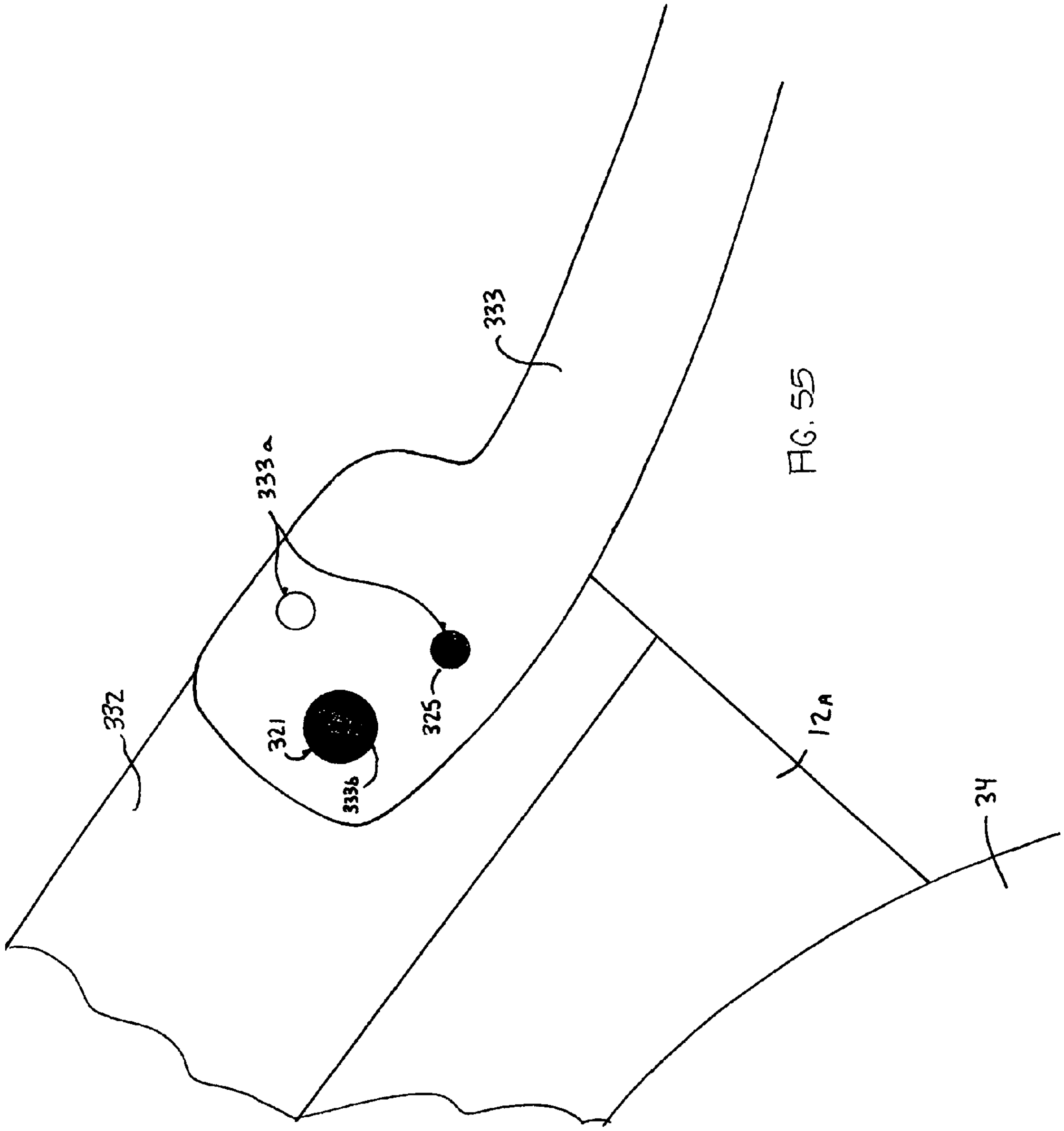
FIG. 55 is a detail of the frame lock mechanism, in the locked in usage position.
Figure 56:
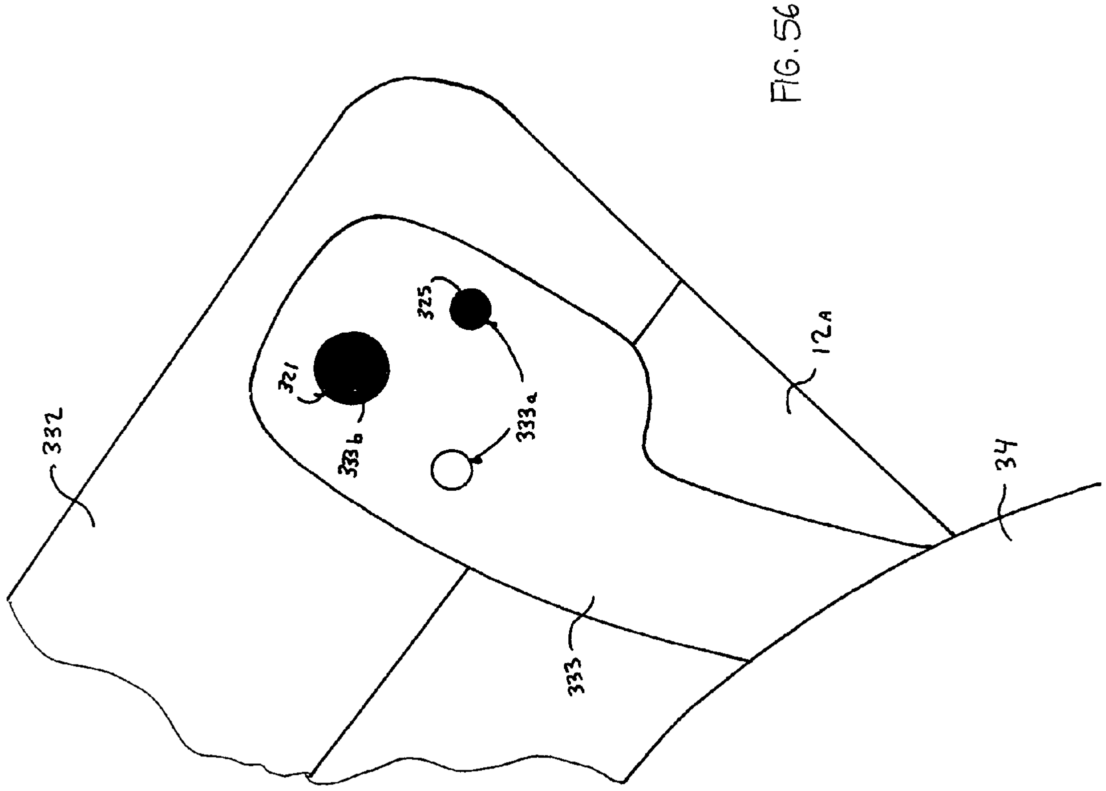
FIG. 56 is a detail similar to that of FIG. 55, but showing the locked in storage position.

FIGS. 55 and 56 show a detailed view of the connection between the frame 333 and the drive mechanism end case internal frame cover 332. FIG. 55 illustrates the locked in usage position, as shown more broadly in FIG. 44, while FIG. 56 shows the locked in storage position as generally illustrated in FIG. 49. The frame ARM 333 pivots about the pivot bolt 321. In FIG. 55, the plunger 325 can be seen in the lower aperture 333*a*, while in FIG. 56, the plunger 325 can be seen in the upper aperture also referenced 333*a*. Of course, the plunger 325 remains in a fixed position, and the aperture in which it engages will depend upon the rotational position or orientation of the frame arm 333.

Figure 57:
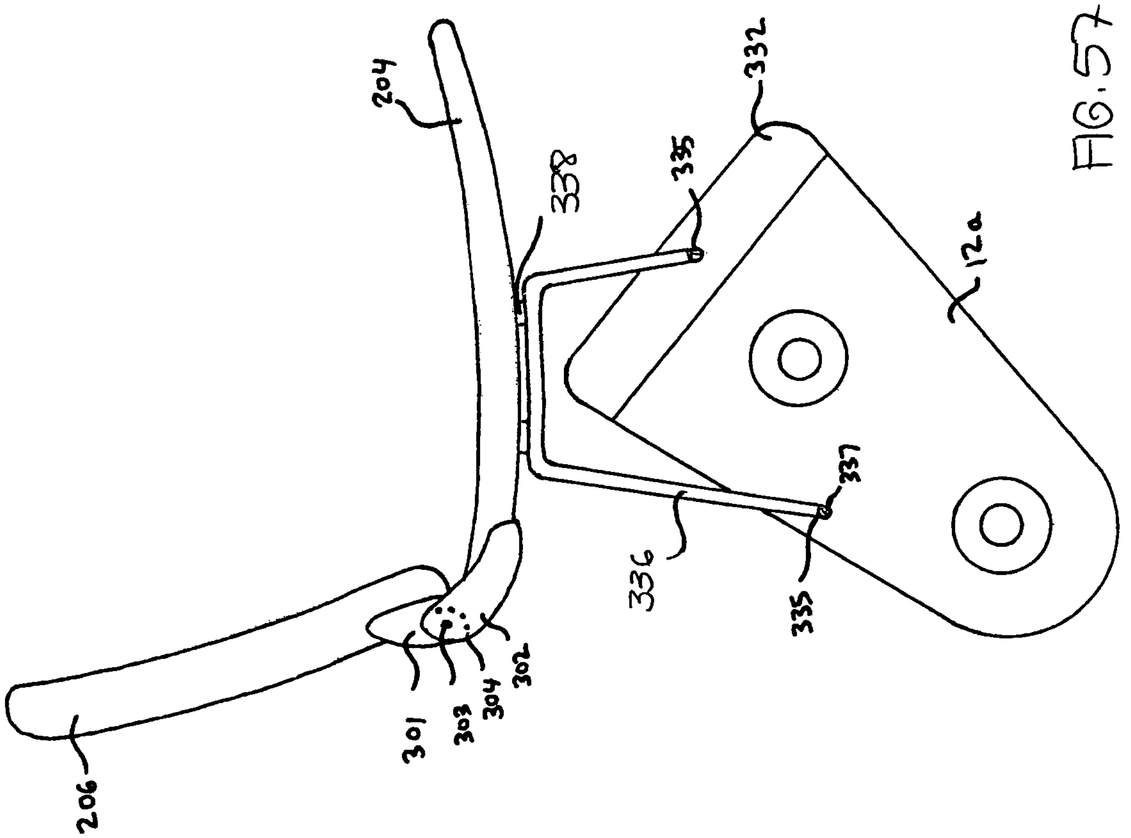
FIG. 57 is a side view illustrating the seat and its mounting frame.

FIG. 57 shows a view similar to that in FIG. 44, but without showing the rear wheels 34 or the arm lever 22. FIG. 57 thus clearly shows the mechanism by means of which the seat frame structure 336 is attached to the end case cover 332 at the forward end of the frame structure and to the transmission outer case 12*a* at the rear end of the frame structure, as shown in this figure, and the seat 204 is in turn attached to the seat frame structure 336.

Figure 58:
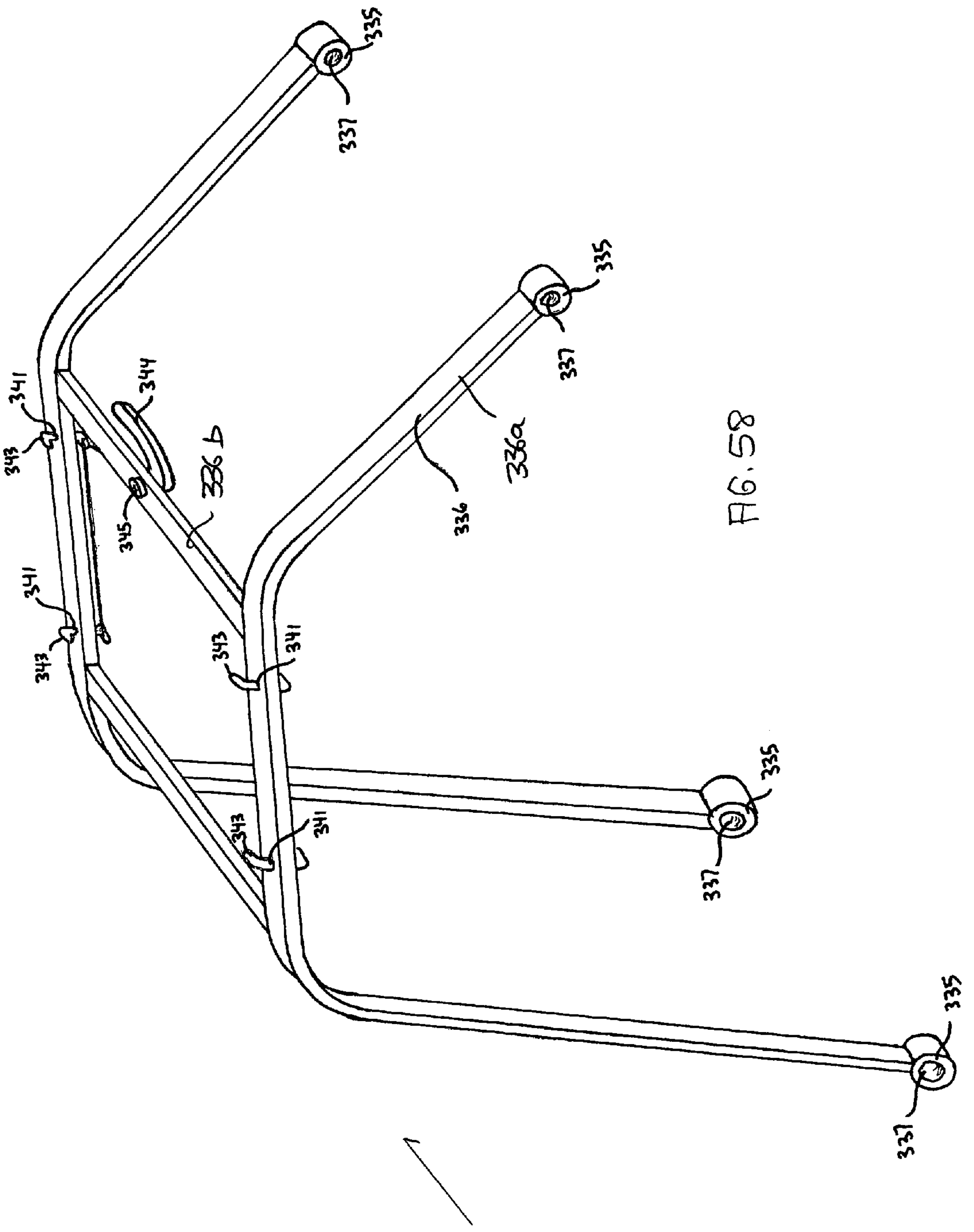
FIG. 58 is a perspective view of the seat mounting frame.

FIG. 58 of the drawings shows a detailed perspective view of the seat frame 336. The seat frame 336 comprises a pair of more or less U shaped members 336*a* connected in spaced relationship by transverse connectors 336*b*. Each U-shaped member 336*a* has a mounting part 335 at each end thereof, each mounting part 335 including a bolt hole 337. As seen in FIG. 57, the seat frame 336 mounts on the drive mechanism 230 by being appropriately bolted thereto in a manner such that the transverse connectors 336*b* are substantially horizontal. Each U-shaped member 336*a* has a pair of bushing mounting holes 341, each of which receives a lock shaft 343.

Figure 59:
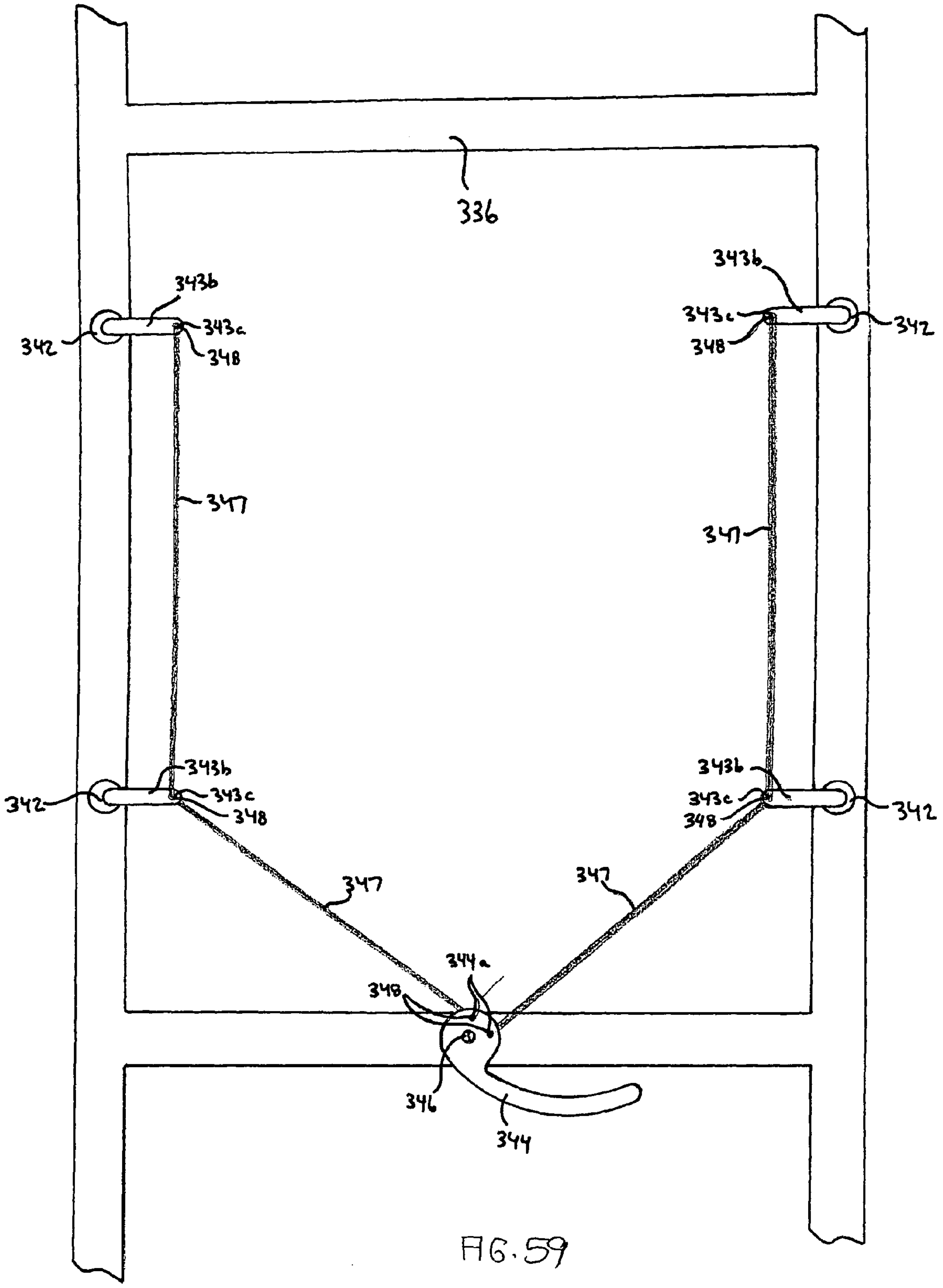
FIG. 59 is a bottom view of the seat mounting frame illustrating the lock mechanism.

FIG. 59 shows a bottom view of the seat frame 336, and illustrates a lock system activation lever 344 mounted at pivot pin 346. The activation lever 344 has mount holes 344*a* each of which receives a system linkage 347. The system linkage 347 comprises a rigid line. The linkage 347 attaches to a lock shaft lower arm 343*b* through hole 343*c*. A further linkage extends between the forward and aft lower arms 343*b*.

When the activation lever 344 is rotated, the various linkages 347 will cause the lower arms 343*b* to rotate, which will have the effect of disconnecting an upper arm 343*a* on the opposing side of the bushing 342 to enable the fastening and unfastening of the seat 204 from the seat frame 336.

Figure 60C:
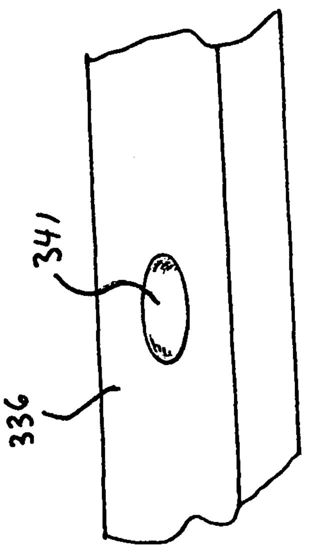
FIGS. 60A, 60B and 60C show details of certain components of the locking mechanism generally illustrated in FIG. 59.
Figure 60B:
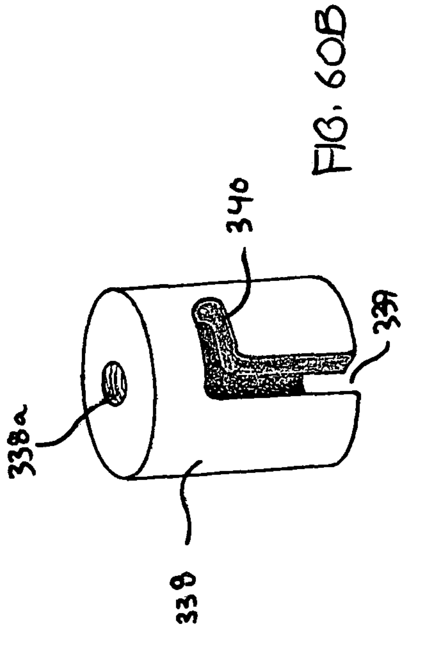
Figure 60A:
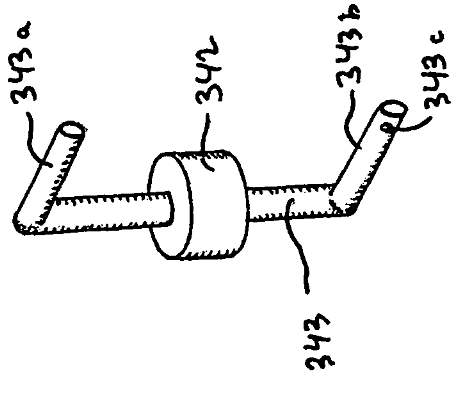

Reference is made to FIGS. 60A, 60B and 60C which shows in further detail the fastening mechanism between the seat 204 and the frame 336. As described above, the lock shaft bushing 342 sits in a mounting hole 341 of the frame 336. The lower arm 343*b* of the lock shaft 343 extends below the bushing 342 and a lock shaft upper arm 343*a* extends above the bushing 342. The upper arm 343*a* is releasably received in a locking mount cylinder 338 which has an access slot 339 and a securement slot 340 at substantially right angles thereto. The upper arm 343*a* engages in the access slot 339 and then is rotated into the securement slot 340 by appropriate manipulation of the activation handle 344. When the upper arm 343*a* is in the securement slot 340, the seat frame 336 will be releasably attached to the seat 204. The cylinder 338 is bolted to the seat 204 by means of bolts through holes 338*a*.

Figure 61:
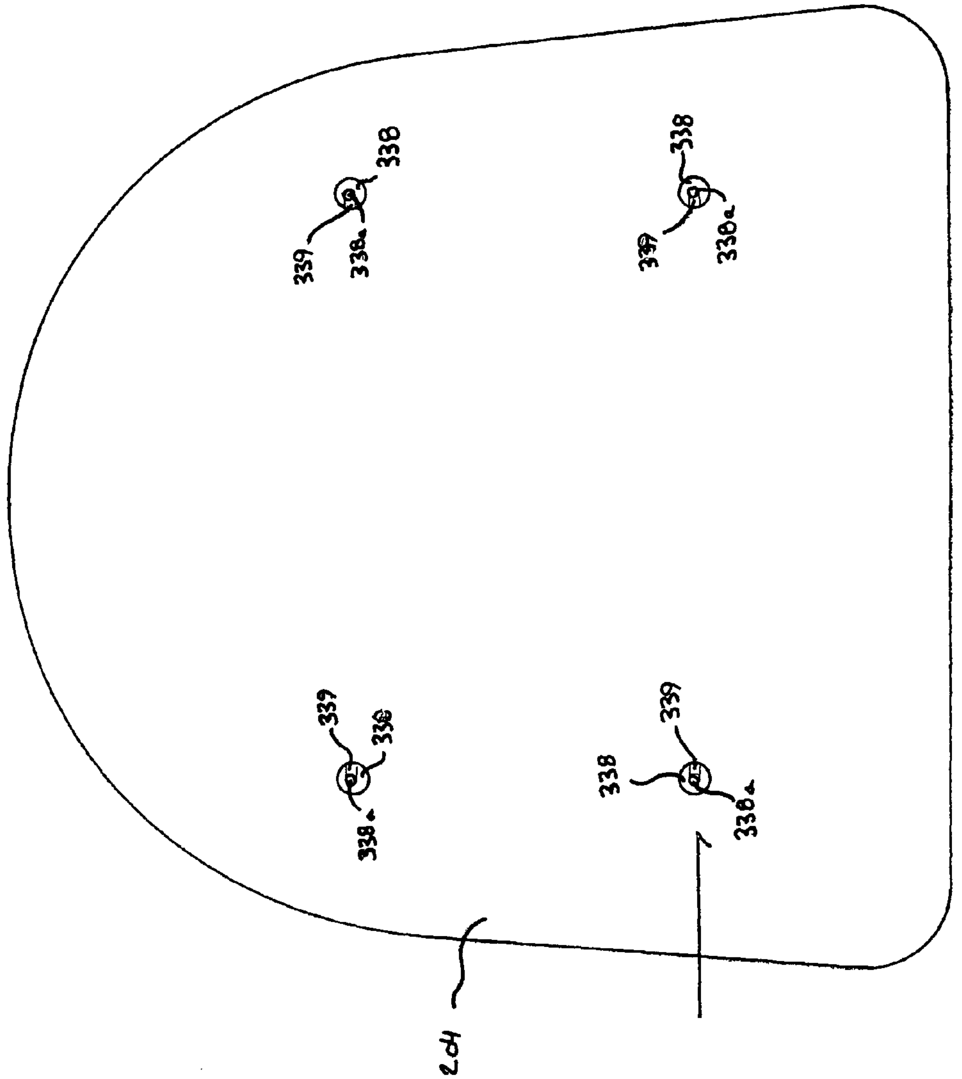
FIG. 61 is a bottom view of the seat, including locking structure components.

FIG. 61 shows a bottom view of the seat 204 with four locking cylinders 338 appropriately position so as to overlie and engage with the four upper arms 343*a* on the seat frame 336.

The invention claimed is:

1. A wheelchair comprising:

a drive member housing having a first axle and a second axle;

a rear wheel attached to the first axle of the drive member housing;

a seat frame mounted on the drive member housing;

a seat mounted on the seat frame;

an arm lever extending from the second axle of the drive member housing to a position such that it can be readily operated by an user in the seat; and a front frame arm attached to the drive member housing, the front frame arm having a front wheel.

2. A wheelchair as claimed in claim 1 wherein the seat frame is mounted on the drive member housing, and the seat is releasably mounted on the seat frame.

3. A wheelchair as claimed in claim 1 wherein the front frame arm is pivotally attached to the drive member housing and movable between a fully unfolded position and a fully folded position.

4. A wheelchair as claimed in claim 1 wherein the seat comprises a seat bottom portion and a seat back, the seat portion and seat back being movable relative to each other between a fully open position and a fully folded position.

5. A wheelchair as claimed in claim 3 wherein the frame arm is pivotally mounted on the drive member housing, and the frame arm comprises: at least two apertures, a plunger provided for engaging one of the apertures to fix the frame arm relative to the drive member housing, and a lock mechanism provided to move the plunger between a locked position in which it engages one of the apertures and an unlocked position in which it is disengaged from the apertures.

6. A wheelchair as claimed in claim 4 wherein the seat portion has a seat hinge, and the seat back as a seat back hinge, and a lock/unlock mechanism is provided to facilitate relative movement between the seat hinge and the seat back hinge between the fully open position and the fully folded position.

7. A wheelchair as claimed in claim 2 further comprising a locking mechanism for securing the seat to the seat frame, the locking mechanism comprising a bushing accommodated in an aperture in the frame, the bushing having an upper leg and a lower leg, the lower leg being operably connected to a handle for rotating the bushing between a first locked position and a second unlock position, the upper leg engaging a lock cylinder located in the seat when in the first locked position, and disengaging the lock cylinder when in the second unlock position.

* * * * *